(12) United States Patent
Brink

(10) Patent No.: US 9,816,274 B2
(45) Date of Patent: Nov. 14, 2017

(54) STAIR CASE

(71) Applicant: CLICKSTAIR PTY LTD, Braeside, Victoria (AU)

(72) Inventor: Darren Brink, Braeside (AU)

(73) Assignee: CLICKSTAIR PTY LTD, Braeside, Victoria (AU)

( * ) Notice: Subject to any disclaimer, the term of this patent is extended or adjusted under 35 U.S.C. 154(b) by 0 days.

(21) Appl. No.: 14/914,931

(22) PCT Filed: Aug. 28, 2014

(86) PCT No.: PCT/AU2014/050200
§ 371 (c)(1),
(2) Date: Feb. 26, 2016

(87) PCT Pub. No.: WO2015/027293
PCT Pub. Date: Mar. 5, 2015

(65) Prior Publication Data
US 2016/0222673 A1 Aug. 4, 2016

(30) Foreign Application Priority Data

Aug. 28, 2013 (WO) ................ PCT/AU2013/000955
Feb. 27, 2014 (AU) ............................... 2014900648
Jun. 5, 2014 (AU) ............................... 2014902148

(51) Int. Cl.
*E04F 11/00* (2006.01)
*E04F 11/035* (2006.01)
(Continued)

(52) U.S. Cl.
CPC .......... *E04F 11/035* (2013.01); *E04F 11/025* (2013.01); *E04F 11/09* (2013.01); *E04F 11/104* (2013.01); *F16B 5/0016* (2013.01)

(58) Field of Classification Search
CPC ....... E04F 11/035; E04F 11/09; E04F 11/104; E04F 11/025; F16B 5/0016
(Continued)

(56) References Cited

U.S. PATENT DOCUMENTS 606,532 A * 6/1898 Furness ................... E04F 11/17
52/179
973,346 A * 10/1910 Davis .................... E04F 11/166
280/169

(Continued)

FOREIGN PATENT DOCUMENTS

| BE | 1008493 | 5/1996 |
|----|---------|--------|
| GB | 599115 | 3/1948 |
| JP | H10227110 | 8/1998 |

OTHER PUBLICATIONS

International Search Report and Written Opinion for Application No. PCT/AU2014/050200 dated Nov. 10, 2014 (10 pages).

*Primary Examiner* — Basil Katcheves
(74) *Attorney, Agent, or Firm* — Michael Best & Friedrich LLP

(57) ABSTRACT

A stair case (10) having one or more stringers (12), treads (14), and risers (16), with the treads and/or risers being supported on the stringers. The stair case has first connecting elements, and each tread has at least one of the first connecting elements (18) provided at an under surface that tread. The stair case also has second connecting elements (20) that are each provided to a respective one of the risers. The first and second connecting elements are interconnected to secure each tread to one of the risers, and at least one of the first and second connecting elements is integrally formed in the respective treads and risers.

21 Claims, 46 Drawing Sheets

(51) Int. Cl.
  *E04F 11/025* (2006.01)
  *E04F 11/104* (2006.01)
  *F16B 5/00* (2006.01)
  *E04F 11/09* (2006.01)

(58) Field of Classification Search
  USPC .......................................... 52/188, 189, 191
  See application file for complete search history.

(56) References Cited

U.S. PATENT DOCUMENTS

| | | | | |
|---|---|---|---|---|
| 1,475,777 | A | * | 11/1923 | Ballenger ............. E04F 11/025 52/189 |
| 1,893,876 | A | * | 1/1933 | Anderson ............. E04F 11/025 52/191 |
| 3,909,997 | A | * | 10/1975 | Eickhof ................ E04F 11/025 52/188 |
| 4,154,032 | A | | 5/1979 | Straub |
| 4,367,613 | A | * | 1/1983 | Strub ................... E04F 11/025 52/188 |
| 4,464,870 | A | * | 8/1984 | Crepeau ............... E04F 11/108 52/188 |
| 5,239,796 | A | * | 8/1993 | Maloney .............. E04F 11/025 182/216 |
| 2006/0024465 | A1 | * | 2/2006 | Briere ...................... B32B 3/04 428/60 |
| 2006/0236642 | A1 | * | 10/2006 | Pervan .................... E04F 15/02 52/578 |

\* cited by examiner

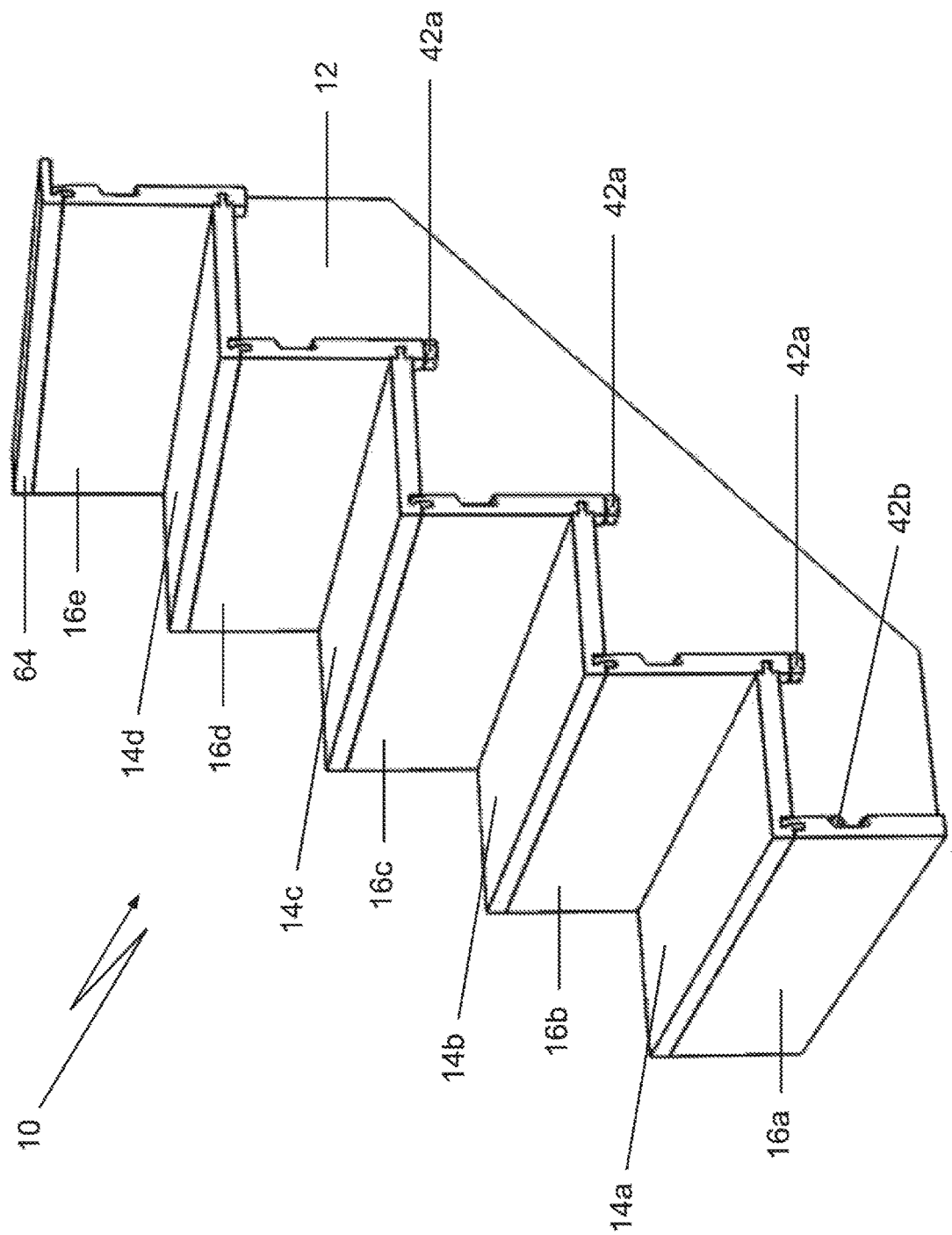

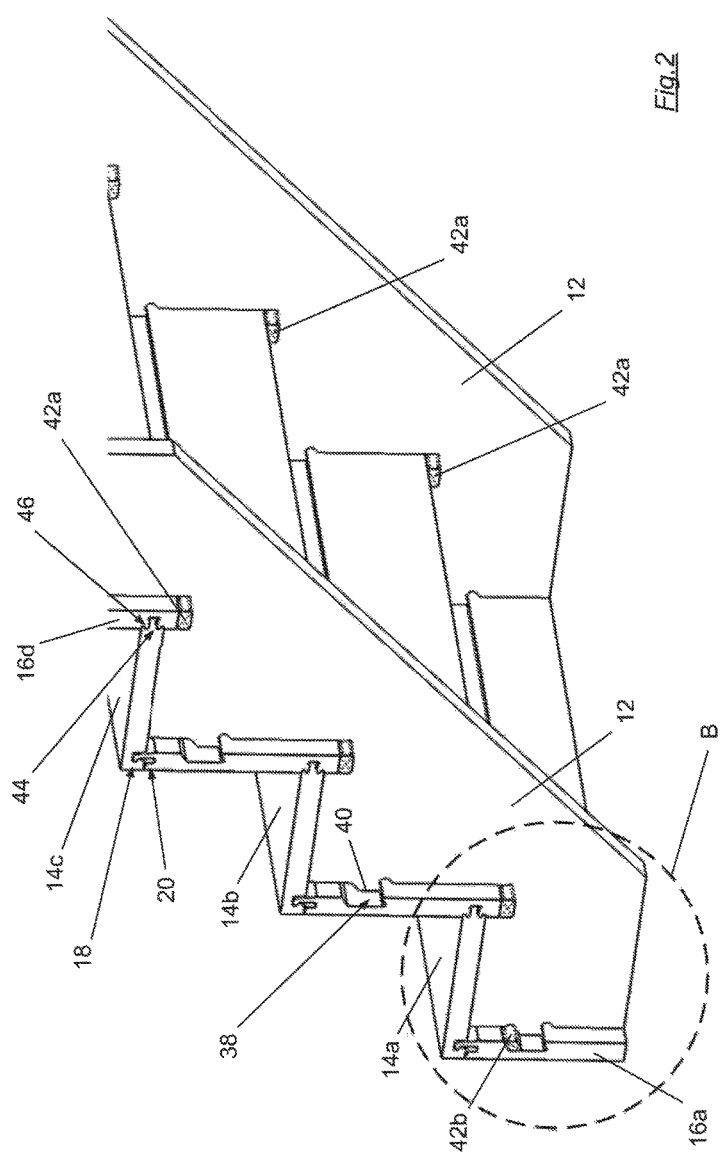

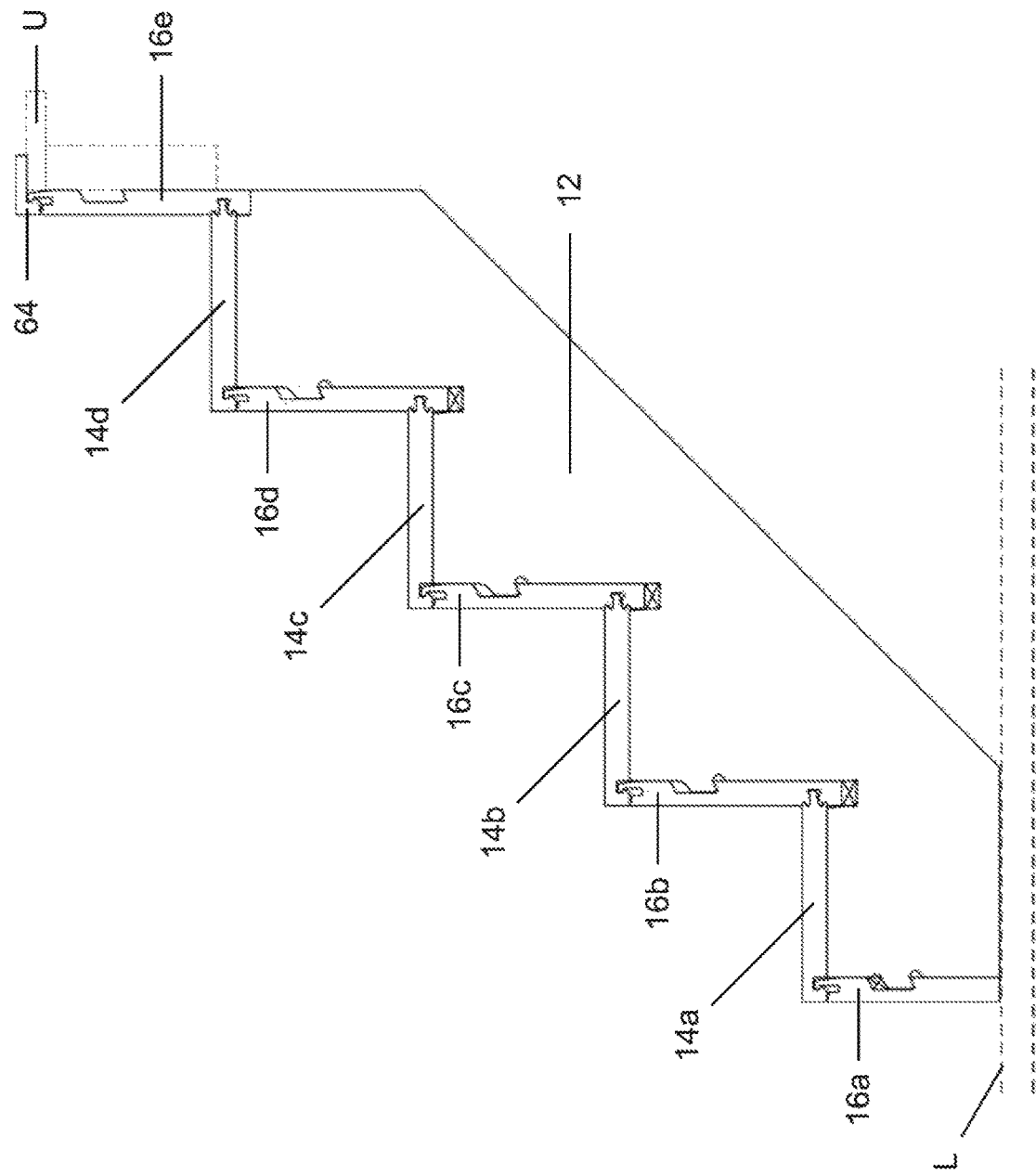

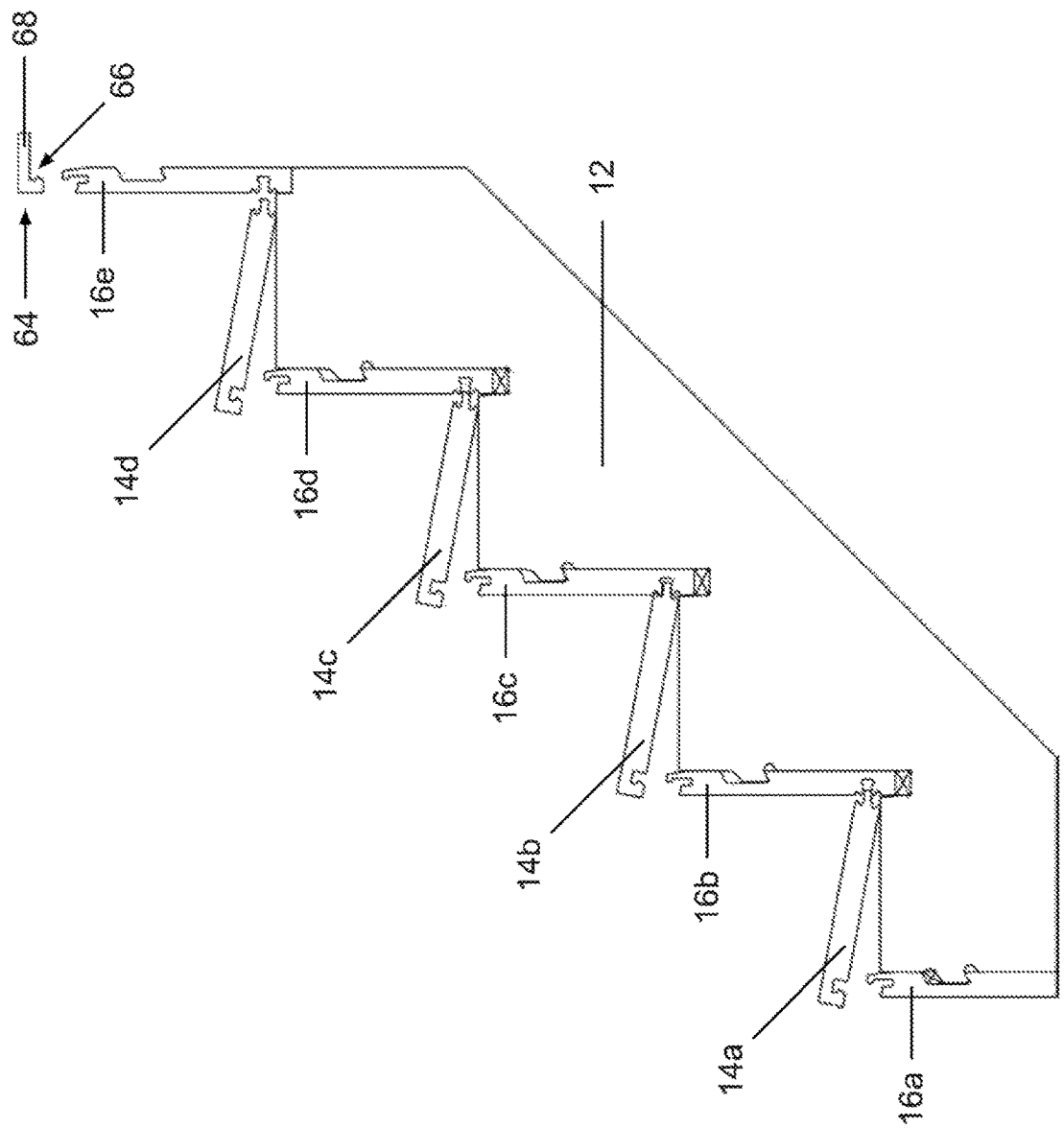

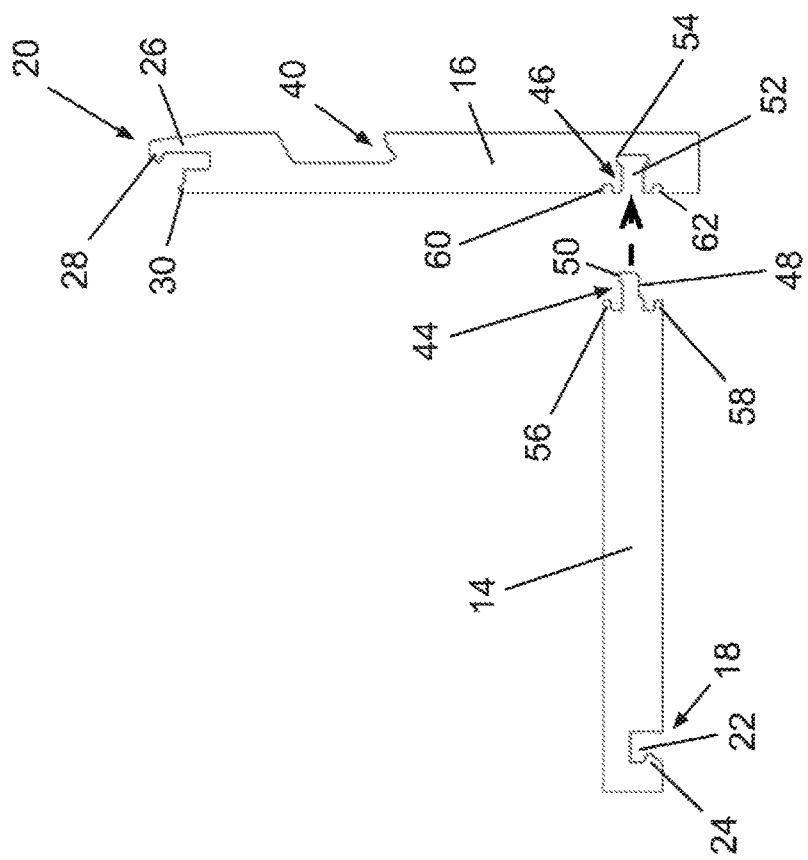
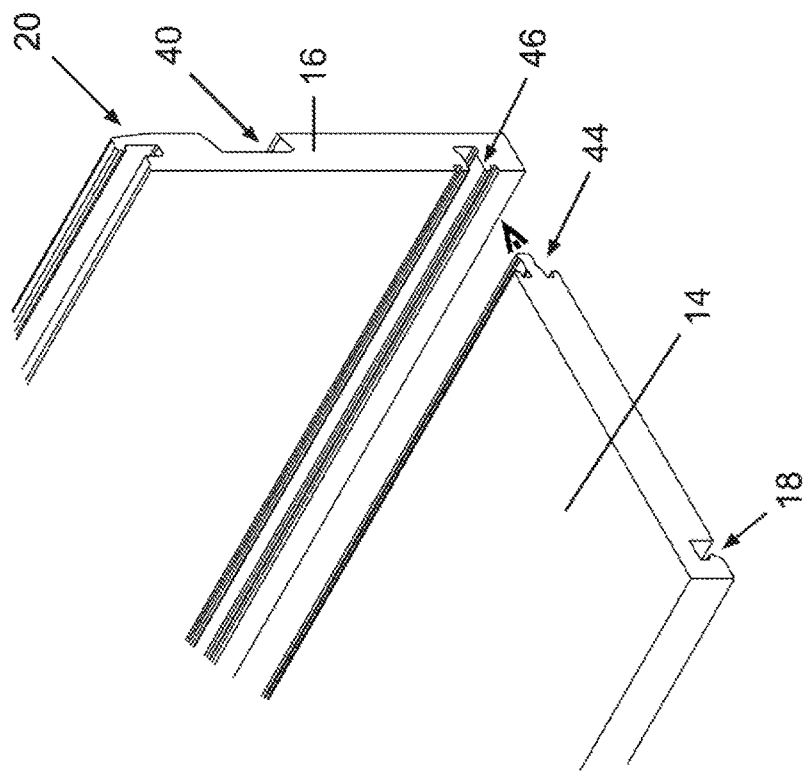

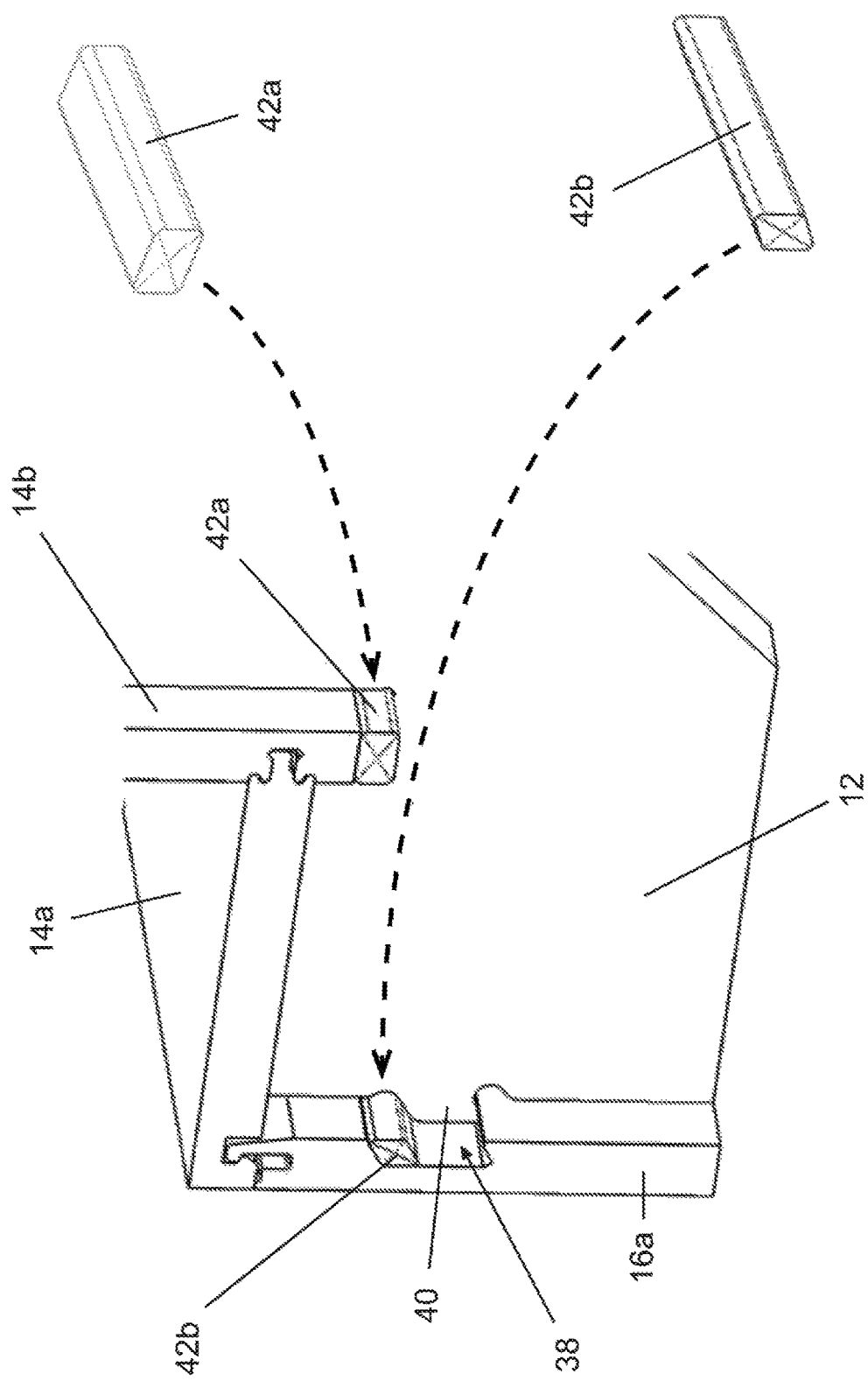

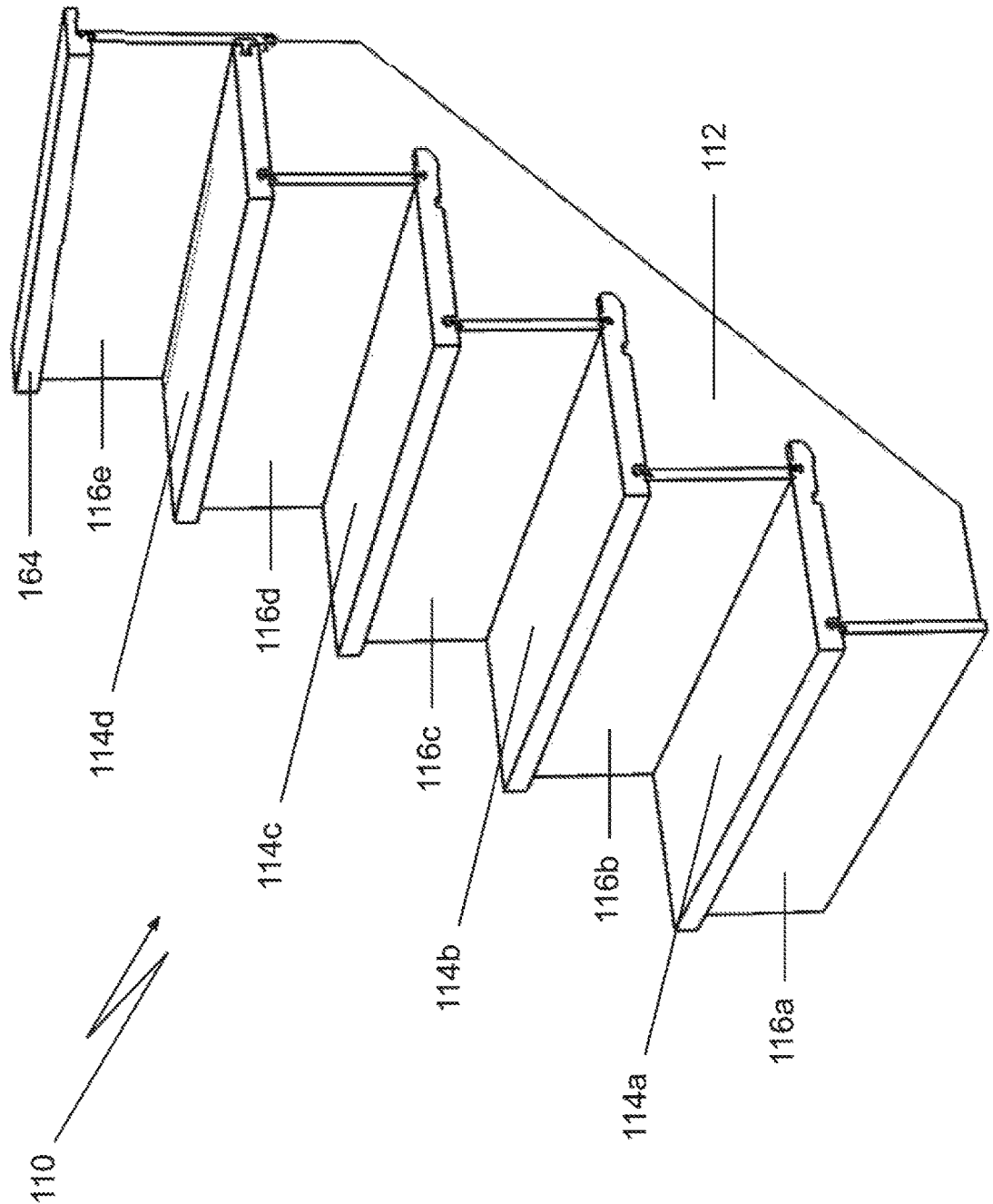

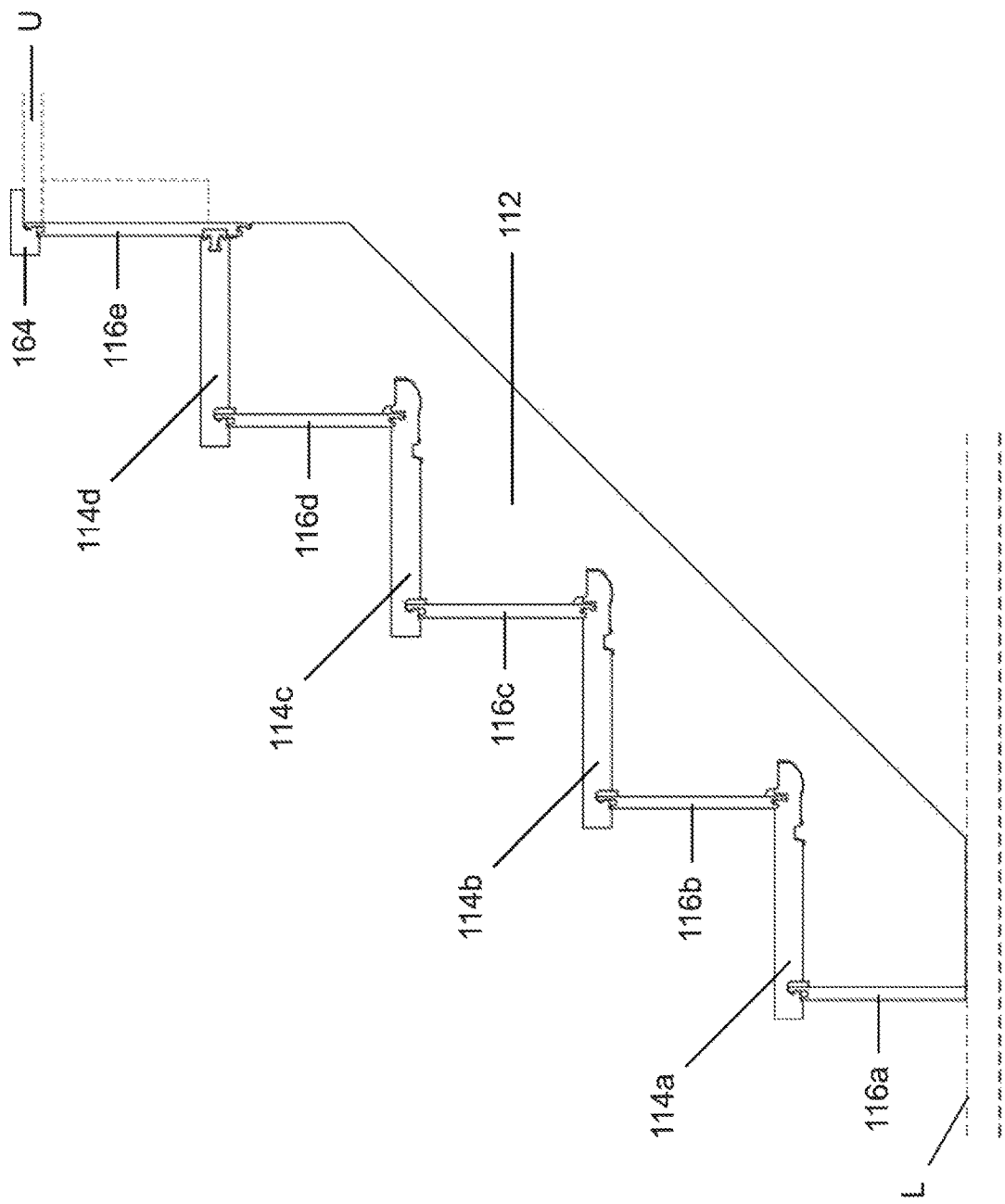

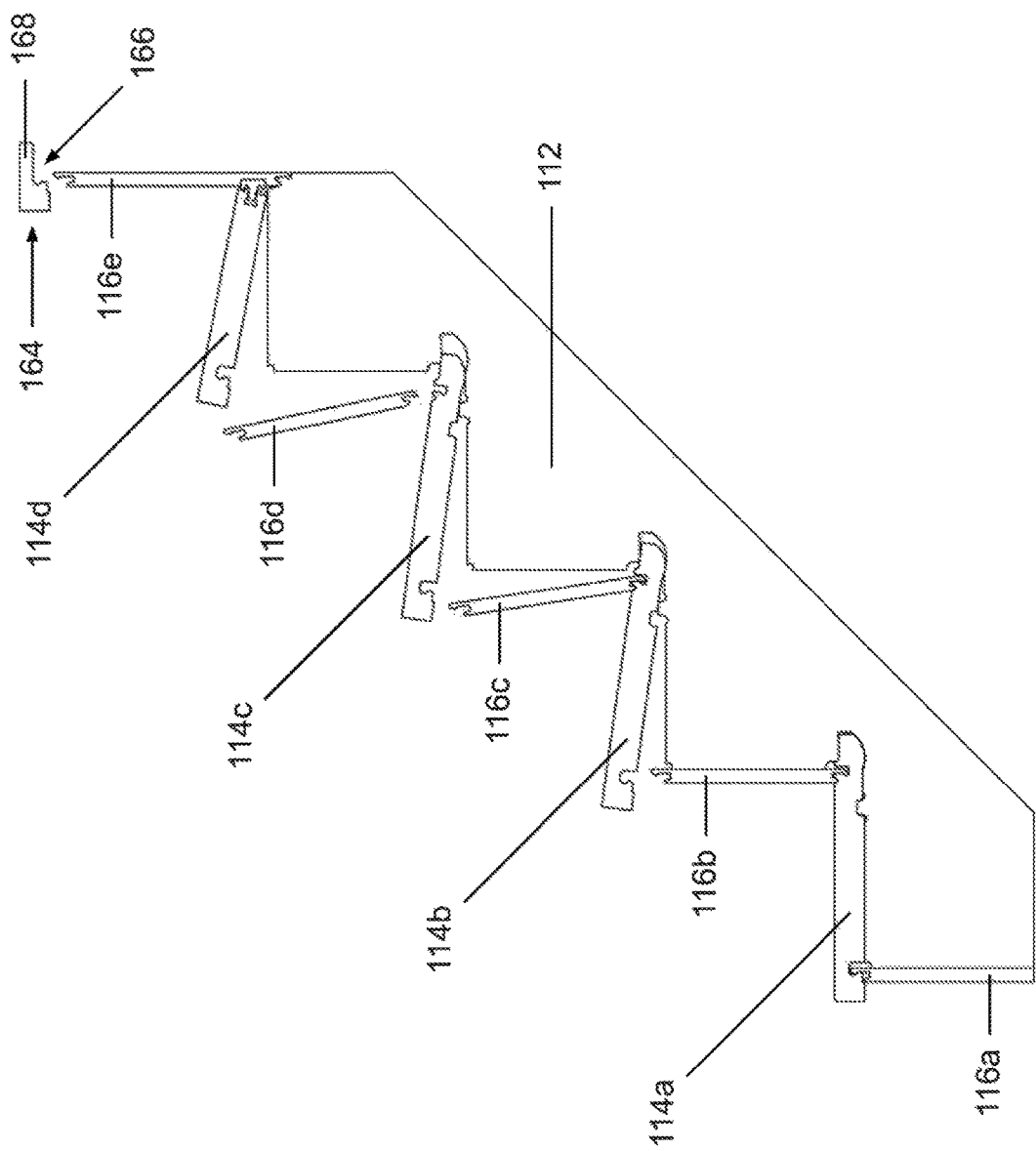

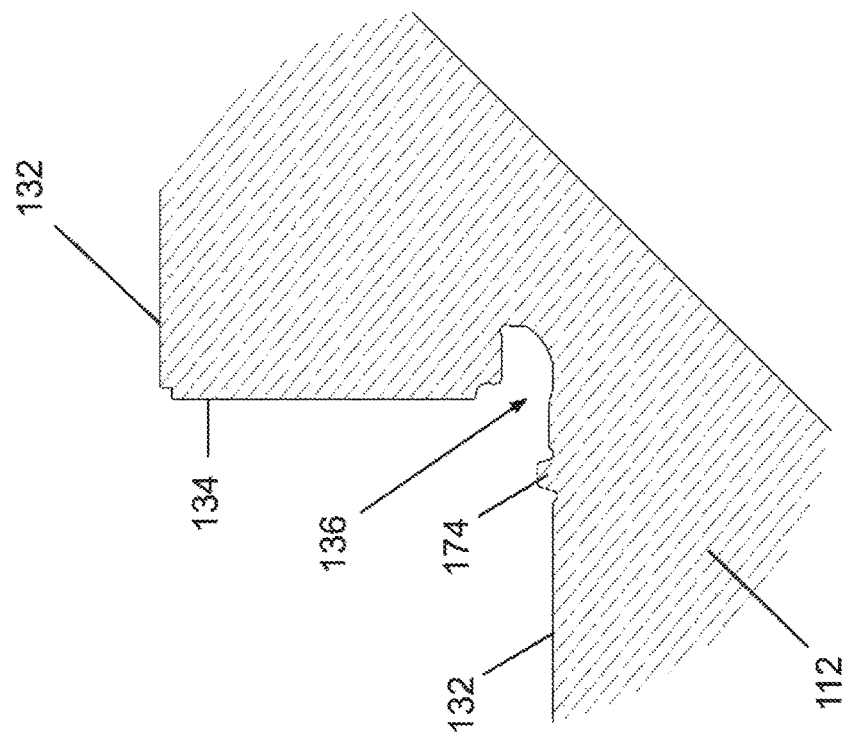
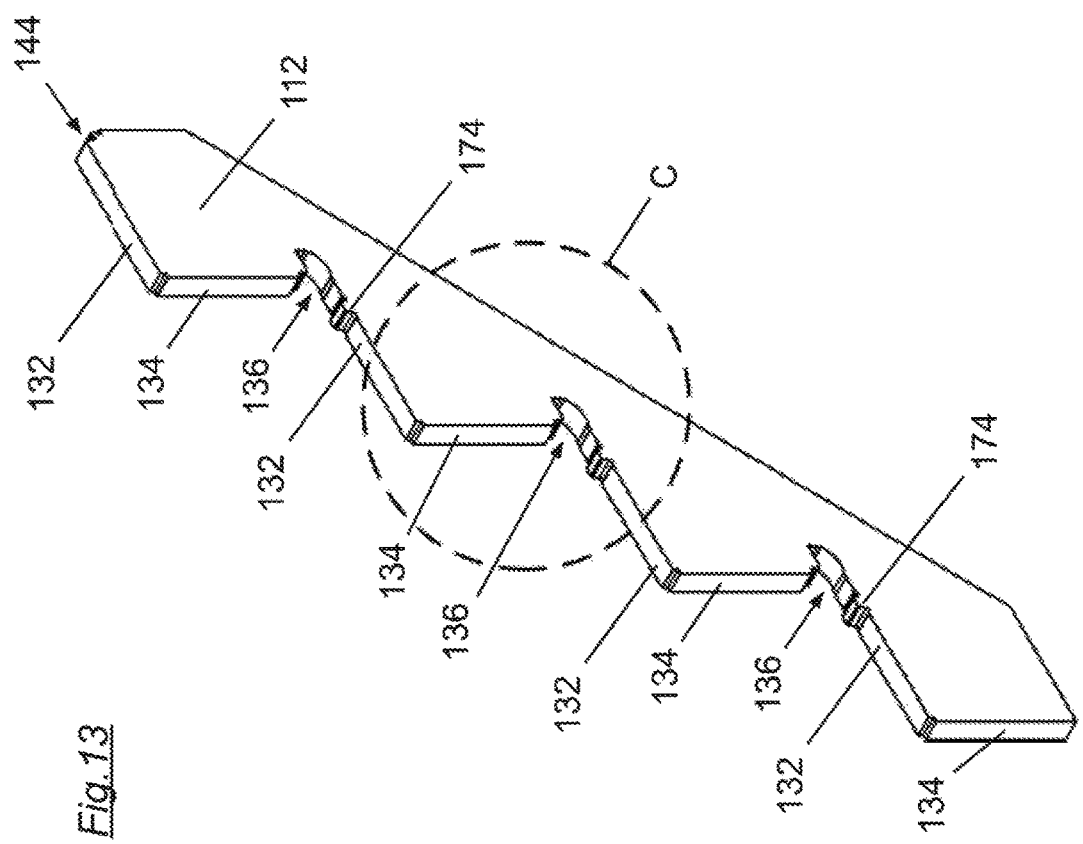
Fig.14
Fig.13

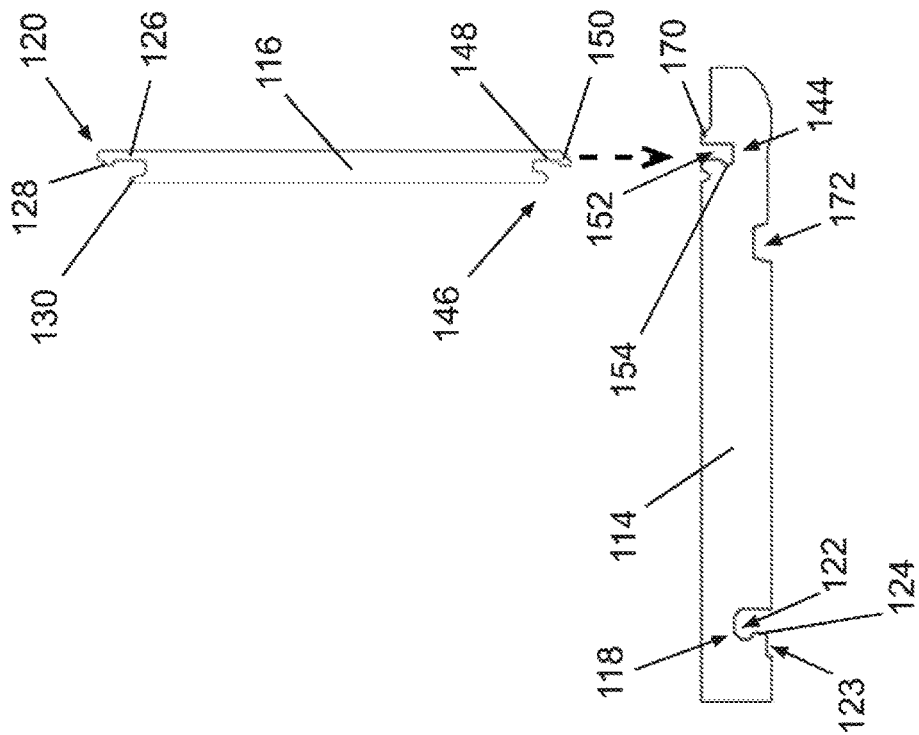
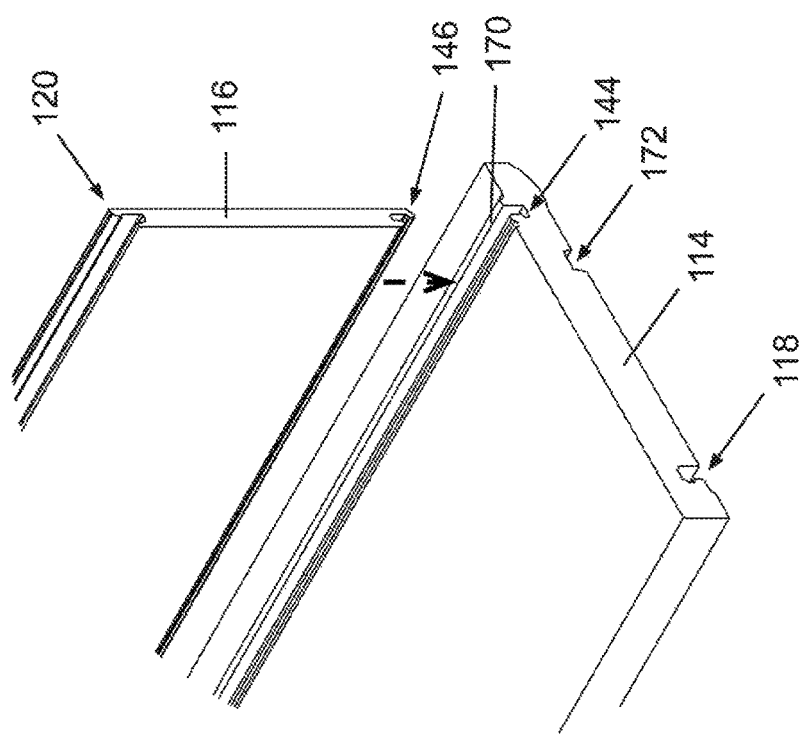

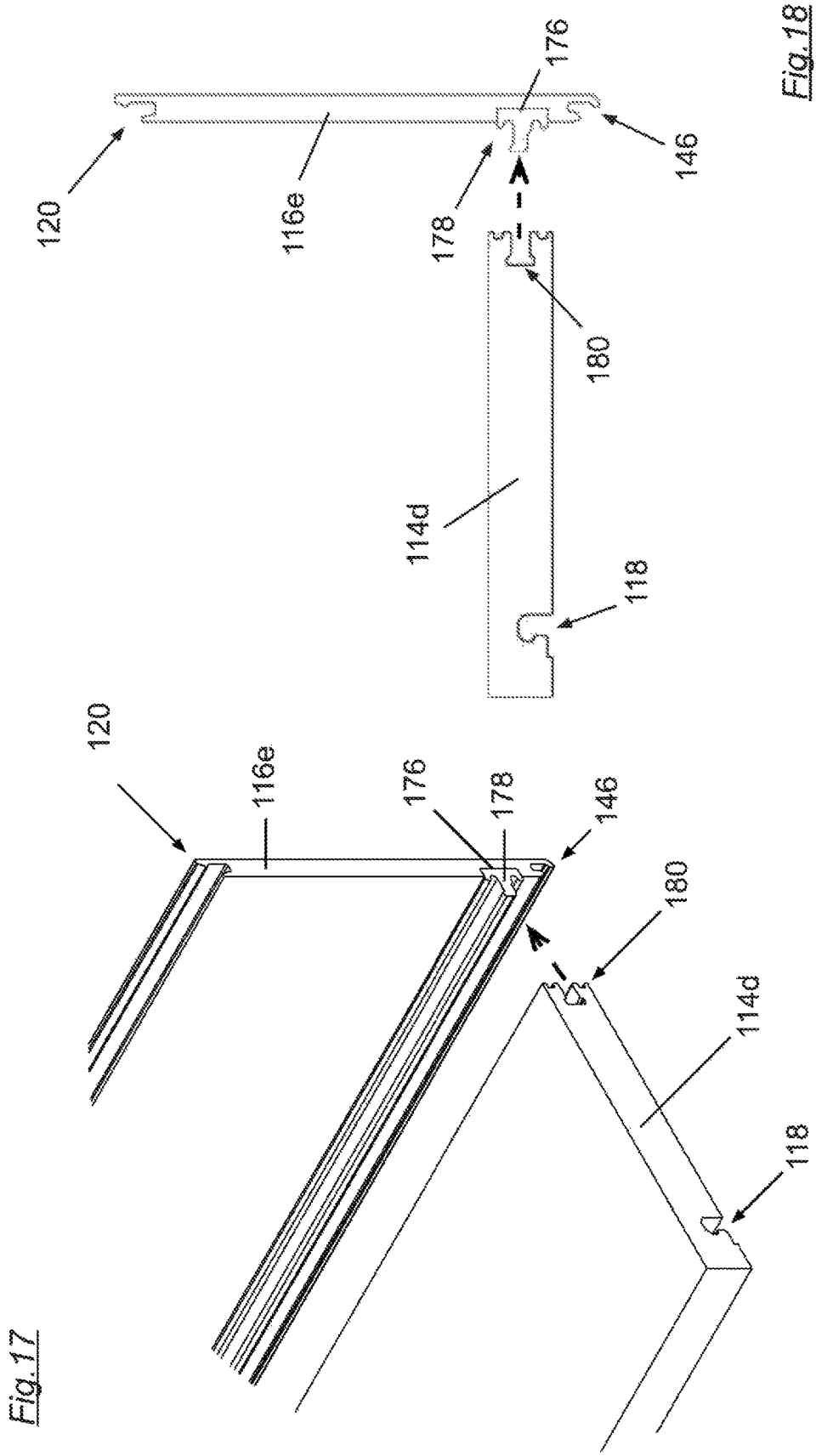

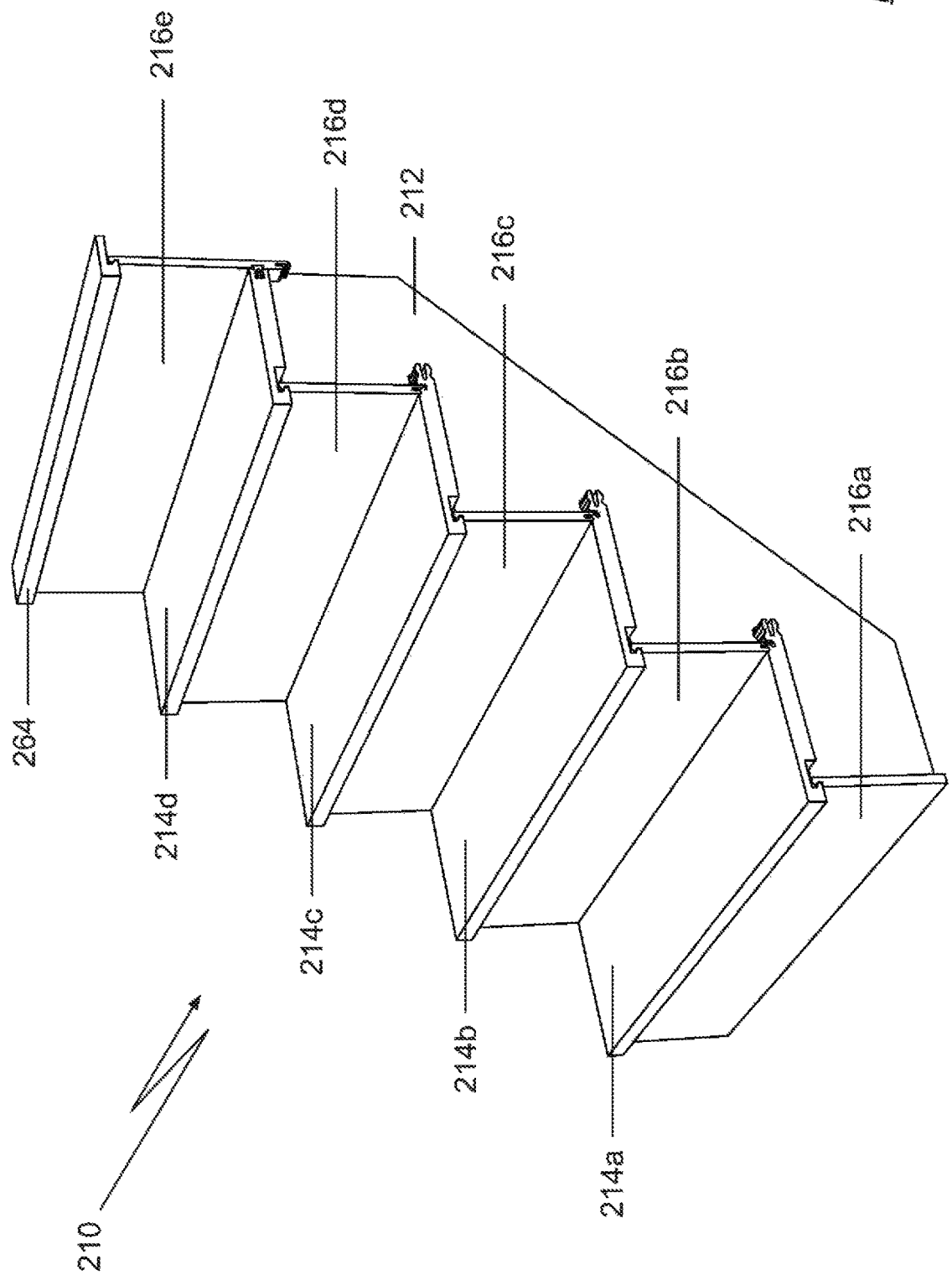

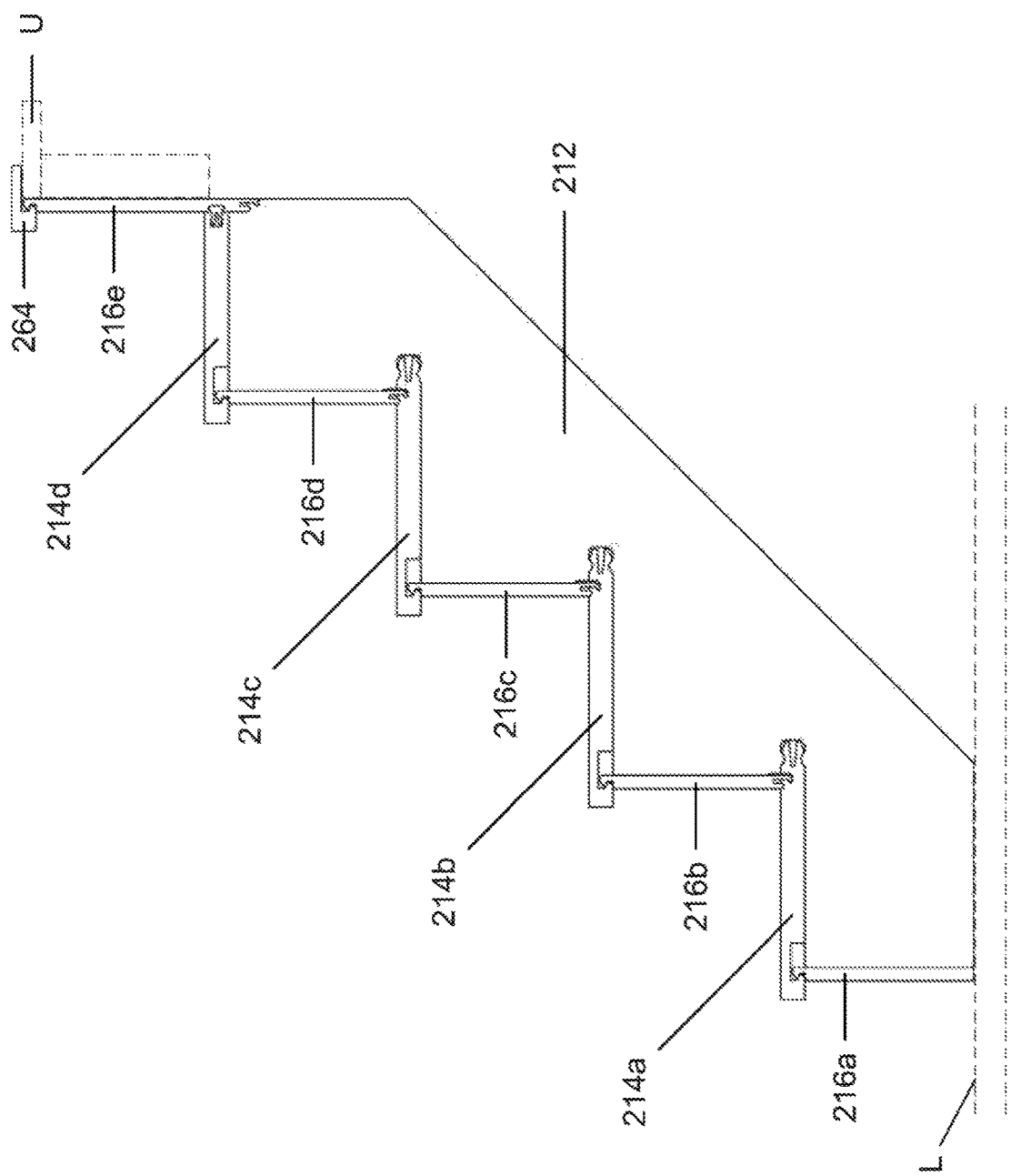

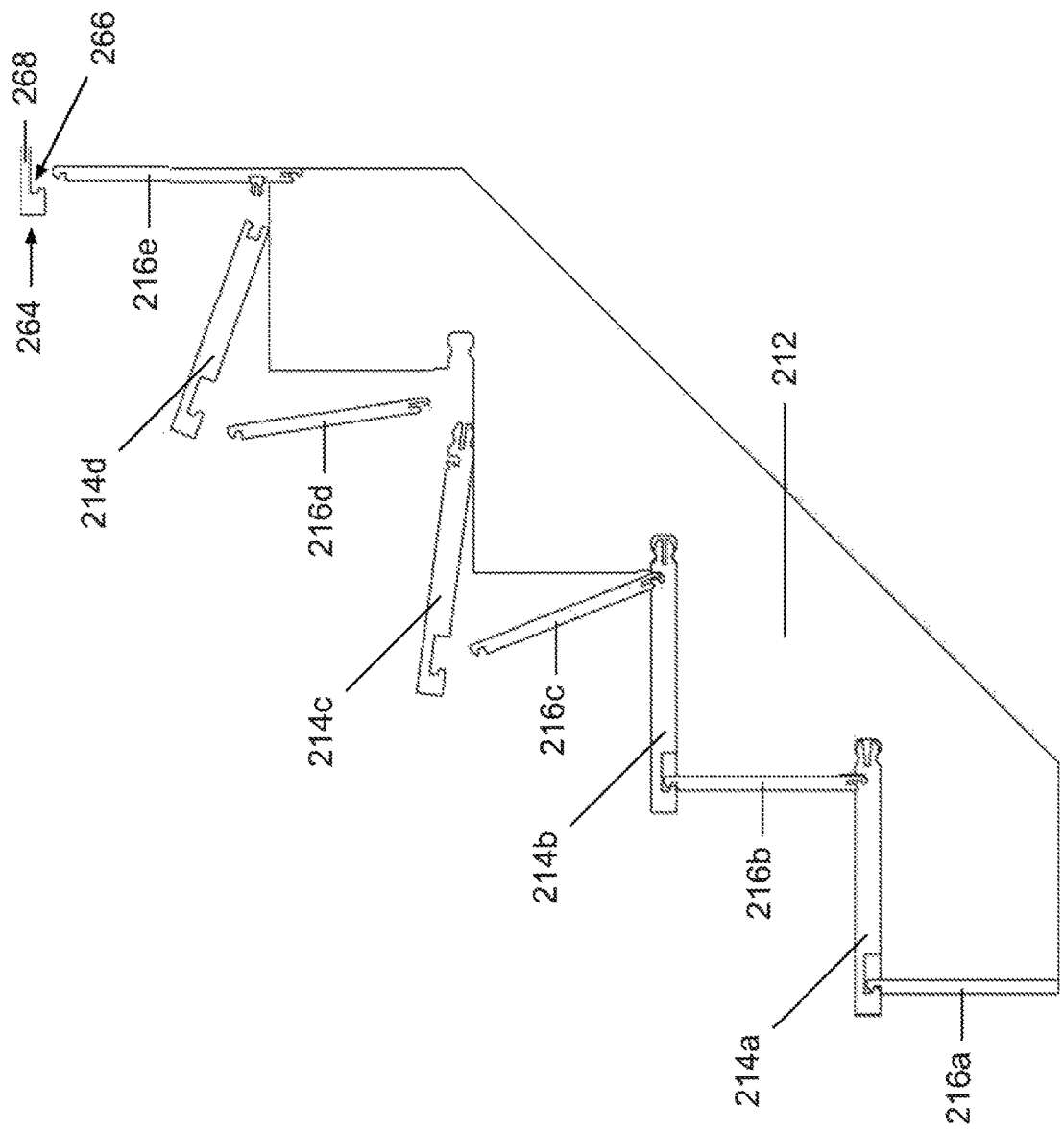

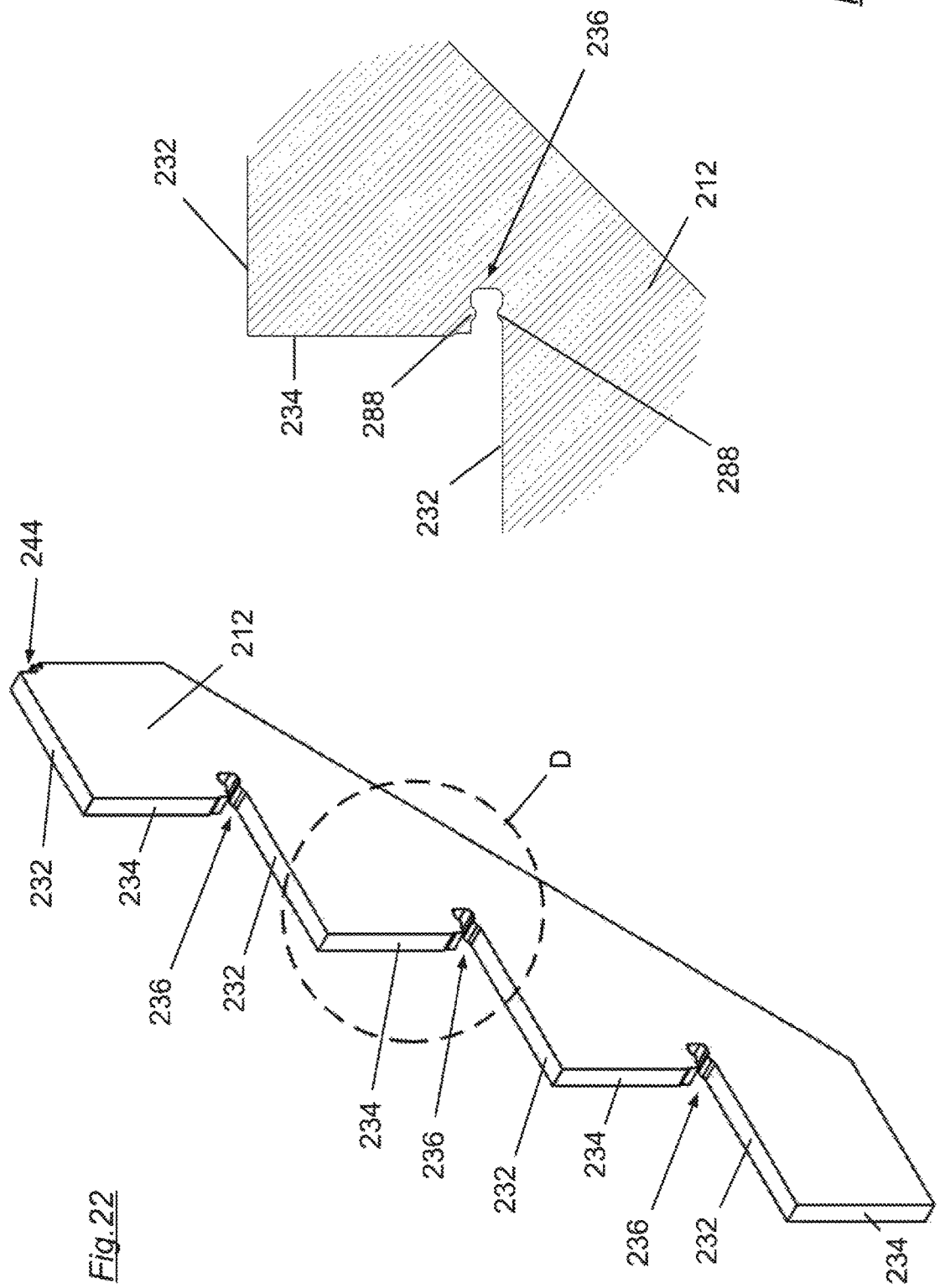

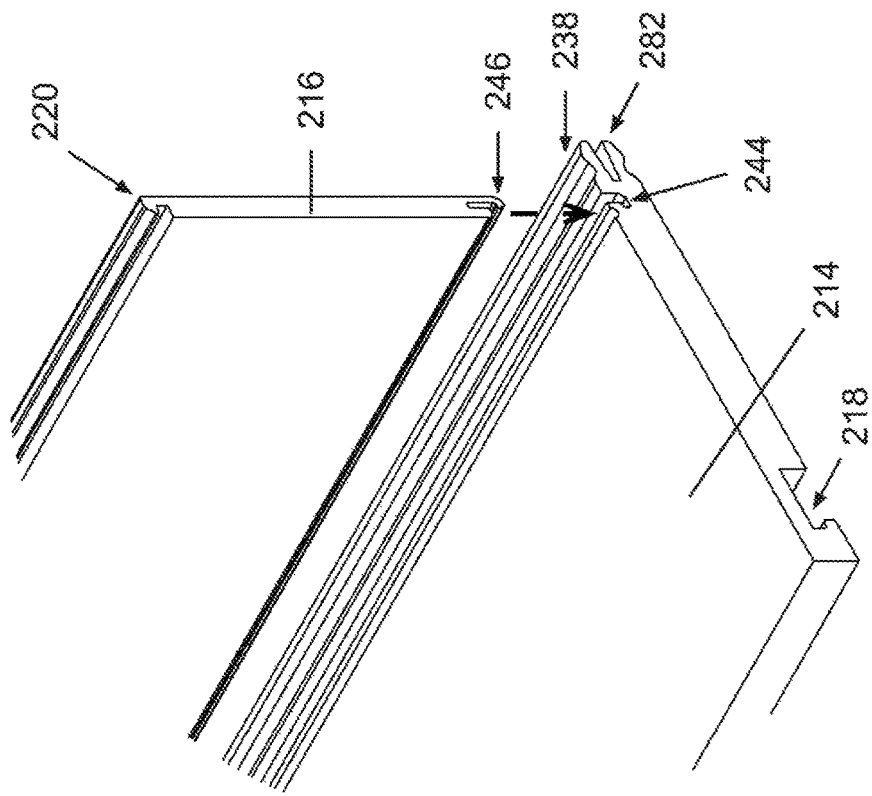

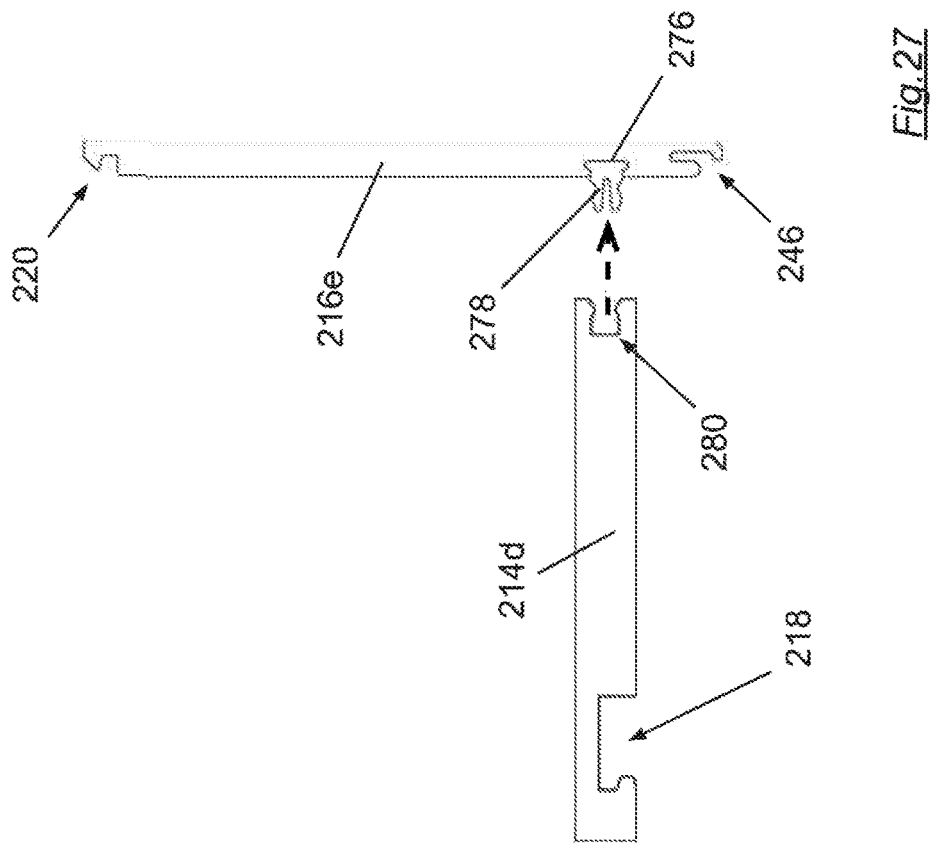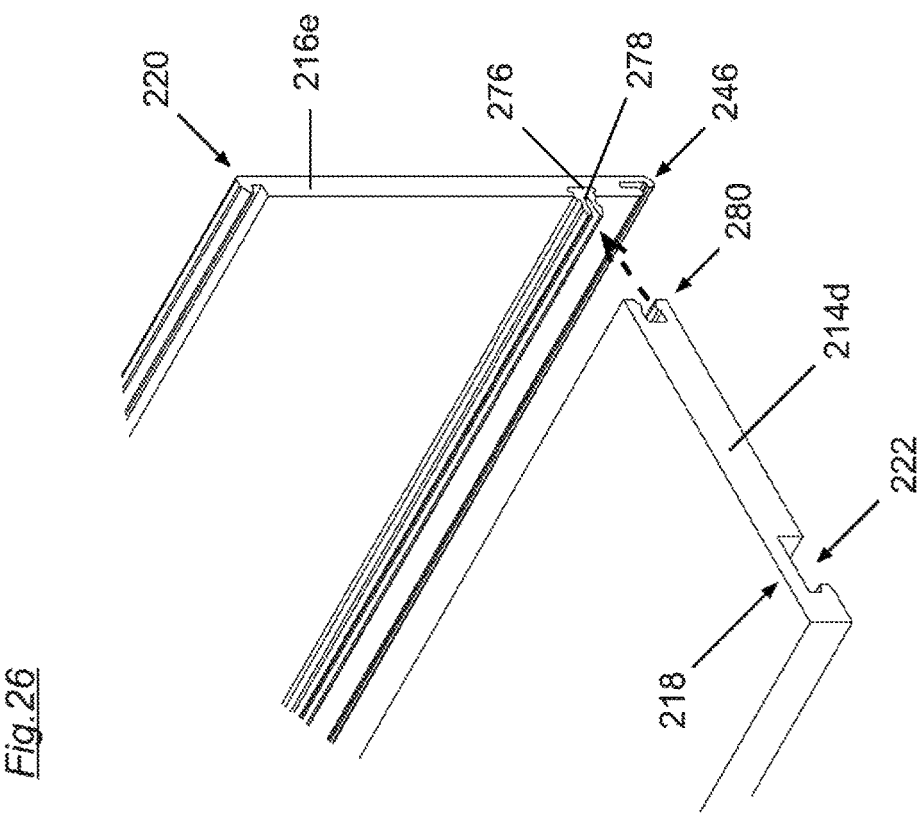

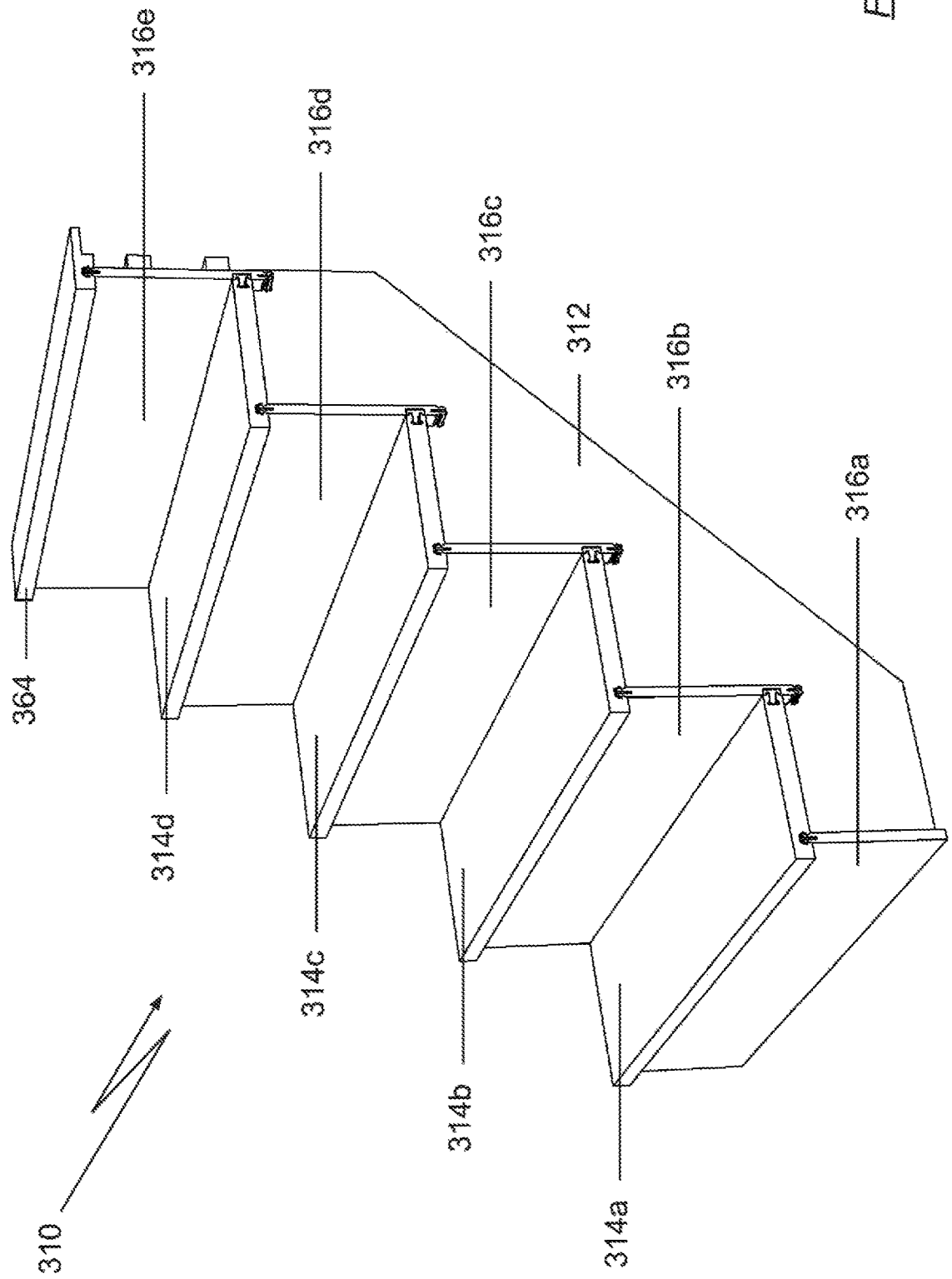

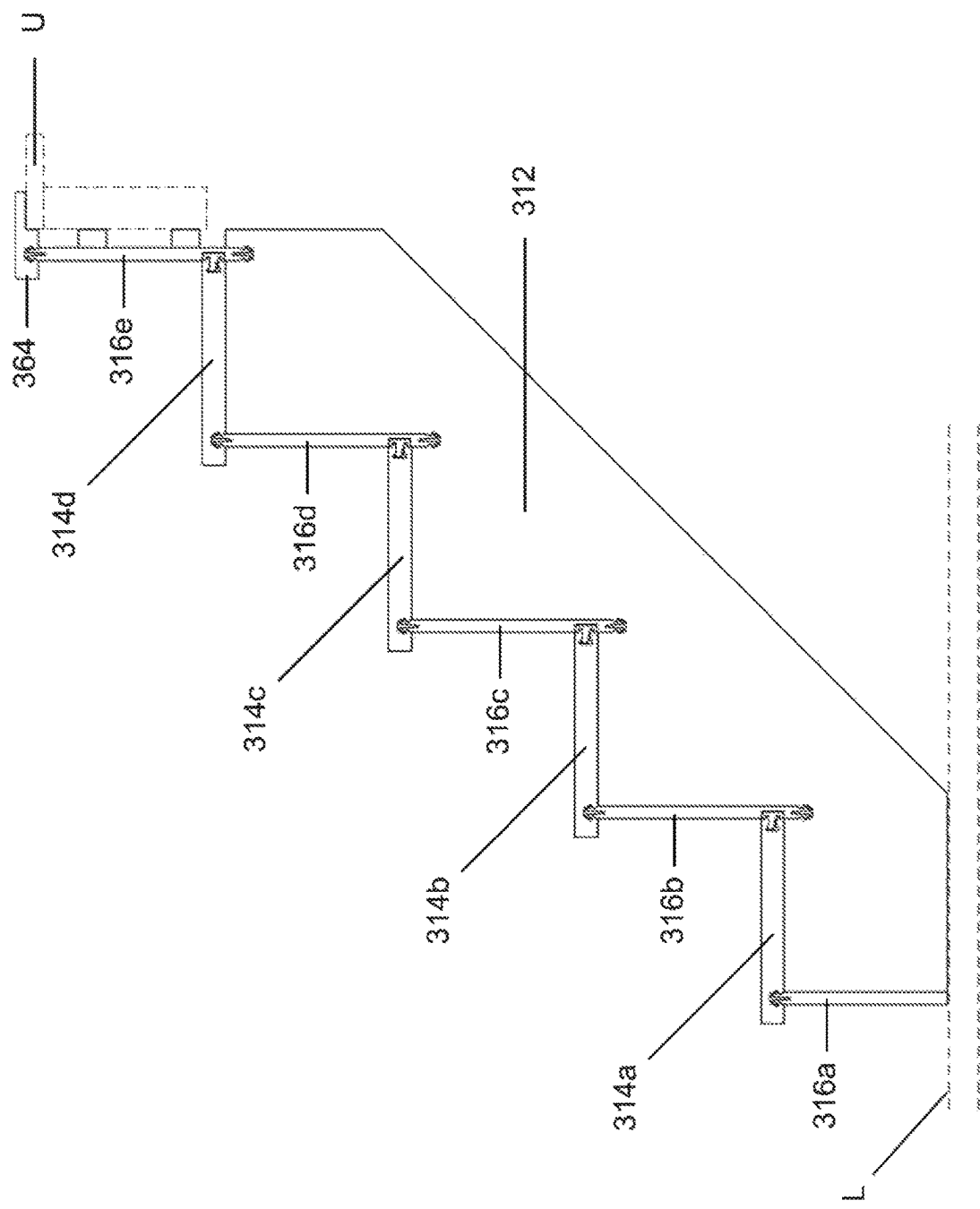

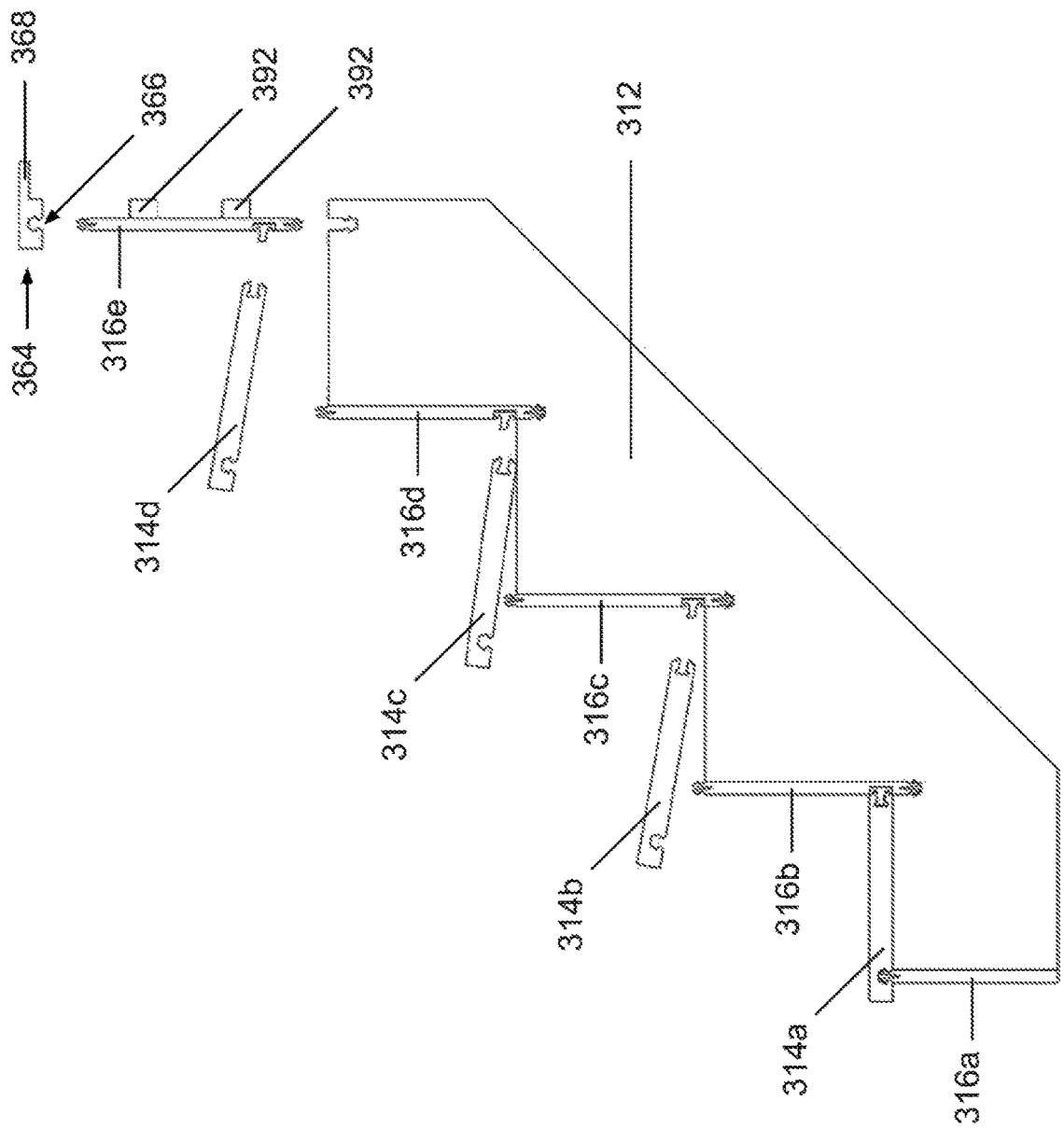

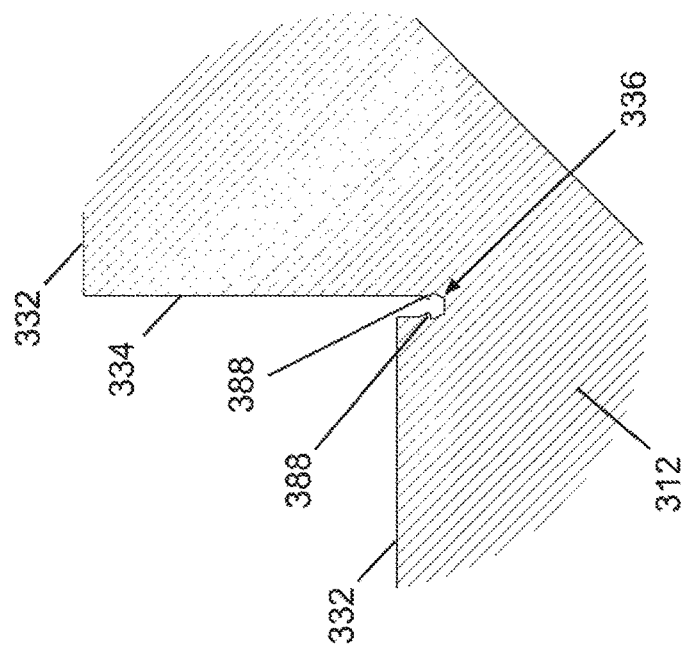
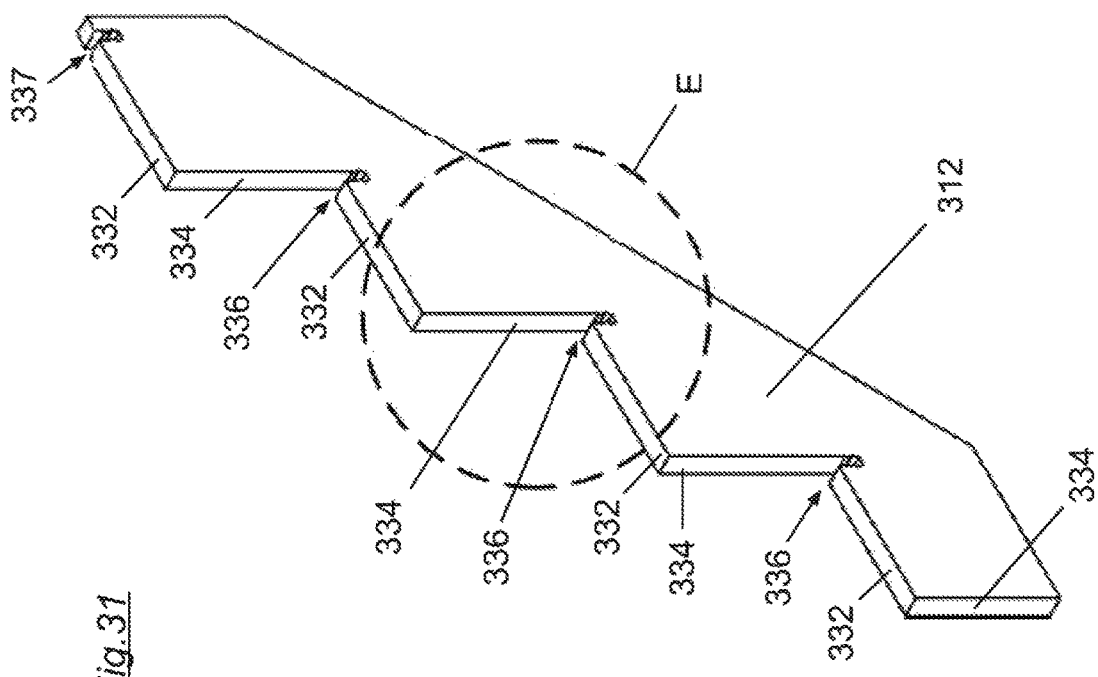
Fig.32
Fig.31

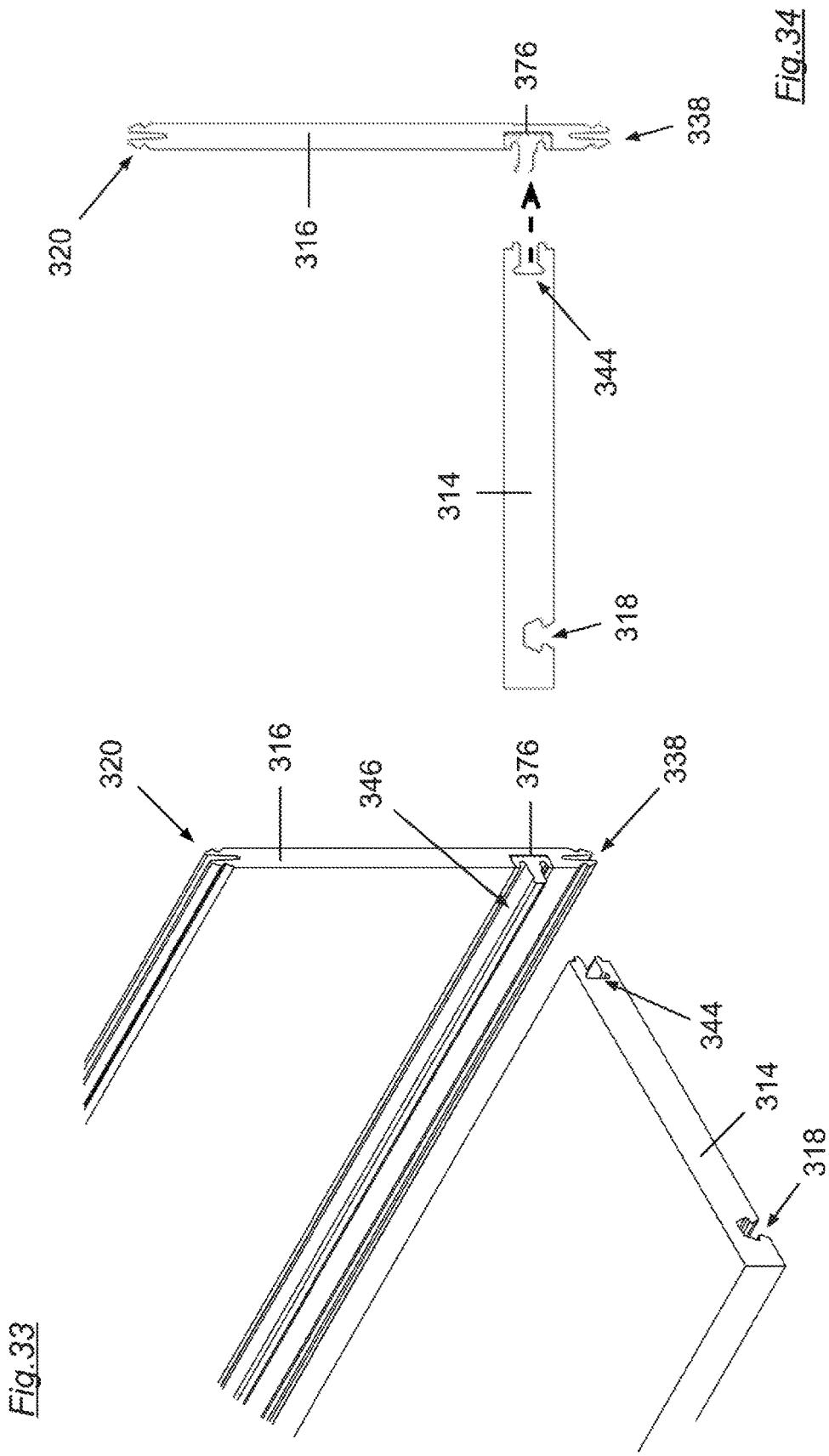

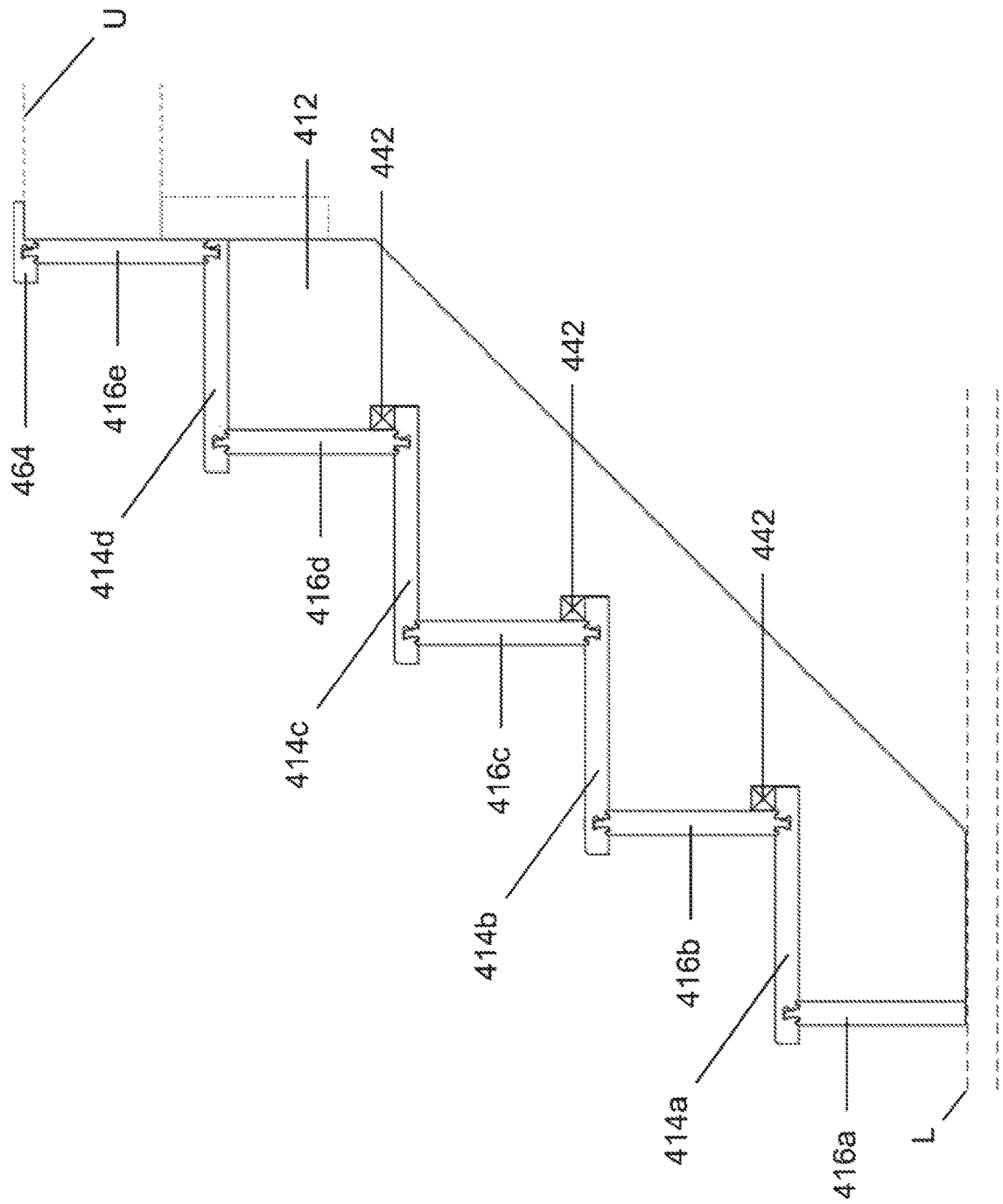

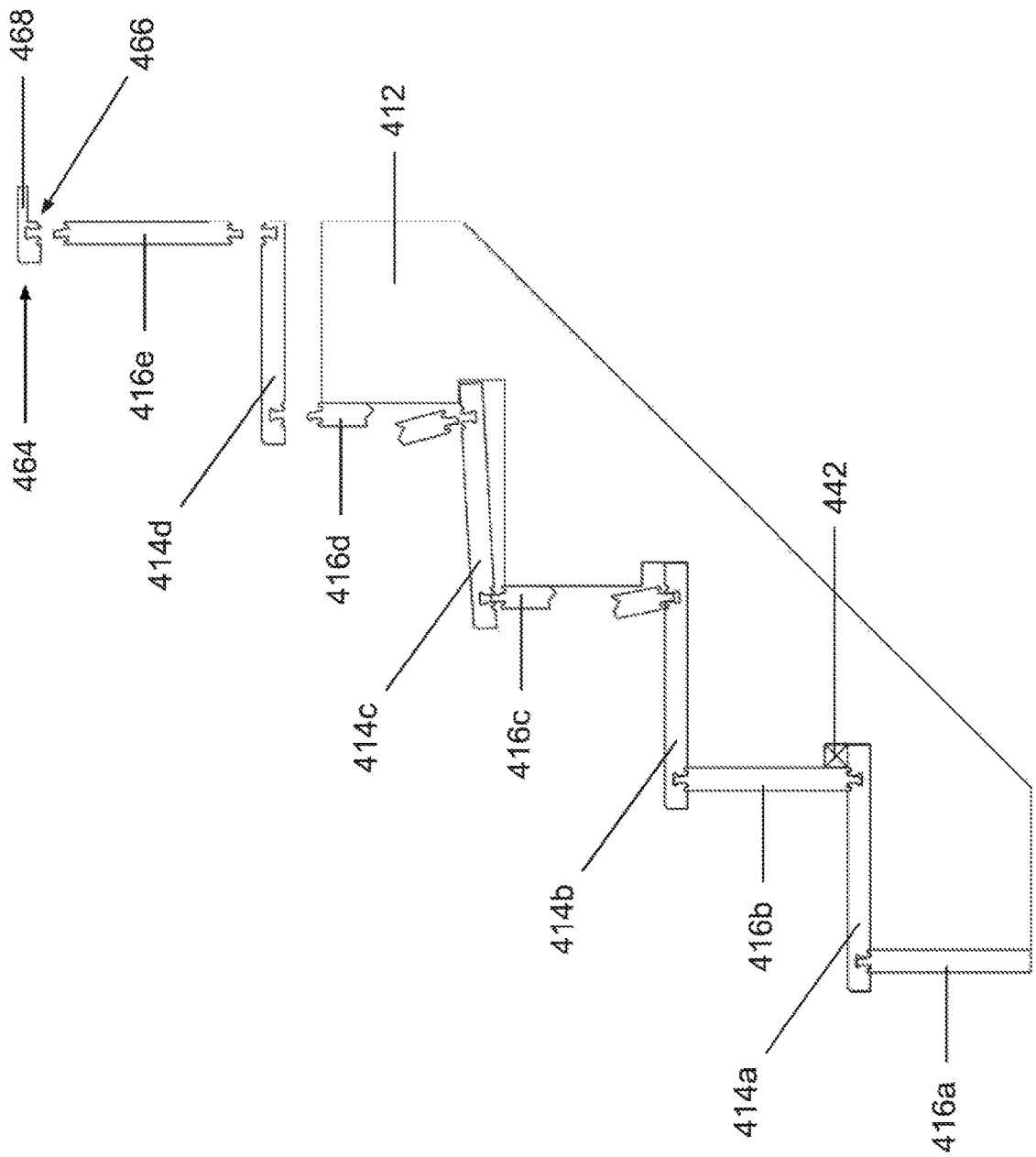

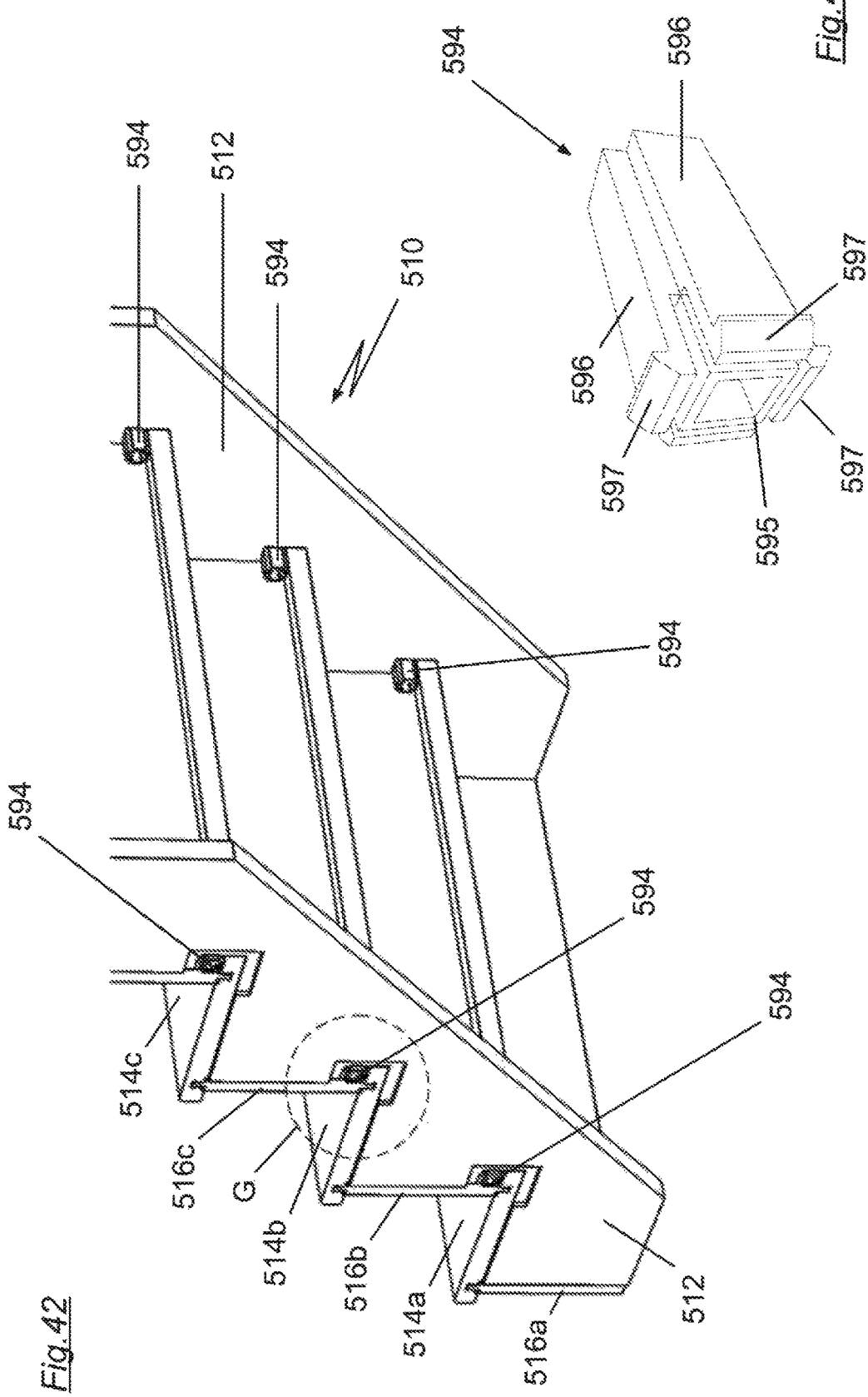

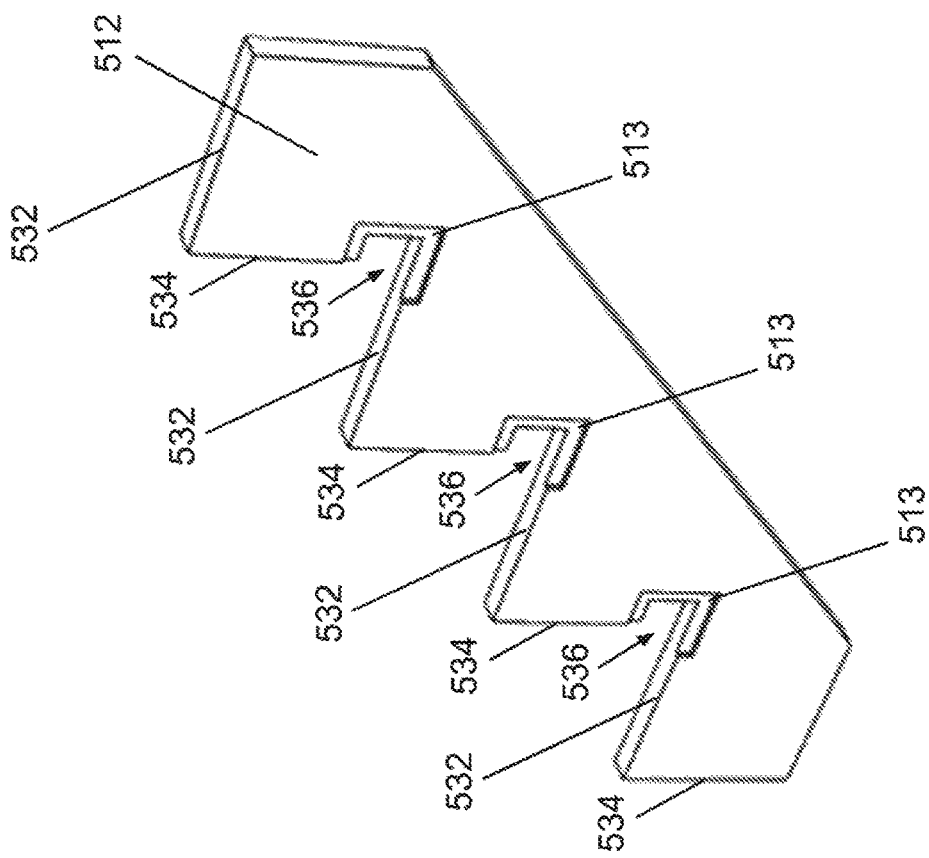
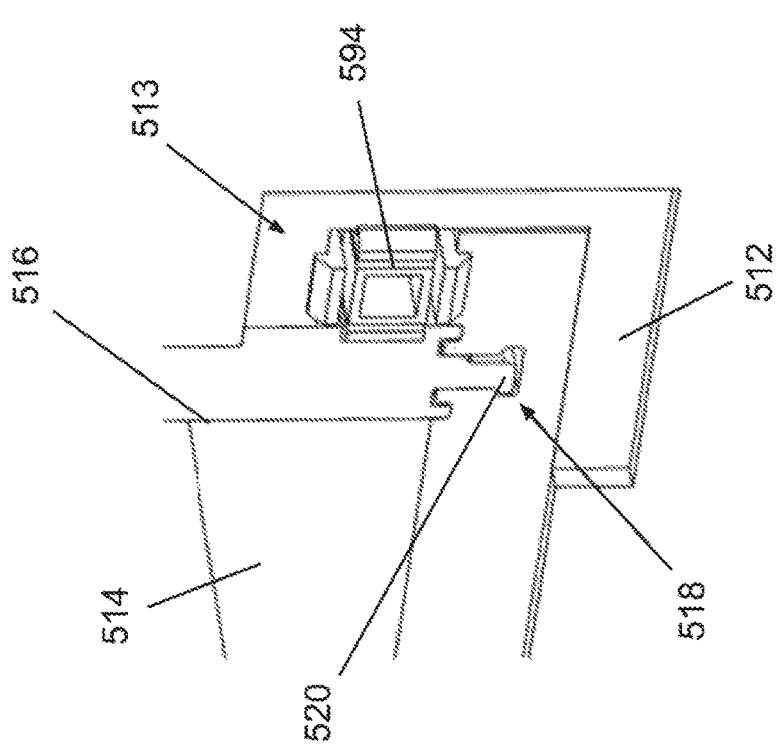
Fig.44
Fig.45

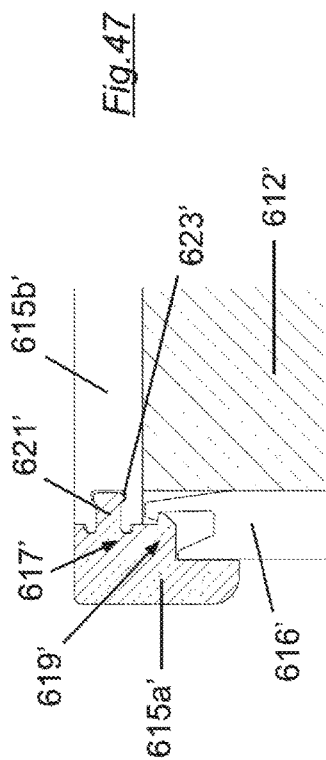
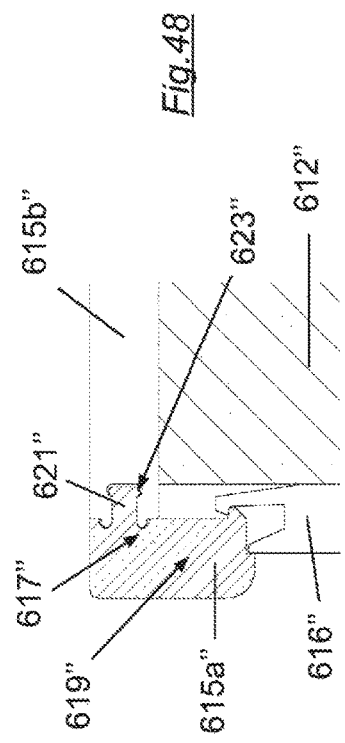
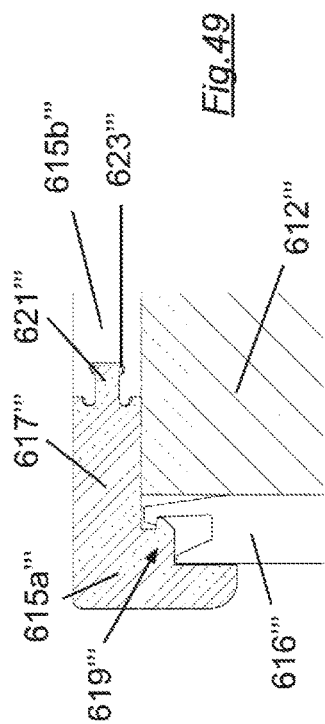
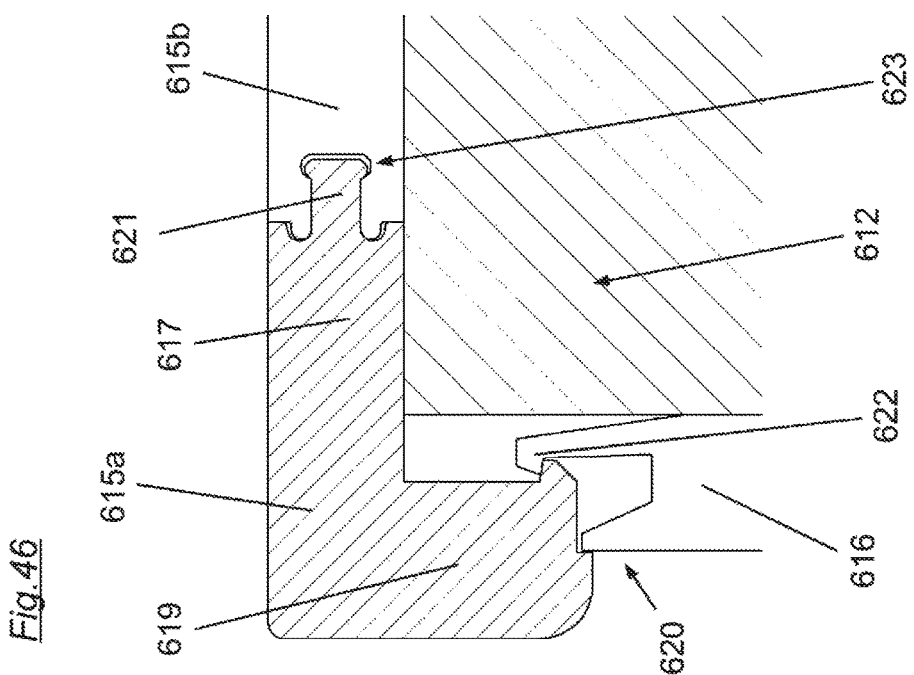

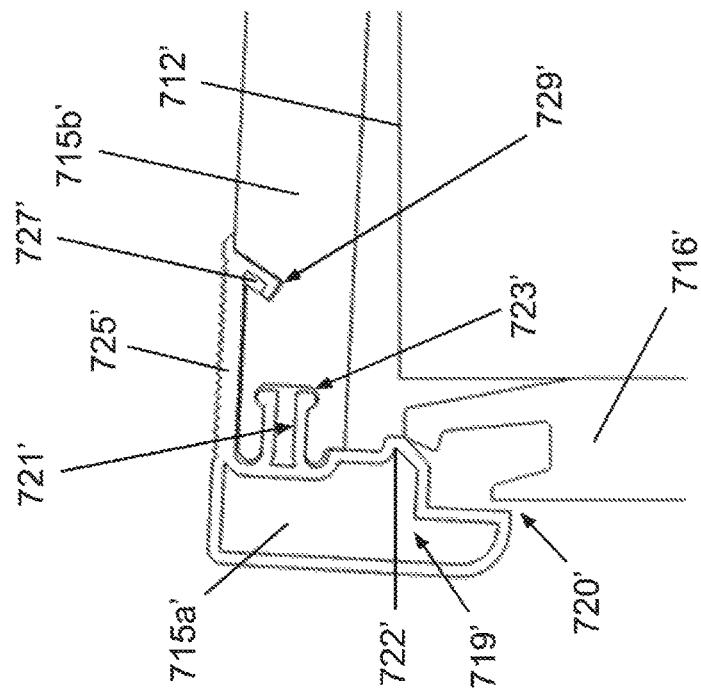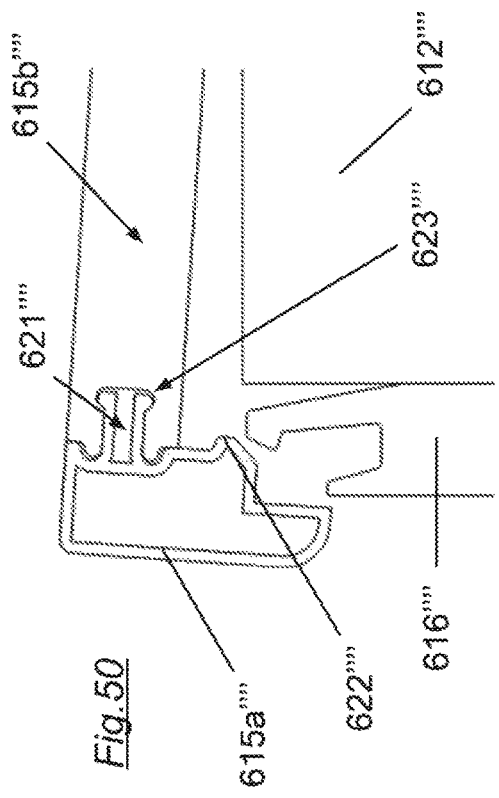

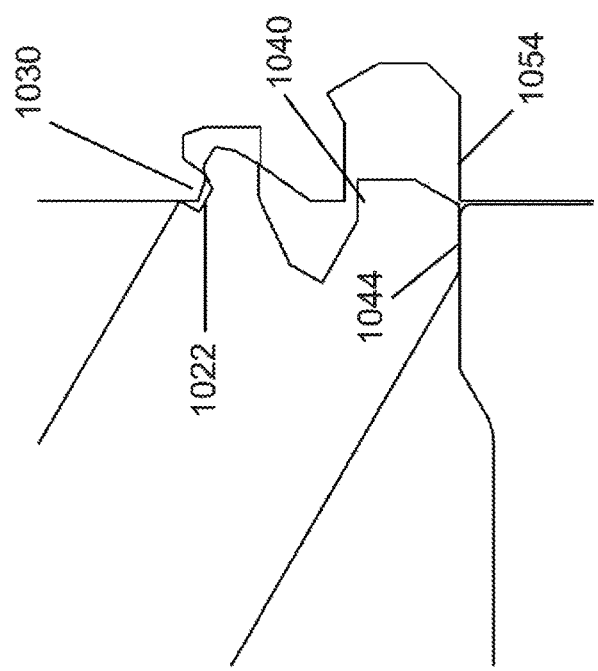
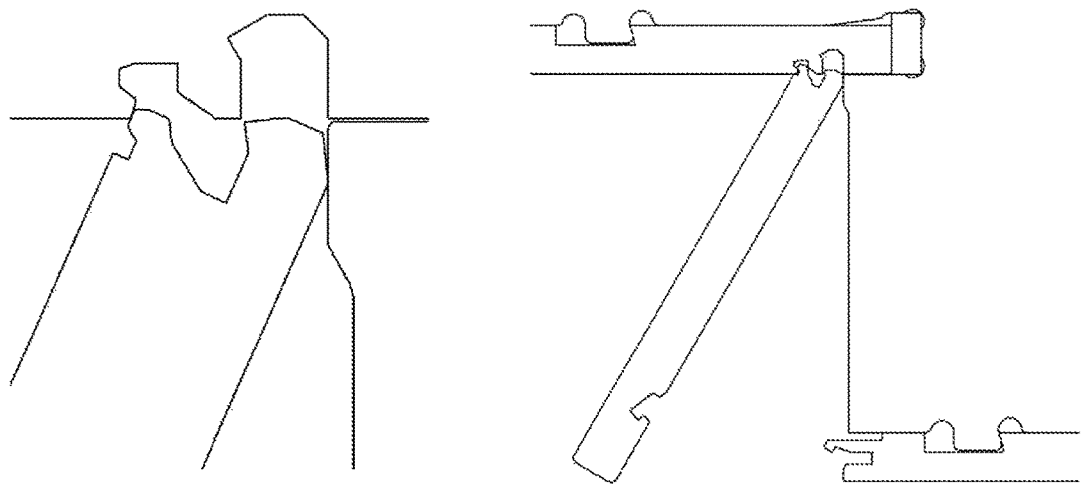

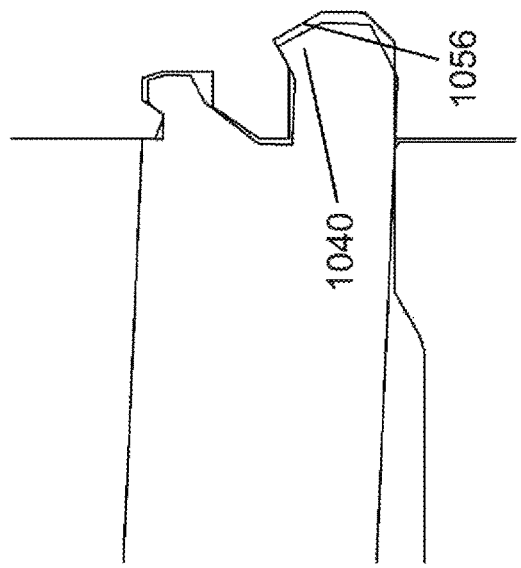
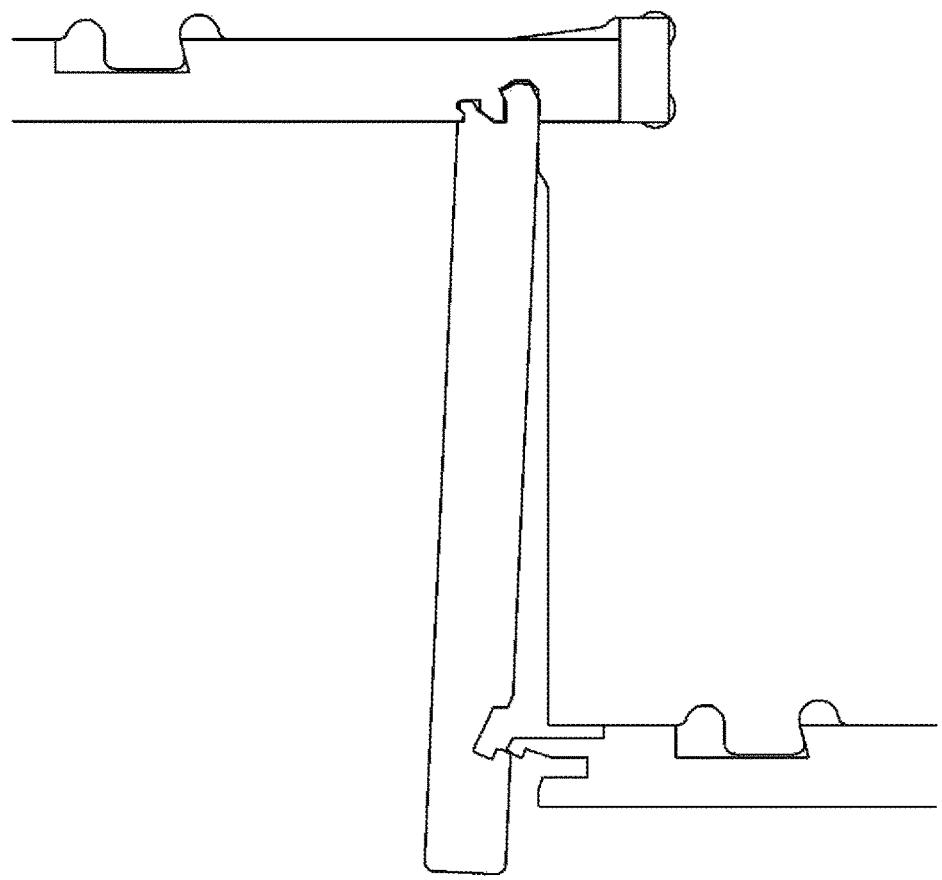

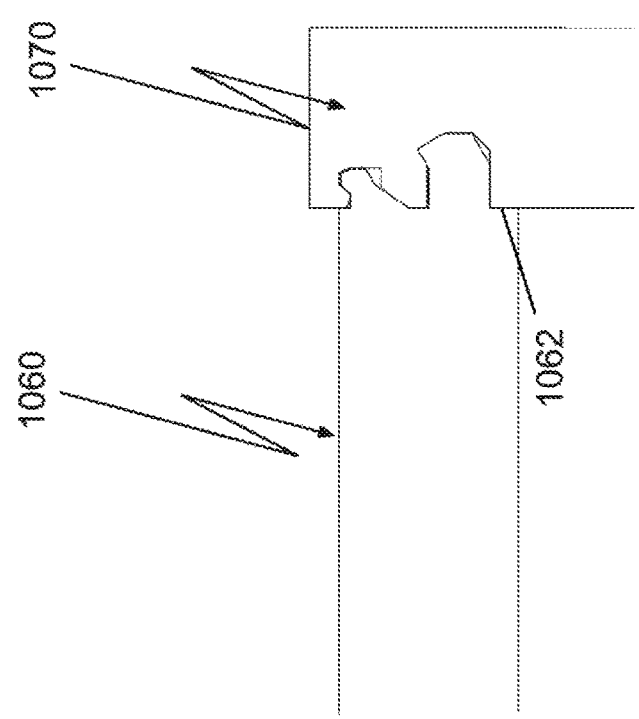
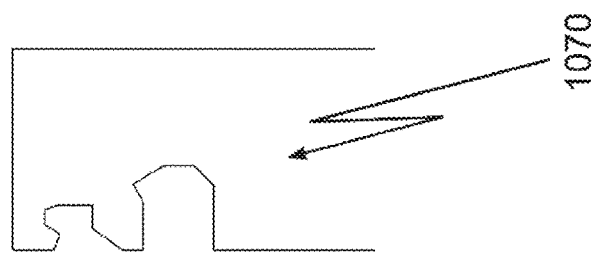
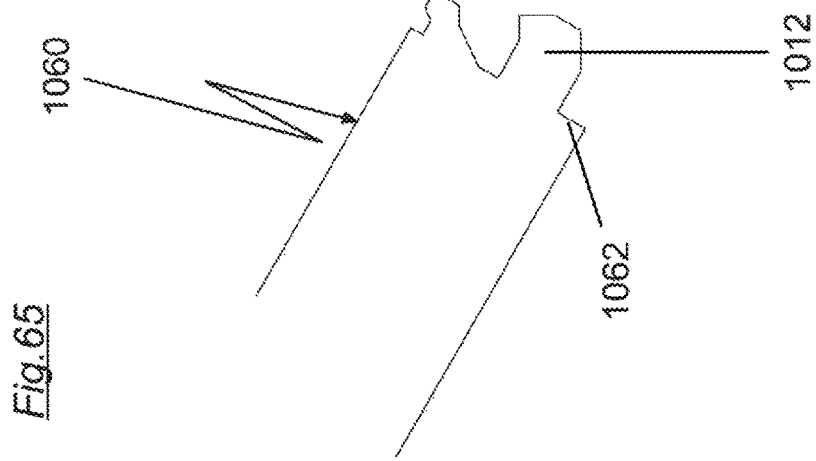

STAIR CASE

CROSS REFERENCE TO RELATED APPLICATIONS

This application is related to International Patent Application No. PCT/AU/2013/000955, Australian Provisional Patent Application No. 2014900648, and Australian Provisional Patent Application No. 2014902148, all of which are entitled "A Stair Case" and filed in the name of Quicksmart Stairs International Pty Ltd, the entire contents of which are incorporated herein by reference.

FIELD OF THE INVENTION

The present invention relates to a stair case, and to a method of constructing a stair case. The present invention in another aspect relates to a connection between stair case components and having broader application to connecting two panels in transverse relation.

BACKGROUND

Traditional stair cases may be constructed by firstly installing stringers, and then installing treads and risers alternately along the length of the stair case. The stingers have wedge shaped rebates for each tread and each riser. Once each tread/riser has been located in the stringers, wedges are driven into the rebates to hold the respective tread or riser in position. Furthermore, glue is used to secure the treads, risers and wedges to the stringers. In some instances, fasteners can be used to secure the bottom of risers to the toe of treads.

It is also common to glue a block between the stringers, and beneath each tread and behind the riser immediately below that tread. This block helps to minimize relative movement between the tread and riser, which is a cause of "squeaking" when a person steps on the tread.

For convenience, it is common to start installation of a treads and risers of the stair case with top most tread, and work down to the lower most riser, with the installer positioned beneath the stair case. This gives rise to several problems. Often the installer is initially working above their head height. When finishing the installation, the installer is working in a confined space at ground level. In addition, the installer is required to use large quantities of glue, which can be messy and unpleasant to work with. This type of stair case assembly is labour intensive, and time consuming.

There is a need to address the above, and/or at least provide a useful alternative.

SUMMARY OF THE INVENTION

The present invention provides a stair case comprising:
one or more stringers;
treads;
risers, the treads and/or risers being supported on the stringers;
first connecting elements, each tread having at least one of the first connecting elements provided at an under surface that tread; and
second connecting elements that are each provided to a respective one of the risers, wherein the first and second connecting elements are interconnected to secure each tread to one of the risers, and wherein at least one of the first and second connecting elements being integrally formed in the respective treads and risers.

Preferably, in at least some of the treads the first connecting elements are integrally formed in the respective treads, and in at least some of the risers the second connecting elements are integrally formed in the respective risers.

In at least some embodiments, the first connecting elements include a recess within which at least one first bead is provided, and the second connecting elements include a projection with at least one second bead, wherein the recess and projection are configured such that when first and second connecting elements are interconnected the second bead is located deeper within the recess relative to the first, bead.

The projection can be resiliently deflectable, such that the projection deflects during interconnection of the first and second connecting elements. Alternatively, the recess has a width that enables the projection to be inserted into the recess in a first direction, and the respective tread translated in a second direction that is non-parallel with the first direction during interconnection of the first and second connecting elements.

In certain embodiments, each recess includes a groove formation that extends parallel to the nose of the respective tread, and each projection includes a tongue formation that extends transversely along an upper edge of the risers.

Preferably, the first bead is provided at the rim of the groove formation. More preferably, the second bead is provided adjacent a distal edge of the tongue formation.

The second connecting elements can also include a ridge that is to bear against the under surface of the tread having the interconnected first connecting element.

In certain embodiments, each stringer has:
a plurality of tread supporting faces,
a plurality of riser abutment faces, and
rebate sections that are each formed between the bottom edge of each riser abutment face and the adjacent tread supporting face, each rebate section being configured to receive the bottom edge of one of the risers.

In such embodiments, the stair case can further comprise third connecting elements that are each provided to one of the risers, and fourth connecting elements that are each provided to one of the riser abutment faces, wherein the third and fourth connecting elements are interconnected to secure each of the risers to the stringers.

The third connecting elements can be integrally formed in the risers. Alternatively or additionally, the fourth connecting elements can be integrally formed in the stringers.

Preferably, the third connecting elements extend transversely along at least a portion of the respective riser. More preferably, the third connecting elements extend transversely along the entire width of the respective riser.

The stair case can further comprise fifth connecting elements that are each provided to one of the risers, and sixth connecting elements that are each provided to the toe of one of the treads, wherein the fifth and sixth connecting elements are interconnected to secure the toe of each of the treads to one of the risers.

The fifth connecting elements can be integrally formed in the front face of the risers. Alternatively, the front face of the risers includes a recess, and the fifth connecting elements are secured in the recess.

The sixth connecting elements can be integrally formed in the treads.

Preferably, the fifth connecting elements extend transversely along at least a portion of the respective riser. More preferably, the fifth connecting elements extend transversely along the entire width of the respective riser.

Preferably, the sixth connecting elements extend transversely along at least a portion of the respective tread. More preferably, the sixth connecting elements extend transversely along the entire width of the respective tread.

Preferably, each third connecting element is formed on a respective one of the riser abutment faces between the rebate section and the adjacent tread supporting face, and each fourth connecting element is provided on the rear face of the respective riser.

Preferably, the third and fourth connecting elements are interconnected by the respective riser being translated along the respective riser abutment face. In some embodiments, the third and fourth connecting elements have complementary overlapping formations, which inhibit separation of the riser and stringer when the third and fourth connecting elements are interconnected.

The third connecting elements can each be in a projection, and the fourth connecting elements can each be a recess. In some embodiments, the projection of each third connecting element can have a generally rhomboid shaped cross section, and the recess of each fourth connecting element can also have a generally rhomboid shaped cross section. In one example, the recess of the fourth connecting elements can each be a channel with a generally rhomboid shaped cross section that extends at least part of the length of the respective riser.

In such embodiments, the stair case further comprises a plurality of tapered spacing elements that are each inserted between the stringer and one of the risers to urge the third and fourth connecting elements into interconnection. In some instances, the spacing elements are inserted into the rebate section. In some alternative instances, the spacing elements are inserted between the third and fourth connecting elements.

The spacing elements are preferably inserted transversely, with the narrower end of each spacing element being oriented towards the adjacent lateral edge of the stair case.

In some alternative embodiments, each of the third connecting elements includes at least one third bead that is provided within the rebate section, and each of the fourth connecting elements includes a tongue such that, when the third and fourth connecting elements are interconnected, the tongue engages with the at least one third bead to inhibit separation of the respective riser and stringer. The at least one third bead can be integrally formed on the respective stringer.

Preferably, each third connecting element includes a pair of third beads on opposing faces of the rebate section, and the tongue of each fourth connecting element is split to define a pair of tines with a gap therebetween. Preferably, each tine has an outwardly directed fourth bead that engages with the pair of beads within the rebate section.

Preferably, each of the tines further has a tapered shoulder, wherein when the third and fourth connecting elements are interconnected, the tapered shoulders bear against the pair of third beads within the rebate section.

In certain embodiments, at least some of the fifth connecting elements include a fifth tongue that projects from the toe edge of the tread, the fifth tongue having a fifth bead, and at least some of the sixth connecting elements include a channel that receives the fifth tongue, the channel includes a pocket formation and wherein the fifth bead locates within the pocket formation when the fifth and sixth connecting elements are interconnected.

In certain embodiments, at least some of the sixth connecting elements include a sixth tongue that projects from the toe edge of the tread, the sixth tongue having a sixth bead, and at least some of the fifth connecting elements include a channel that receives the sixth tongue, the channel includes a pocket formation and wherein the sixth bead locates within the pocket formation when the fifth and sixth connecting elements are interconnected.

Preferably, the channel has a width such that the fifth tongue can be partially inserted into the fifth channel when the respective tread is inclined at an acute angle relative to the respective riser. In such embodiments, the fifth and sixth connecting elements are interconnected by a pivoting action of the respective tread and riser.

Each fifth connecting element can further include an upper rib that is adjacent the upper surface of the respective tread, and each sixth connecting element can further include an upper secondary groove, wherein the upper rib locates within the upper secondary groove when the fifth and sixth connectors are interconnected.

In certain embodiments, each fifth connecting element further includes a lower rib that is adjacent the under surface of the respective tread, and each sixth connecting element can further include a lower secondary groove, wherein the lower rib locates within the lower secondary groove when the fifth and sixth connectors are interconnected.

In certain alternative embodiments, each stringer has:
a plurality of tread supporting faces,
a plurality of riser abutment faces, and
rebate sections that are each formed between the bottom edge of each riser abutment face and the adjacent tread supporting face, each rebate section being configured to receive the toe of one of the treads.

In such embodiments, the stair case can further comprise third connecting elements that are each provided to one of the treads, and fourth connecting elements that are each provided to one of the tread supporting faces, wherein the third and fourth connecting elements are interconnected to secure each of the treads to the stringers.

The third connecting elements can be integrally formed in the treads. Alternatively or additionally, the fourth connecting elements can be integrally formed in the stringers.

Preferably, the third connecting elements extend transversely along at least a portion of the respective tread. More preferably, the third connecting elements extend transversely along the entire width of the respective tread.

The stair case can further comprise fifth connecting elements that are each provided to the bottom edge of one of the risers, and sixth connecting elements that are each provided to one of the treads, wherein the fifth and sixth connecting elements are interconnected to secure the bottom edge of each of the risers to one of the treads.

Preferably, the fifth connecting elements extend transversely along at least a portion of the respective riser. More preferably, the fifth connecting elements extend transversely along the entire width of the respective riser.

The sixth connecting elements can be integrally formed in the upper surface of the treads.

In some embodiments, the third connecting elements each include a first transverse ridge formed on the upper surface of the respective tread, and a transverse channel formed in the under surface of the respective tread; and the fourth connecting elements each include a second transverse ridge formed in each of the tread supporting faces, whereby, when the third and fourth connecting elements are interconnected, the first transverse ridge bears against one of the riser abutment faces, and the second transverse ridge is located within the transverse channel such that the second transverse ridge bears against the respective tread, and whereby the first and second transverse ridges co-operate to inhibit translational movement, of the respective tread parallel to the respective tread supporting face.

Preferably, for at least some of the treads, the under surface at the toe of the tread has a convex arcuate surface, and the rebate sections have a complementary arcuate concave surface, whereby the respective tread can be installed on the stringers by inclining the tread relative to the respective tread supporting face, inserting the toe of the tread into the respective rebate section, and pivoting the tread about the toe, which interconnects the third and fourth coupling elements.

In some alternative embodiments, each of the third connecting elements includes a tongue, and each of the fourth connecting elements includes at least one fourth bead that is formed within the rebate section, wherein when the third and fourth connecting elements are interconnected, the tongue engages with the at least one fourth bead to inhibit separation of the respective tread and stringer.

Preferably, the tongue of each third connecting element is split to define a pair of tines with a gap therebetween, and each fourth connecting element includes a pair of fourth beads on opposing faces of the rebate section. Preferably, each tine has an outwardly directed third head that each engages one of a pair of fourth beads within the rebate section.

Preferably, each of the tines further has a tapered shoulder, wherein when the third and fourth connecting elements are interconnected, the tapered shoulders bear against the pair of fourth beads within the rebate section.

The fifth connecting elements can be integrally formed in the upper surface of the treads. In certain embodiments, at least some of the fifth connecting elements include a fifth channel with a pocket formation.

At least some of the sixth connecting elements include a sixth tongue that projects from the bottom edge of the risers, the sixth tongue having a hooked end, wherein when the fifth and sixth connecting elements are interconnected the sixth tongue locates within the channel such that at least a portion of the hooked end is positioned within the pocket formation.

Preferably, the channel has a width such that the sixth tongue can be partially inserted into the fifth channel when the respective riser is inclined at an acute angle relative to the respective tread. In such embodiments, the fifth and sixth connecting elements are interconnected by a pivoting action of the respective tread and riser.

Each sixth connecting element can further include front rib that is adjacent the front face of the respective riser, and each fifth connecting element can further include an fore groove, wherein the front rib locates within the fore groove when the fifth and sixth connectors are interconnected.

In certain embodiments, each sixth connecting element further includes a rear rib that is adjacent the rear face of the respective riser, and each fifth connecting element can further include an aft groove, wherein the rear rib locates within the aft groove when the fifth and sixth connectors are interconnected.

The stair case can further comprise a nosing piece that includes a connecting element that locates on the second connecting element of the uppermost riser. The connecting element of the nosing piece can be at least substantially similar to the first connecting element. Preferably, the nosing piece includes a tail member that projects rearwardly of the rear surface of the uppermost riser.

The present invention also provides a method of constructing a stair case, the method involving:

providing one or more stringers;
attaching the stringers to one or more supporting structures;
providing treads that each have a first connecting element provided an under surface of that tread;
providing risers that have second connecting elements;
installing the treads and risers on the stringers; and
interconnecting the first and second connecting elements to secure each tread to one of the risers,
wherein at least one of the first and second connecting elements being integrally formed in the respective treads and risers.

According to yet another aspect of the invention, there is provided a stair case comprising one or more stringers, treads, risers, the treads and/or risers being supported on the stringers, and a connection between a rear end of respective treads and a lower end of adjacent risers, wherein the connection comprises upper and lower tongues at the rear edge of the tread, and upper and lower channels in the riser for engagement by the upper and lower tongues respectively, the upper tongue and upper channel being configured such that when the upper tongue is engaged with the upper channel the engagement forms a fulcrum about which the tread can pivot to force the lower tongue into the lower channel with leverage, the lower tongue being an interference fit within the lower channel and the pivoting of the tread about the fulcrum being capable of exerting a leveraged force sufficient to overcome the resistance between the lower tongue and lower channel during insertion and, in the fully engaged condition of the lower tongue in the lower channel, the lower tongue is held within the lower channel with a tight frictional grip between opposed parts of the lower channel as a consequence of the interference fit.

The connection defined above between the tread and riser also has utility in a wider range of applications where it is required to connect two panels in transverse relation, examples being furniture construction and building construction.

Accordingly, according to yet another aspect of the invention there is provided a connection between two panels to retain a first panel transverse to a second panel, wherein the connection comprises first and second tongues at an edge of the first panel, and first and second channels in the second panel for engagement by the first and second tongues respectively, the first tongue and first channel being configured such that when the first tongue is engaged with the first channel the engagement forms a fulcrum about which the first panel can pivot to force the second tongue into the second channel with leverage, the second tongue being an interference fit within the second channel and the pivoting of the first panel about the fulcrum being capable of exerting a leveraged force sufficient to overcome the resistance between the second tongue and second channel during insertion and, in the fully engaged condition of the second tongue in the second channel, the second tongue is held within the second channel with a tight frictional grip between opposed parts of the second channel as a consequence of the interference fit.

BRIEF DESCRIPTION OF THE DRAWINGS

In order that the invention may be more easily understood, embodiments will now be described by way of example only with reference to the accompanying drawings, in which:

FIG. 1 is a front perspective view of a stair case according to a first embodiment of the present invention;

FIG. 2 is a partial rear perspective view of the stair case of FIG. 1;

FIG. 3 is a side elevation view of the stair case of FIG. 1;

FIG. 4 is a side elevation view of the stair case of FIG. 1 in a partially assembled state;

FIG. 7 is a partial perspective view of a stair tread and riser of the stair case of FIG. 1;

FIG. 8 is a side view of the stair tread and riser of FIG. 7;

FIG. 9 is an enlarged view of region B in FIG. 2;

FIG. 10 is an isometric view of a stair case according to a second embodiment of the present invention;

FIG. 11 is a side elevation view of the stair case of FIG. 10;

FIG. 12 is a side elevation view of the stair case of FIG. 10 in a partially assembled state;

FIG. 13 is an isometric view of a stringer of the stair case of FIG. 10;

FIG. 14 is an enlarged view of region C of the stringer of FIG. 13;

FIG. 15 is a partial perspective view of an intermediate stair tread and riser of the stair case of FIG. 10;

FIG. 16 is a side view of the intermediate stair tread and riser of FIG. 15;

FIG. 17 is a partial perspective view of a topmost stair tread and riser of the stair case of FIG. 10;

FIG. 18 is a side view of the topmost stair tread and riser of FIG. 17;

FIG. 19 is a perspective view of a stair case according to a third embodiment of the present invention;

FIG. 20 is a side elevation view of the stair case of FIG. 19;

FIG. 21 is a side elevation view of the stair case of FIG. 19 in a partially assembled state;

FIG. 22 is an isometric view of a stringer of the stair case of FIG. 19;

FIG. 23 is an enlarged view of region D of the stringer of FIG. 22;

FIG. 24 is a partial perspective view of an intermediate stair tread and riser of the stair case of FIG. 19;

FIG. 25 is a side view of the intermediate stair tread and riser of FIG. 24;

FIG. 26 is a partial perspective view of a topmost stair tread and riser of the stair case of FIG. 19;

FIG. 27 is a side view of the topmost stair tread and riser of FIG. 26;

FIG. 28 is a perspective view of a stair case according to a fourth embodiment of the present invention;

FIG. 29 is a side elevation view of the stair case of FIG. 28;

FIG. 30 is a side elevation view of the stair case of FIG. 28 in a partially assembled state:

FIG. 31 is an isometric view of a stringer of the stair case of FIG. 28;

FIG. 32 is an enlarged view of region E of the stringer of FIG. 31;

FIG. 33 is a partial perspective view of a stair tread and riser of the stair case of FIG. 28;

FIG. 34 is a side view of the stair tread and riser of FIG. 6;

FIG. 36 is a side elevation view of the stair case of FIG. 35;

FIG. 37 is a side elevation view of the stair case of FIG. 35 in a partially assembled state;

FIG. 42 is a partial rear perspective view of a stair case according to a sixth embodiment of the present invention;

FIG. 43 is a perspective we of one of the locking elements of the stair case of FIG. 42;

FIG. 44 is an enlarged view of region G of the stair case of FIG. 42;

FIG. 45 is a perspective view of a stringer of the stair case of FIG. 42;

FIG. 46 is a partial side view of a first implementation of a tread nose segment, tread toe segment, a riser and stringer according to a seventh embodiment:

FIG. 47 is a partial side view of a second implementation of tread nose segment, tread toe segment, a riser and stringer according to the seventh embodiment;

FIG. 48 is a partial side view of a third implementation of tread nose segment, tread toe segment, a riser and stringer according to the seventh embodiment;

FIG. 49 is a partial side view of a fourth implementation of tread nose segment, tread toe segment, a riser and stringer according to the seventh embodiment;

FIG. 50 is a partially assembled side view of a fifth implementation of tread nose segment, tread toe segment, a riser and stringer according to the seventh embodiment;

FIG. 51 is a partially assembled side view of a first implementation of tread nose segment, tread toe segment, a riser and stringer according to an eighth embodiment;

FIG. 52 is a partially assembled side view of a second implementation of tread nose segment, tread toe segment, a riser and stringer according to the eighth embodiment;

FIG. 58, 58A; FIG. 59, 59A; FIG. 60, 60A.

FIG. 65 shows the applicability of the connection of FIG. 57 in the connection of other panels in transverse relation; and FIG. 66 shows the panels of FIG. 63 when connected.

DETAILED DESCRIPTION

Figure 6:
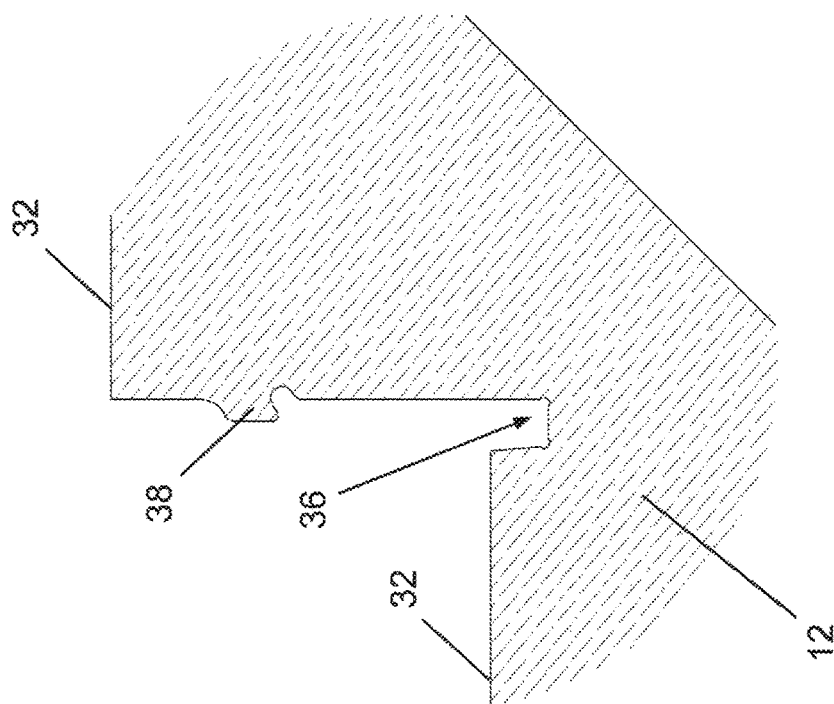
FIG. 6 is an enlarged view of region A of the stringer of FIG. 5.

FIGS. 1 to 9 show a stair case 10 according to a first embodiment. The stair case 10 has a pair of spaced apart stringers 12, treads 14 that are supported on the stringers 12, and risers 16. As indicated in FIG. 3, the stair case 10 extends from a lower datum level L to an upper datum level U.

In the example illustrated in FIG. 1, the stair case 10 has four treads 14a, 14b, 14c, 14d, which are hereinafter referred to collectively as "treads 14", unless the context indicates otherwise. Further, in the example illustrated in FIG. 1, the stair case 10 has five risers 16a, 16b, 16c, 16d, 16e, which are hereinafter referred to collectively as "risers 16", unless the context indicates otherwise. In this example, riser 16a is the lowermost riser in the stair case 10, and riser 16e is the uppermost riser in the stair case 10.

The stair case 10 has first connecting elements 18 and second connecting elements 20. Each tread 14 has one of the first connecting elements 18 provided at an under surface of that tread 14. The second connecting elements 20 are each provided to one of the risers 16.

At least one of the first and second connecting elements 18, 20 is integrally formed in the respective treads 14 and risers 16. In this embodiments, both the first and second connecting elements 18, 20 are integrally formed in the respective treads 14 and risers 16.

The first and second connecting elements 18, 20 of this embodiment are shown in further detail in FIGS. 7 and 8. The first connecting elements 18 each include at recess, which in this embodiment is in form of a groove 22 within which at least one first bead 24 is provided. The groove 22 extends parallel to the nose of the respective tread 14. The first bead 24 is provided at the rim of the groove 22, and hence is immediately adjacent the under surface of the tread 14.

The second connecting elements 20 each include a projection, which in this embodiment is in the form of a tongue 26 that extends transversely along an upper edge of the respective riser 16. The tongue 26 further has a second bead 28, which is provided adjacent a distal edge of the tongue 26. The groove 22 and tongue 26 are configured such that when first and second connecting elements 18, 20 are interconnected, the second head 28 is located deeper within the groove 22 relative to the first bead 24. Thus, when first and second connecting elements 18, 20 are interconnected, the first and second beads 24, 26 co-operate to inhibit disconnection of the interconnected first and second connecting elements 18, 20 (and thus also the interconnected tread 14 and riser 16).

The tongue 26 is resiliently deflectable, such that the tongue 26 deflects during interconnection of the first and second connecting elements 18, 20. Further, the stair case 10 can be configured such that when the stair case is assembled, the tongue 26 is deflected from a neutral position and urges the tread 14 of the interconnected second connecting element 20 in a direction parallel to the upper surface of that tread 14.

The second connecting elements 20 also include a ridge 30 that is to be adjacent the under surface of the tread 14 having the interconnected first connecting element 18. As shown in FIG. 3, the ridge 30 supports the nose of the tread 14 immediately above the respective riser 16.

Figure 5:
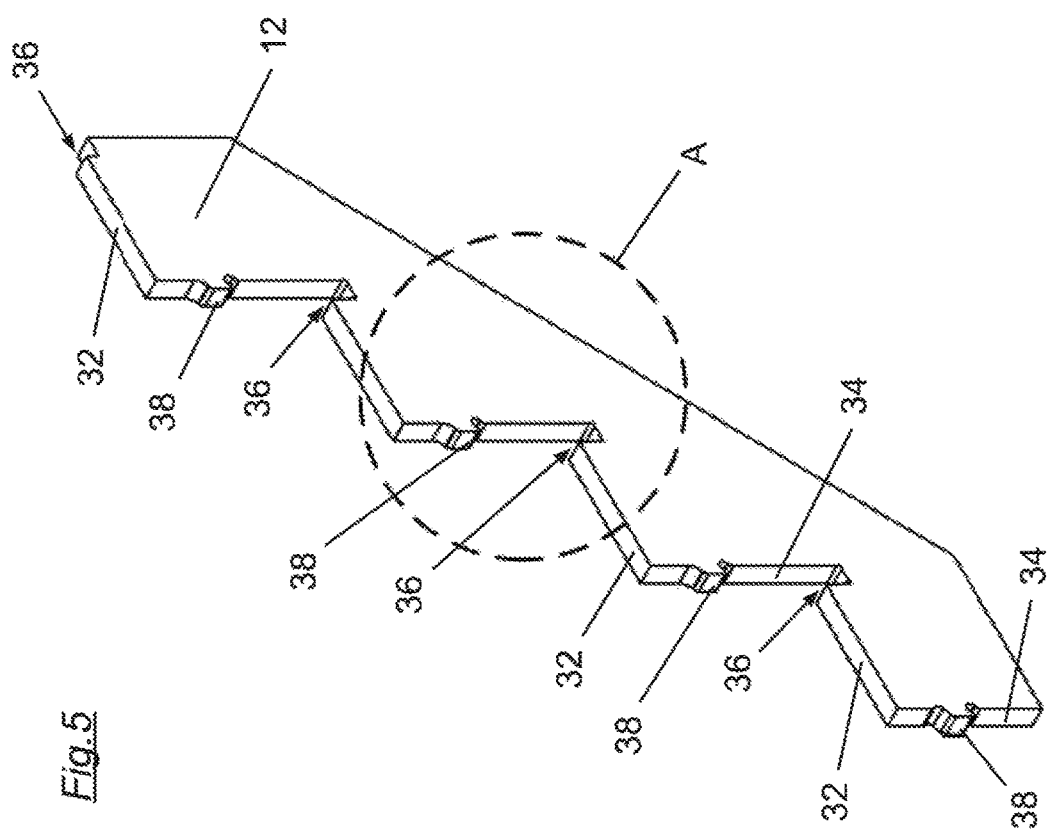
FIG. 5 is an isometric view of a stringer of the stair case of FIG. 1.

FIGS. 5 and 6 show one of the stringers 12 in further detail. Each stringer 12 has tread supporting faces 32 and riser abutment faces 34. Further, each stringer 12 has rebates 36 that are each formed between the bottom edge of each riser abutment face 34 and the adjacent tread supporting face 32. Each rebate 36 is configured to receive the bottom edge of one of the risers 16b to 16d In this particular stair case 10, the bottom edge of the lowermost, riser 16a abuts the lower level L. Further, the bottom edge of the uppermost riser 16e also locates in a rebate 36 at the upper end of the stringer 12. Each rebate 36 has a tapered profile, when viewed in cross section. To this end, the side surfaces of the rebate 36 (which are not parallel to the tread supporting surface 32) are oblique with respect to each other. In one example, the forward side surface of each rebate 36 is inclined, such that the width of each rebate 36 decreases with increasing depth into the respective rebate 36. In an alternative example, the rear side surface of each rebate 36 is inclined, such that the width of each rebate 36 increases with increasing depth into the respective rebate 36. The tapering of the rebates 36 facilitates installation of the riser 16 into the rebates 36.

The stair case 10 has third connecting elements 38 that are each provided to the rear surface of one of the risers 16, and fourth connecting elements 40 that are each provided to one of the riser abutment faces 34. The third and fourth connecting elements 38, 40 are to be interconnected to secure each of the risers 16a to 16d to the stringers 14. In the illustrated example, the uppermost riser 16e includes one of the third connecting elements 38, although could be omitted in this example.

In this example, the third and fourth connecting elements 38, 40 are integrally formed in the risers 16 and stringers 12. The third connecting elements 38 extend transversely along at least a portion of the respective riser 16, and in this particular example extend transversely along the entire width of the respective riser 16.

In this particular embodiment, the bottom edge of the risers 16b to 16d are inserted into the respective rebate 36, with the riser 16 inclined away from the respective riser abutment face 34, which is facilitated by the tapered profile of the rebates 36 as previously described. The third and fourth connecting elements 38, 40 are brought into interconnection by the respective riser 16b to 16d being translated upwardly along the respective riser abutment face 34. The third connecting elements 38 are each a projection, and the fourth connecting elements 40 are each a recess. In the embodiment illustrated, in FIGS. 1 to 9, the third and fourth connecting elements 38, 40 have complementary overlapping formations, which inhibit separation of the riser and stringer when the third and fourth connecting elements 38, 40 are interconnected. To this end, the projections forming the third connecting elements 38 have a generally rhomboid shaped cross section. Further, the recesses forming fourth connecting elements 40 are each a channel with a generally rhomboid shaped cross section. The generally rhomboid shaped cross sections of the projections of the third and tough connecting elements 38, 40 having complementary undercut shapes that facilitate interconnection. In this embodiment, the channels forming the fourth connecting elements 40 each extend at least part of the length of the respective riser 16.

Tapered spacers 42a, 42b are inserted between the stringer 12 and one of the risers 16a to 16d to urge the third and fourth connecting elements 38, 40 for those risers into interconnection. For the risers 16b to 16d, the spacers 42 are inserted into the rebate 36 beneath the riser 16b to 16d. For the lowermost riser 16a, the spacers 42b are inserted between the third and fourth connecting elements 38, 40. The spacers 42a, 42b are shown in further detail in FIG. 9.

The spacers 42a, 42b are inserted transversely, with the narrower end of the respective spacer 42a, 42b being oriented towards the adjacent lateral edge of the stair case 10. In other words, each spacer 42a, 42b is inserted from the internal side of the respective stringer 12 into its intended location, and then moved outwardly with respect to the stair case 10. As will be appreciated, the dimensions of the third connecting elements 38 is sufficient to allow installation of the respective risers 16a to 16d in the manner described.

The stair case 10 further has fifth connecting elements 44 that are each provided to the toe of one of the treads 14, and sixth connecting elements 46 that are each provided to one of the risers 16b to 16e. The fifth and sixth connecting elements 44, 46 are interconnected to secure the toe of each of the treads 14 to one of the risers 16b to 16e, adjacent the bottom edge of the respective riser 16b to 16e. As will be appreciated, the bottom of the stair case 10 commences with the lowermost riser 16a, and thus there is no need for a fifth connecting element on that riser.

In this embodiment, the fifth connecting elements 44 are integrally formed in the toe of the treads 14. The fifth connecting elements 44 extend transversely along the respective tread 14. Further, the sixth connecting elements 46 are also integrally formed in the front face of the risers 16b to 16e. The sixth connecting elements 46 also extend transversely across the entire width of the respective riser 16b to 16e.

The fifth and sixth connecting elements 44, 46 of this embodiment are also shown in further detail in FIGS. 7 and 8. Each fifth connecting element 44 includes a fifth tongue 48 that projects from the toe edge of the tread 14. The fifth tongue 48 has a fifth bead 50 that is formed on the upper side of the tongue 48, relative to the upper side of the tread 14. The sixth connecting elements 46 include a channel 52 that receives the fifth tongue 48. The channel 52 includes a pocket 54 formed at the base of the channel 52. When the fifth and sixth connecting elements 44, 46 are interconnected, the fifth bead 50 locates within the pocket 54. The interaction of the fifth bead 50 against the wall of the pocket 54 resists the fifth tongue 48 being pulled out in a direction perpendicular to the respective riser 16b to 16e. Hence, the tread 14 is prevented from being moved along the tread supporting face 32. The interconnection of the fifth and sixth connecting elements 44, 46 provides both lateral and vertical stability to the respective tread and riser 14, 16. This provides, a strong union between the treads and risers 14, 16, such that separation is only likely by movement corresponding with the reversal of installation. However, this movement is resisted by the interconnection, of the first and second connecting elements 18, 20.

The channel 52 has a width such that the fifth tongue 48 can be partially inserted into the channel 52 when the respective tread 14 is inclined at an acute angle relative, to the respective riser 16b to 16e. In such embodiments, the fifth and sixth connecting elements 44, 46 are interconnected by a pivoting action of the respective tread 14 and riser 16. FIG. 4 shows the treads 14 being inclined relative to the respective, riser 16b to 16e at various states of interconnection.

Each fifth connecting element 44 includes an upper rib 56 that is adjacent the upper surface of the respective tread 14, and a lower rib 58 that is adjacent the under surface of the respective tread 14. Each sixth connecting element 46 includes an upper secondary groove 60 above the channel 52, and a lower secondary groove 60 below the channel 52. The upper rib 56 locates within the upper secondary groove 60, and the lower rib 58 locates within the lower secondary groove 62 when the fifth and sixth connectors 44, 46 are interconnected. In addition to adding to the stability of the interconnected treads and risers 14, 16, the upper rib 56 locating within the upper secondary groove 60 provides a clean visual appearance at the interface of the tread and riser 14, 16 at the toe of the treads 14.

The stair case 10 includes a nosing piece 64 that includes a connecting element 66 that has the same profile as the first connecting elements 18. The connecting element 66 locates on the second connecting element 20 of the uppermost riser 16e. The nosing piece 64 includes a tail member 68 that extends over the upper level U, as indicated in FIG. 3. The nosing piece 64 is secured to the structure that forms the upper level U, the a substructure that supports that upper level U. The nosing piece 64 may be secured by any conventional fastener, adhesive, or the like.

The stair case 10 can be installed by the following method:
  locating the stringers 12 relative to the lower and upper levels L. U, and securing these in place with fasteners and/or brackets;
  installing the lowermost riser 16a, which involves inserting spacers 42b between the third fourth connecting element 38 of the lowermost riser 16a and the fourth connecting elements 40 of the stringers 12 at the corresponding riser abutment face 34;
alternately:
  installing the subsequent riser 16b to 16e, by interconnecting the respective third and fourth connecting elements 38, 40 by inserting the bottom edge of the riser 16 into the rebate 36, pivoting that riser 16 against the corresponding riser abutment face 34 and inserting spacers 42a; and
  installing the tread 14, by partially interconnecting the fifth and sixth connecting elements 44, 46, and completing the interconnection of the fifth and sixth connecting elements 44, 46 by pivoting the tread 14 about its toe end, which simultaneously interconnects the first and second connecting elements 18, 20.

As will be appreciated, once the stringers are in place, the installation of the stair case 10 is executed commencing with the lowermost riser 16a of the stair case 10, and then continues progressively and upwardly along the stair case 10 towards the upper level Ti.

FIGS. 10 to 18 show a stair case 110 according to a second embodiment. The stair case 110 has a pair of spaced apart stringers 112, treads 114 that are supported on the stringers 112, and risers 116. As indicated in FIG. 11, the stair case 110 extends from a lower datum level L to an upper datum level U.

In the example illustrated in FIG. 10, the stair case 110 has four treads 114a, 114b. 114c, 114d, which are hereinafter referred to collectively as "treads 114", unless the context indicates otherwise. Further, in the example illustrated in FIG. 10, the stair case 110 has five risers 116a, 116b, 116c, 116d, 116e, which are hereinafter referred to collectively as "risers 116", unless the context indicates otherwise. In this example, tread 114a is the lower most tread in the stair case 110, and tread 114d is the uppermost tread. Similarly, riser 116a is the lowermost riser in the stair case 110, and riser 116e is the uppermost riser in the stair case 10.

The stair case 110 has first connecting elements 118 and second connecting elements 120. Each tread 114 has one of the first connecting elements 118 provided at an under surface that tread 114. The second connecting elements 120 are each provided to one of the risers 116.

In this embodiments, both the first and second connecting elements 118, 120 are integrally formed in the respective treads 114 and risers 116. The first and second connecting elements 118, 120 have a substantially similar form and function compared to the first and second connecting elements 18, 20 of the stair case 10. Accordingly, features of the first and second connecting elements 118, 120 that correspond with those of the first and second connecting elements 18, 20 having the same reference numerals with the prefix "1".

In the stair case 110, the groove 122 of each first connecting element 118 includes an outer portion 123 into which the ridge 130 of the second connecting element 120 locates and abuts, when the first and second connecting elements 118, 120 are interconnected. Thus, the ridge 130 can support the tread 114 immediately above the riser 116 within the groove 122.

FIGS. 13 and 14 show one of the stringers 112 in further detail. Each stringer 112 has tread supporting faces 132 and riser abutment faces 134. Further, each stringer 112 has rebates 136 that are each formed between the bottom edge of each riser abutment face 134 and the adjacent tread supporting face 132. Each rebate 136 is configured to receive the toe of one of the treads 14a to 14c.

With regard to the treads 114a to 114c, the under surface at the toe of these treads has a convex arcuate surface. The rebates 136 have a complementary arcuate concave bottom surface. During installation of the stair case 110, each of the treads 114a to 114c is inclined relative to the respective tread supporting face 132 and the toe of the tread 114a to 114c inserted into the respective rebate 136, and then pivoted to bring the under surface of the tread 114a to 114c down onto the tread supporting face 132. This action also interconnects the first and second coupling elements 118, 120.

In this particular stair case 110, the toe of the uppermost tread 114d is connected to the uppermost riser 116e, as will be described in further detail below.

The stair case 110 has third connecting elements that are each provided to one of the treads 14a to 14c, and fourth connecting elements that are each provided to the tread supporting faces 132 that support the treads 114a to 114c. The third and fourth connecting elements are interconnected to secure each of the treads to the stringers 112. In this embodiment, the third connecting elements are integrally formed in the treads 114a to 114c, and the fourth connecting elements are integrally formed in the stringers 112. Further, the third connecting elements extend transversely along the entire width of the respective tread 114a to 114c.

In this second embodiment, the third connecting elements each include a first transverse ridge 170 formed on the upper surface of the respective tread 114a to 114c, and a first transverse channel 172 formed on the under surface of the respective tread 114a to 114. The fourth connecting elements each include a second transverse ridge 174 formed in each of the tread supporting faces 132. When the third and fourth connecting elements are interconnected, the first transverse ridge 170 bears against one of the riser abutment faces 134. Further, the second transverse ridge 174 is located within the first transverse channel 172. When the third and fourth connecting elements are interconnected, the second transverse ridge 174 also bears against, the respective tread 114a to 114c. Thus, the first and second transverse ridges 170, 174 co-operate to inhibit translational movement of the respective treads 114a to 114c parallel to the respective tread supporting faces 132.

The stair case 110 further has fifth connecting elements 144 that are each provided to the upper surface of the treads 14a to 114c, and sixth connecting elements 146 that are each provided to one of the risers 16b to 16d. The fifth and sixth connecting elements 144, 146 are interconnected to secure the bottom edge of the risers 116b to 116d adjacent the toe of treads 114a to 114c. As will be appreciated, the bottom of the stair case 10 commences with the lowermost riser 16a, and thus there is no need for a sixth connecting element 146 on that riser. Further, the bottom edge of the uppermost riser 116e, which has a sixth connecting element 140, is secured to the upper end of the stringers 112. To this end, the upper end of each stringer 112 includes a fifth connecting element 144 integrally formed therein.

The fifth connecting elements 144 include a fifth channel 152 with a pocket 154 formed at the base of the channel 152. The sixth connecting elements 146 include a sixth tongue 148 that projects from the bottom edge of the risers 116b to 116e. The sixth tongue 148 has a hooked end 150. The fifth connecting elements 144 also include a groove that is formed in the respective tread 114 forwardly of the channel 152. The sixth connecting elements 146 also include a rib that is formed along the bottom edge of the riser 116, forwardly of the tongue 148. When the fifth and sixth connecting elements 144, 146 are interconnected, the tongue 148 locates within the channel 152, such that at least a portion of the hooked end 150 is positioned within the pocket 154. Further, the rib of the fifth connecting element 144 locates within the groove of the sixth connecting element 146.

The channel 152 has a width such that the sixth tongue 148 can be partially inserted into the channel 152 when the respective riser 116b to 116e is inclined at an acute angle relative to the respective tread 114a to 114c. In such embodiments, the fifth and sixth connecting elements 144, 146 are interconnected by a pivoting action of the respective tread and riser.

The uppermost riser 116e has a channel 176 formed on its front face, and a connector 178 is secured within the channel 176. The toe of the uppermost tread 114d has a complementary connector 180 that is integrally formed therein. The connector 178 has the same form as the fifth connecting element 44 that is formed on the toe of the treads 14 in the stair case 10, with the tongue of connector 178 projecting outwardly of the front face of the uppermost riser 116e. Similarly, the connector 180 has the same form as the sixth connecting element 46 that is formed on the front face of the risers 16b to 16e in the stair case 10.

The stair case 110 includes, a nosing piece 164 that includes a connecting element 166 that has the same profile as the first connecting elements 118. The connecting element 166 locates on the second connecting element 120 of the uppermost riser 16e. The nosing piece 164 includes a tail member 168 that extends over the upper level U, as indicated in FIG. 11.

FIGS. 19 to 27 show a stair case 210 according to a third embodiment. The stair case 210 is substantially similar to the stair case 110. Accordingly, in FIGS. 19 to 27, the features of the stair case 210 that are substantially similar to those of the stair case 110 have the same reference numeral with the prefix "1" replaced with the prefix "2".

The principal difference between the stair cases 110 and 210 resides in the form and function of the first and second connectors, the rebate and the third and fourth connectors.

The third connecting elements 238 each include a tongue 282 that is split to define a pair of tines 284 with a gap therebetween, and each tine has an outwardly directed third bead 286. In this embodiment, the fourth connecting elements are integrally formed within the rebate 236, and include a pair of fourth beads 288 on opposing faces of the rebate 26. When the third and fourth connecting elements are interconnected, each of the third beads 286 of the tongue 282 engages with the fourth beads 288 to inhibit separation of the respective treads 214a to 214c, and the stringers 212.

Each of the tines 284 further includes a tapered shoulder 290. When each third connecting element 238 and fourth connecting element are interconnected, the tapered shoulders 290 bear against the pair of fourth beads 288 within the rebate 236.

The third connecting element 238 is brought into interconnection with the rebate 236 by a translational (in other words, "sliding") movement of the respective tread 214a to 214c to insert the tongue 282 into the rebate 236. In doing so, the tines 282 are deflected inwardly as the third beads 286 progress into the rebate 236 and pass the fourth beads 288, whereupon the tines 284 deflect outwardly. The interaction of the third and fourth beads 286, 288 inhibit the treads 214a to 214c being withdrawn from the respective rebates 236.

To accommodate the translational movement required to interconnect the tongue 282 within the rebate, the groove 222 of the first connecting element 218 is sufficiently wide that the tongue 226 of the second connecting element 220 can be inserted in the groove 222 when the tongue 282 is outwardly of the rebate 236. However, when the third and fourth connecting elements are interconnected, the first bead 228—which is formed within the groove 222—engages the second bead 228 on the tongue 226. Thus, the first and second connecting elements 218, 220 are interconnected, which prevents the nose of the treads 214 being lifted upwardly and away from the respective tread supporting face 232.

The uppermost riser 216e has a channel 276 formed on its front face, and a connector 278 is secured within the channel 276. The toe of the uppermost tread 214d has a complementary connector 280 that is integrally formed therein. The connector 278 has the same form as the third connecting element 238 that is formed on the toe of the treads 214a to 214c, with the tongue of connector 278 projecting outwardly of the front face of the uppermost riser 216c. Similarly, the connector 280 has the same form as the fourth connecting element, which is formed in the rebate 236.

FIGS. 28 to 34 show a stair case 310 according to a fourth embodiment. The stair case 310 has a pair of spaced apart stringers 312, treads 314 that are supported on the stringers 312, and risers 316. As indicated in FIG. 29, the stair case 310 extends from as lower datum level L to an upper datum level U.

In the example illustrated in FIG. 28, the stair case 310 has four treads 314a, 314b, 314c, 314d, which are hereinafter referred to collectively as "treads 314", unless the context indicates otherwise. Further, in the example illustrated in FIG. 28, the stair case 310 has five risers 316a, 316b, 316c, 316d, 316e, which are hereinafter referred to collectively as "risers 316", unless the context indicates otherwise.

The stringers 312 have a substantially similar form and function compared to the stringers 12 of the stair case 10. Accordingly, features of the stringers 312 that correspond with those of the stringers 12 having the same reference numerals with the prefix "3".

The stair case 310 has first connecting elements 318 and second connecting elements 320. Each tread 314 has one of the first connecting elements 318 integrally formed in an under surface that tread 314. The second connecting elements 320 integrally formed on the upper edge of one of the risers 316. It will be apparent from FIGS. 28 to 34 that the first connecting elements 318 have a substantially similar form to the fourth connecting elements of the stair case 210, which are integrally formed in the rebates 236. Furthermore, the second connecting elements 320 have a substantially similar form to the third connecting elements 238. Accordingly, the first and second connecting elements 318, 320 are brought into interconnection by a movement of the treads 314 relative to the risers 316a to 316d that is substantially translational.

FIGS. 31 and 32 show one of the stringers 312 in further detail. Each stringer 312 has tread supporting faces 332 and riser abutment faces 334. Further, each stringer 312 has rebates 336 that are formed between the bottom edge of each riser abutment face 334 and the adjacent tread supporting face 332. The stringers 312 further include an additional rebate 337 that is formed adjacent tread supporting face 332 for the uppermost tread 314d. Each rebate 336 is configured to receive the bottom edge of one of the risers 16b to 16d. Similarly, the rebate 337 is configured to receive the bottom edge of the uppermost riser 316e.

The stair case 310 also has third connecting elements 338 and fourth connecting elements 340. The third connecting elements 338 are each integrally formed in the bottom edge of risers 314b to 314e. The fourth connecting elements 340 are integrally formed in the rebates 336, 337. It will be apparent from FIGS. 28 to 34 that the third connecting elements 338 have a substantially similar form to the second connecting elements 320. Furthermore, the fourth connecting elements 340 have a substantially similar form to the first connecting elements 318. Accordingly, the third and fourth connecting elements 338, 340 are brought into interconnection by a movement of the risers 316b to 316e relative to the stringers 312 that is substantially translational.

The stair case 310 further has fifth connecting elements 344 that are each provided to the toe of one of the treads 314, and sixth connecting elements 346 that are each provided to one of the risers 316b to 16e. The fifth and sixth connecting elements 344, 346 are interconnected to secure the toe of each of the treads 314 to one of the risers 316b to 316e, adjacent the bottom edge of the respective riser 316b to 316e. As will be appreciated, the bottom of the stair case 10 commences with the lowermost riser 316a, and thus there is no need for a fifth connecting element on that riser.

In this embodiment, the fifth connecting, elements 344 are integrally formed in the toe of the treads 314. The fifth connecting elements 44 extend transversely along the respective tread 314. It will be apparent from FIGS. 28 to 34 that the fifth connecting elements 344 have a substantially similar form to the sixth connecting elements 46 that are formed in the risers 16 of the stair case 10.

Each riser 316b to 316e has a channel 376 formed in its front face. The sixth connecting elements 346 are each secured within a respective one of the channels 376. The sixth connecting elements 346 also extend transversely across the entire width of the respective riser 316b to 316e. It will be apparent from FIGS. 28 to 34 that the fifth connecting elements 346 have a substantially similar form to the fifth connecting elements 344 that are formed in the treads 14 of the stair case 10.

The upper most riser 316e includes spacing blocks 392 on the rear surface of the riser 316e. The spacing blocks 392 space the riser 316e outwardly of the structure that supports the upper level U, as illustrated in FIG. 29.

FIGS. 35 to 41 show a show a stair case 410 according to a fifth embodiment. The stair case 410 has a pair of spaced apart stringers 412, treads 414 that are supported on the stringers 412, and risers 416. As indicated in FIG. 36, the stair case 410 extends from a lower datum level L to an upper datum level U.

Figure 35:
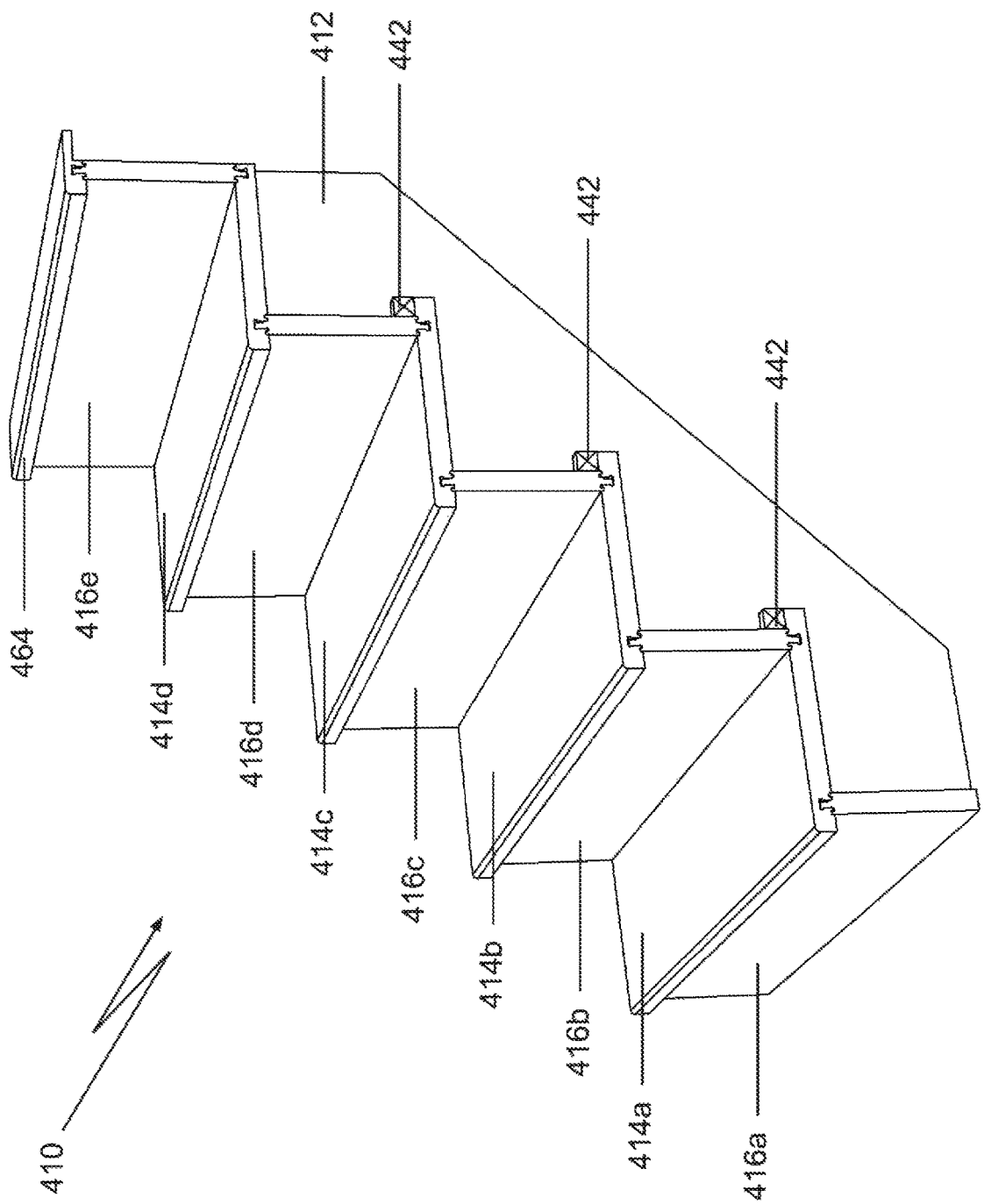
FIG. 35 is an isometric view of a stair case according to a fifth embodiment of the present invention.

In the example illustrated in FIG. 35, the stair case 410 has four treads 414a, 414b, 414c, 414d, which are hereinafter referred to collectively as "treads 414", unless the context indicates otherwise. Further, in the example illustrated in FIG. 35, the stair case 410 has five risers 416a, 416b, 416c, 416d, 416e, which are hereinafter referred to collectively as "risers 416", unless the context indicates otherwise. In this example, riser 416a is the lowermost riser in the stair case 410.

Figure 39:
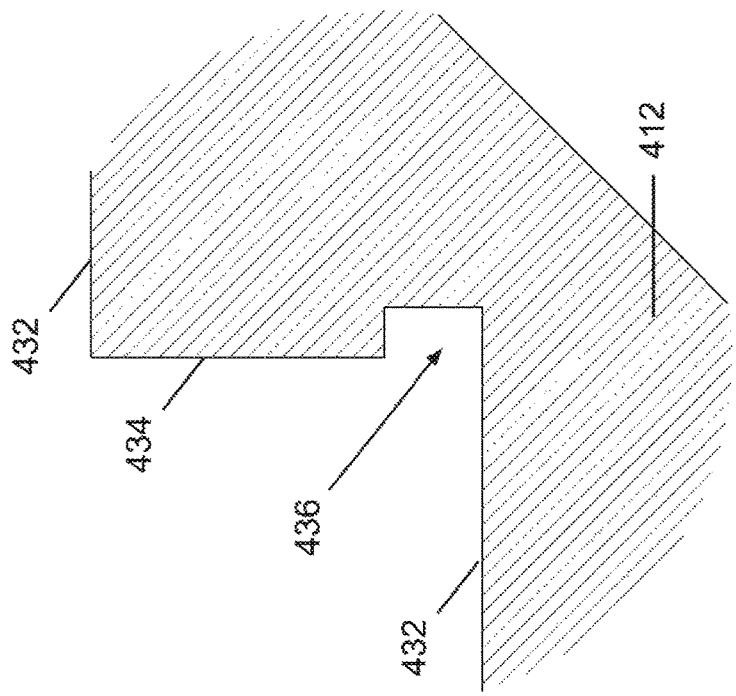
FIG. 39 is an enlarged view of region F of the stringer of FIG. 38.
Figure 38:
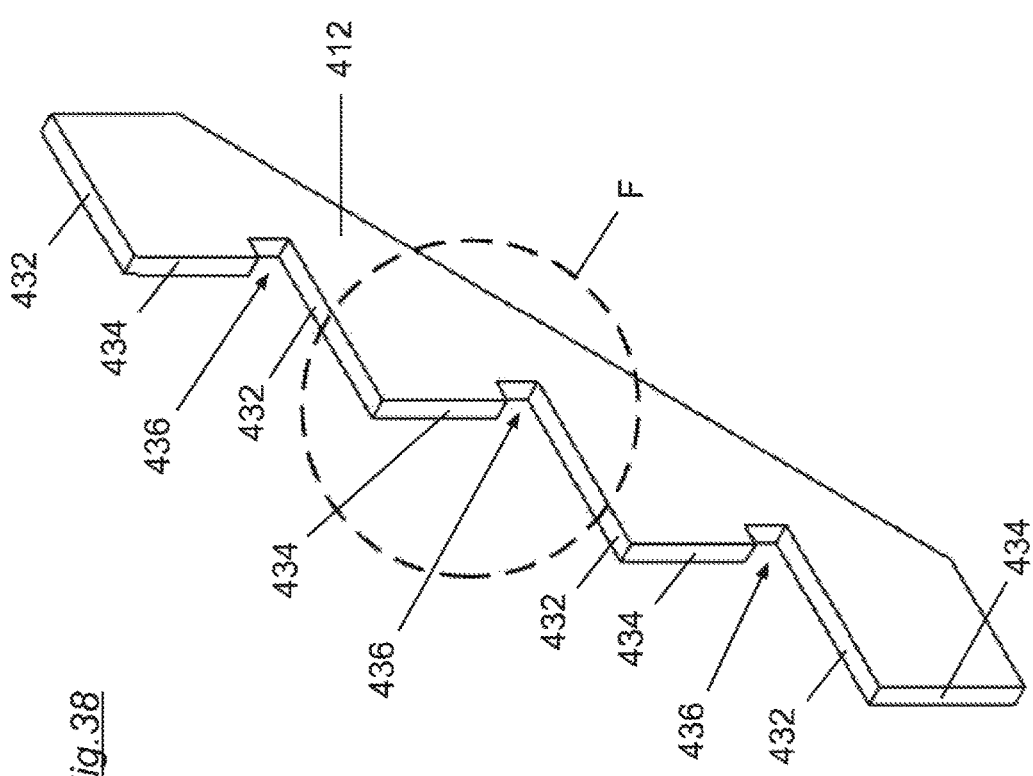
FIG. 38 is an isometric view of a stringer of the stair case of FIG. 35.
Figure 41:
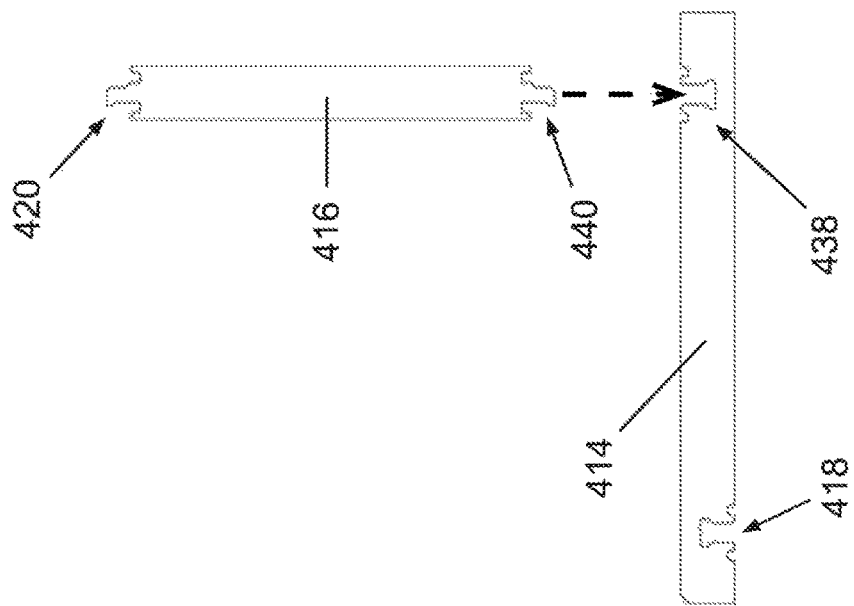
FIG. 41 is a side view of the stair tread and riser of FIG. 40.
Figure 40:
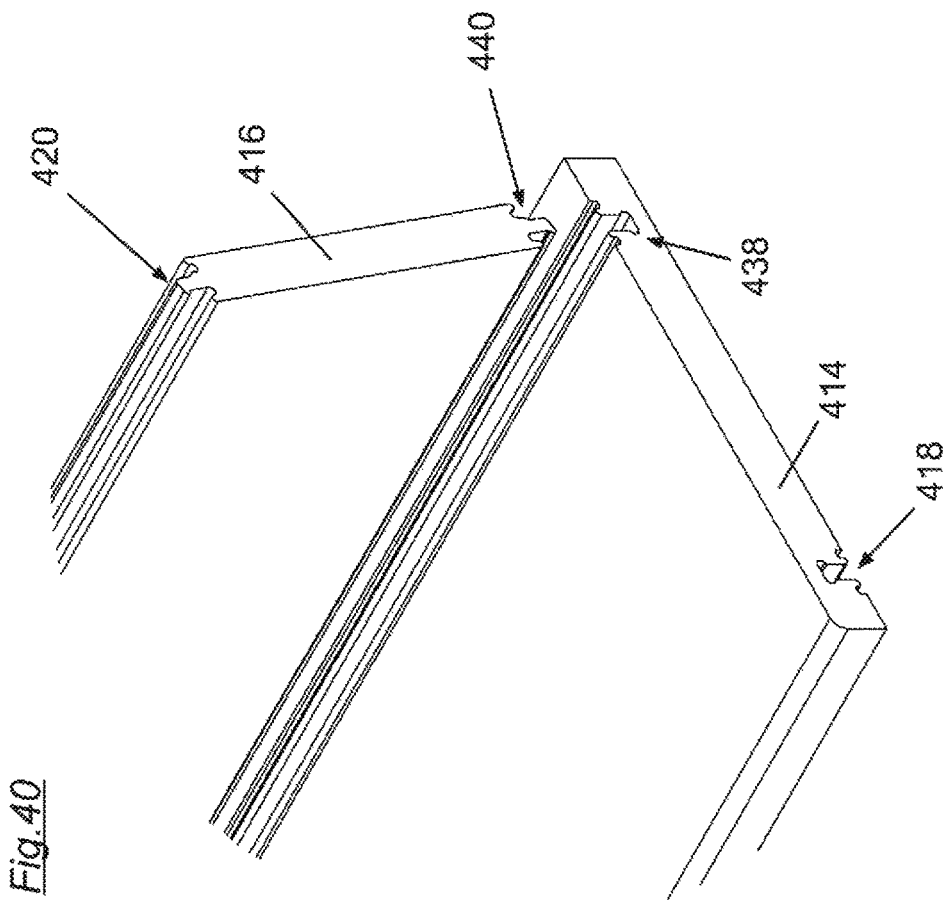
FIG. 40 is a partial perspective view of a stair tread and riser of the stair case of FIG. 35.

FIGS. 38 and 39 show one of the stringers 412 in further detail. Each stringer 412 has tread supporting faces 432 and riser abutment faces 434. Further, each stringer 412 has rebates 436 that are each formed between the bottom edge of each riser abutment face 434 and the adjacent tread supporting face 432. Each rebate 436 is configured to receive the toe of one of the tread 414.

The stair case 410 has first connecting elements 418 and second connecting elements 420. Each tread 414 has one of the first connecting elements 418 integrally formed in the under surface that tread 414. The second connecting elements 420 are each integrally formed in an upper edge of the risers 416. The first and second connecting elements 418, 420 interconnect to secure the nose of each tread 414 to the risers 414a to 414d.

The stair case 410 further has third connecting elements 438 and fourth connecting elements 420. Each tread has one the third connecting elements 438 integrally formed in the upper surface that tread 414. The fourth connecting elements 420 are each integrally formed in the lower edge of the risers 416b to 416e. The third and fourth connecting elements 438, 440 interconnect to secure the bottom of each of the risers 414b to 414e to the treads 414.

It will be apparent from FIGS. 35 to 41 that the first and third connecting elements 418, 438 have a substantially similar form to the sixth connecting elements 46 that are formed in the risers 16 of the stair case 10. Furthermore, it will be apparent from FIGS. 35 to 41 that the second and fourth connecting elements 420, 440 have a substantially similar form to the fifth connecting elements 44 that are formed in the treads 14 of the stair case 10.

Each pair of first and second connecting elements 418, 420 is brought into interconnection by inclining the respective riser 416b to 416e at an acute angle relative to the tread 414 immediately below that riser. The second connecting element 420 is partially inserted into the first connecting element 418, and the respective riser 416b to 416e is pivoted to complete the interconnection.

Each pair of third and fourth connecting elements 438, 440 is brought into interconnection by inclining the respective tread 414 at an acute angle relative to the riser 416a to 416d immediately below that tread. The toe of the respective tread 414 is inserted into the rebate 436 at the rear of the respective tread supporting face 432. The fourth connecting element 440 is partially inserted into the third connecting element 438 (by lowering the nose of the tread into the upper edge of the riser), and the respective tread 414 is pivoted to complete the interconnection.

Tapered spacers 442 are inserted into the rebates 436, between the stringer 412 and upper surface at the toe of the treads 414. The spacers 442 prevent the toes of the treads 414 from being moved away from tread supporting faces 432. The spacers 442 are inserted transversely, with the narrower end of the respective spacer 442 being oriented towards the adjacent lateral edge of the stair case 410. In other words, in this embodiment each spacer 442 is inserted from the internal side of the respective stringer 412 into its intended location, and then moved outwardly with respect to the stair case 410.

The stair case 410 includes a nosing piece 464 that includes a connecting element 466 that has the same profile as the first connecting elements 418. The connecting element 466 locates on the second connecting element 420 of the uppermost riser 416e. The nosing piece 464 includes a tail member 468 that extends over the upper level U.

The stair case 410 can be installed by locating the stringers 412 relative to the lower and upper levels L, U, and securing these in place with fasteners and/or brackets. The lowermost riser 416a is then installed and secured in place to the stringers 412 and/or the lower level L with fasteners and/or brackets. The treads 414 and risers 416b to 416e are then alternately installed as previously described, so that the stair case 410 is assembled progressively and upwardly towards the upper level U.

Finally, the connecting element 466 of the nosing piece 464 is interconnected with the second connecting element 420 on the upper edge of the uppermost riser 416e, and also secured to the upper level U. With the nosing piece 464 in place, and the spacers 442 inserted into the rebates 436, the components of the stair case 410 is held together by the interconnection of the connecting elements 418, 420, 438, 440, and the interaction of the stringers 412 and, spacers 442.

In some alternative embodiments, the lowermost riser may be secured to the lowermost riser abutments faces of the stringers using complimentary shaped projections, and recesses or grooves on the rear surface of the lowermost riser, and lowermost riser abutment faces. In some such embodiments, tapered spacing elements may be used to bind the shaped complementary projections, and recesses or grooves.

FIGS. 42 to 45 show a stair case 510 according to a sixth embodiment of the present invention. The stair case 510 is substantially similar to the stair case 410. Accordingly, in FIGS. 42 to 45, the features of the stair case 510 that are substantially similar to those of the stair case 410 have the same reference numeral with the prefix "4" replaced with the prefix "5".

In the stair case 510 of FIGS. 42 to 45, the spacers 442 are substituted with locking elements 594, one of which is shown in FIG. 43. The locking element 594 has an elongate tubular body 595 with one or more (and in this example, four) resiliently deflectable arms 596 secured to the body 595. Each arm 596 that terminate with a ramped tooth 597. When the locking element 594 is inserted into the rebate 536, the arms 596 press outwardly with respect to the body 595 against the stringer 512, the toe of the tread 514 and the rear face of the riser 516. The stringer 512 has lateral recesses 513 about the rebates 536. The teeth 597 of the locking element 594 locates within the lateral recess 513. The lateral recesses 513 enable the stringers 512, treads 514 and risers 516 to be flush against a finished wall surface that is beside the stair case 510.

The examples illustrated in FIGS. 1 to 45 show stair cases with four treads and five risers. However, it will be appreciated that the number of treads and risers is at least partly dependent on the elevation gain between the lower and upper levels that the stair case is to traverse.

FIG. 46 is a side view of a tread nose segment 615a, and a partial view of a tread toe segment 615b, a riser 616 and a stringer 612 according to a seventh embodiment. The riser 616 and stringer 612 in this example are of substantially similar construction to the risers 16 and stringer 12 of the stair case 10. In this embodiment, the tread nose segment 615a and tread toe segment 615b are interconnected to form a tread. In other words, the tread is segmented into a nose segment 615a and a toe segment 615b. It will be appreciated that treads formed with interconnected tread toe segments and tread nose segments can be used with risers and stringers of alternative embodiments.

The tread nose segment 615a includes a lateral portion 617, and an upright portion 619 that depends from the lateral portion 617. The bottom edge of the upright portion 619 is shaped to form a first bead 622 that is substantially similar to that of the first connecting element of the treads 114. The first bead 622 interconnects with a second connecting element 620 formed on an upper edge of riser 616. The second connecting element 620 is identical to the second connecting element 120 in the risers 116.

The rear edge of the lateral portion 617 includes a first segment connecting element 621, and the leading edge of the tread toe portion 615b includes a second segment connecting element 623. The first and second segment connecting elements 621, 623 interconnect to secure the tread nose portion 615a to the tread toe portion 615b. It will be apparent from FIG. 46 that the first segment connecting element 621 has a substantially similar form to the fifth connecting elements 4 that are formed in the treads 14 of the stair case 10. Furthermore, the second segment connecting element 623 has a substantially similar form to the sixth connecting elements 46 that are formed in the risers 16 of the stair case 10.

It will be appreciated that the segmented treads of the seventh embodiment readily accommodate the different rise and going in the risers and treads, respectively, of individual stair cases. To this end, the depth of the lateral portion 617 can be set to a desired dimension, whilst the tread toe portion 615b remains at a fixed depth. Similarly, the height of the uptight portion 619 can be set to a desired dimension, whilst the riser 16 remain at a fixed height. As will be further appreciated, the segmented treads facilitate standardization of the tread toe segments and risers within stair cases.

In one example shown in FIG. 47, the tread nose segment 615a' has a short lateral portion 617 and a short upright portion 619'. In another example shown in FIG. 48, the tread nose segment 615a" has a short lateral portion 617" and a long upright portion 619". In yet another example shown in FIG. 49, the tread nose segment 615a''' has a long lateral portion 617''' and a short upright portion 619'''.

The example shown in FIG. 50 substantially similar to that of FIG. 48, and differs in that the tread nose segment 615a'''' is hollow. The tread nose segment 615a'''' in this example can be an extruded member. It will be apparent that the tread nosing segment can be manufactured in a substantially different way to the tread toe segments, risers and/or stringers.

FIG. 51 is a side view of a tread nose segment 715a, and a partial view of a tread toe segment 715b, a riser 716 and a stringer 712 according to an eighth embodiment, these components being similar to those shown in FIG. 46. Accordingly, in FIG. 51, the components that are substantially similar to those shown in FIG. 46 have the same reference numeral with the prefix "6" replaced with the prefix "7".

The tread nose segment 715a further includes an overlapping portion 725 that extends rearwardly from the lateral portion 717, and over a front portion of the tread toe segment 715b. The overlapping portion 725 has a barbed lip 727 that engages in a complementary shaped groove 729 formed in the upper surface of the tread toe segment 715b. The overlapping portion 725 provide protection to the interface between the nose and toe segments 715a, 715b, as may be required in stair cases that are subjected to high foot traffic, and/or that require an anti-slip feature at the nose of each tread.

In this embodiment, the first and second segment connecting elements 721, 723, and the barbed lip 727 and groove 729 are brought into interconnection by sliding the tread nose segment 715a laterally relative to the tread toe segment 715b.

The example shown in FIG. 52 substantially similar to that of FIG. 50, and differs in that the tread nose segment 715a' is hollow. Additionally, the upper surface of the overlapping portion 725' includes corrugations to facilitate traction for pedestrians. The tread nose segment 715a' in this example can be an extruded member.

Figure 53:
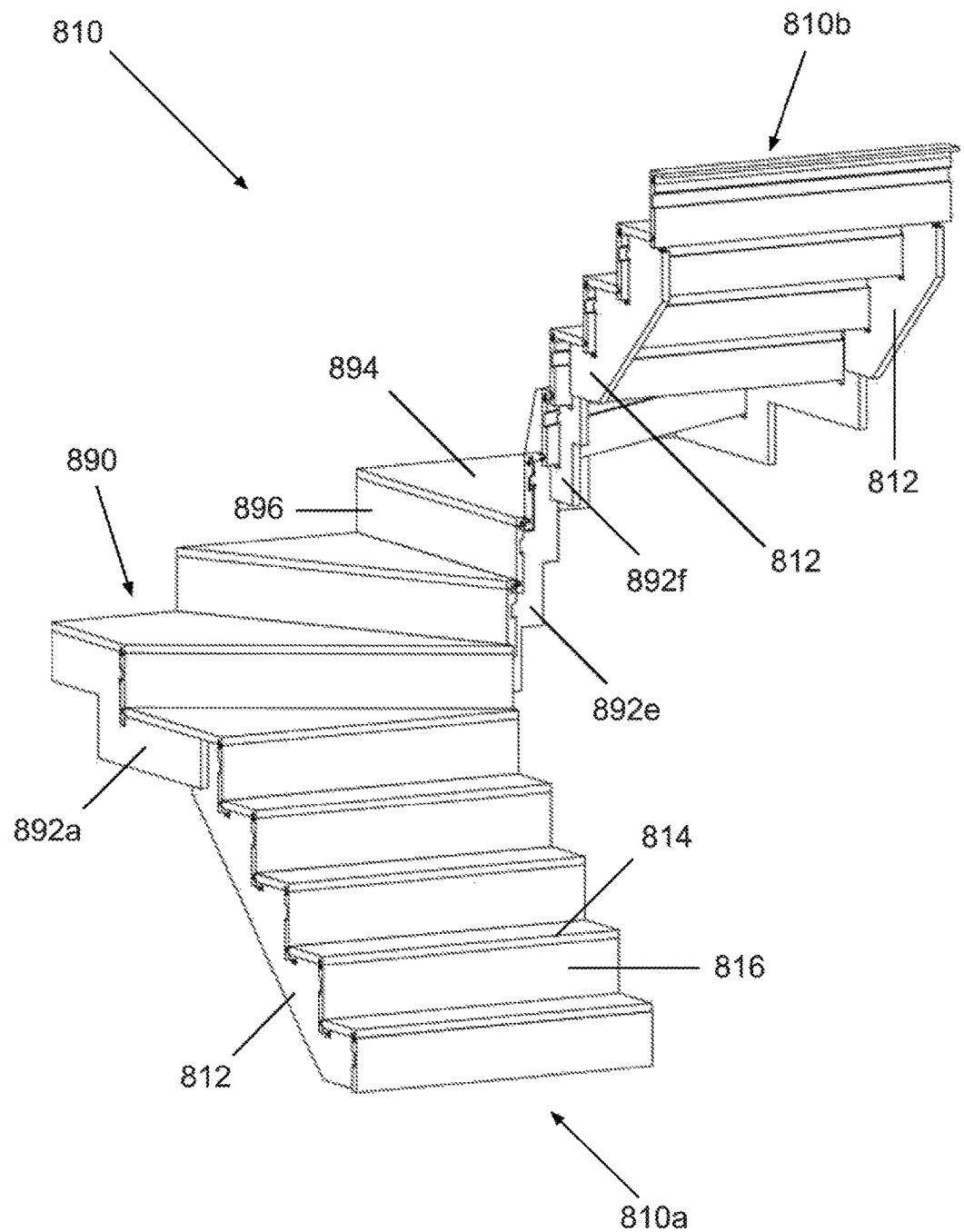
FIG. 53 is a perspective view of a stair case according to a ninth embodiment of the present invention.
Figure 54:
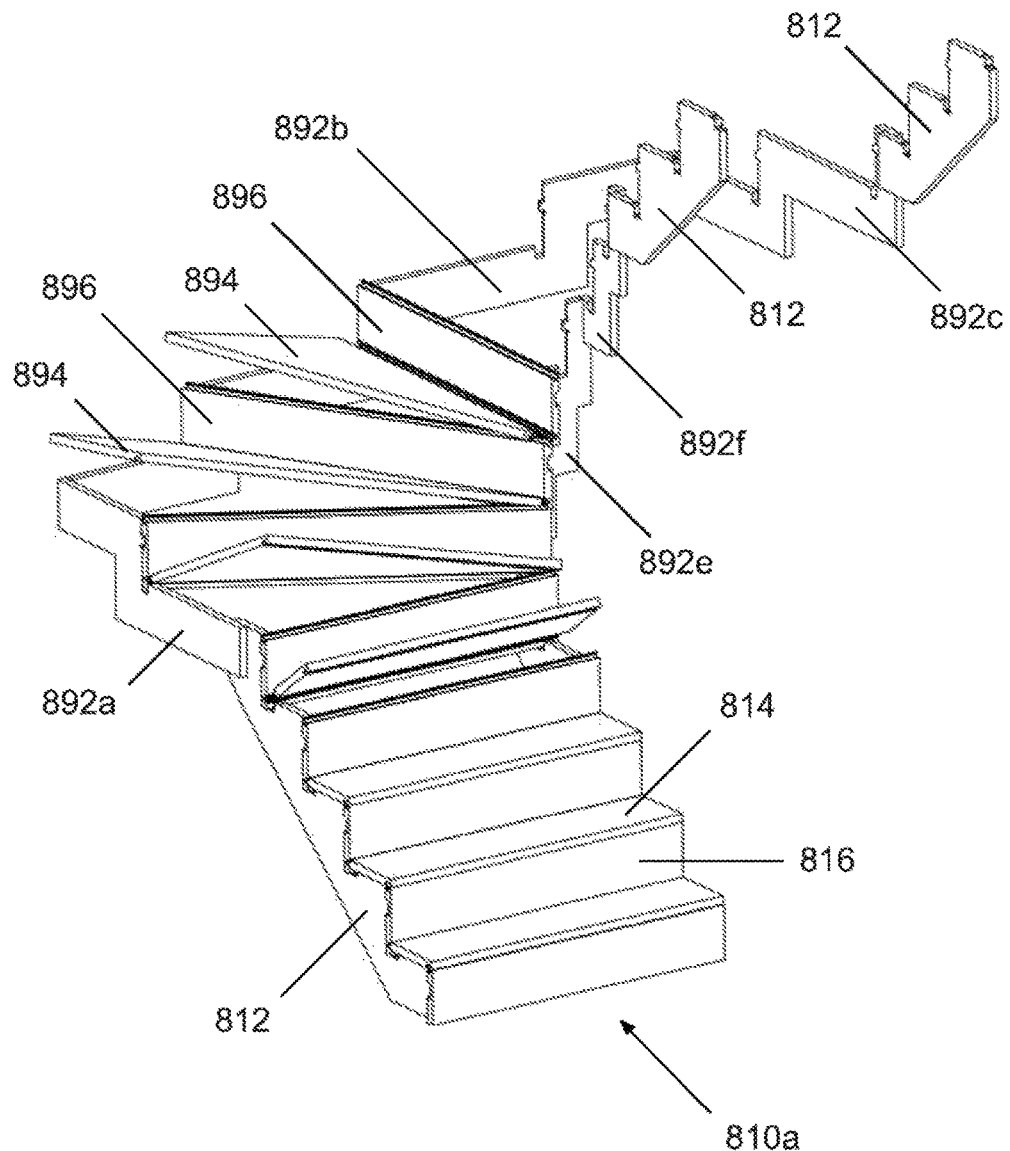
FIG. 54 is a perspective view of a stair case of FIG. 53 in a partially assembled state.
Figure 55:
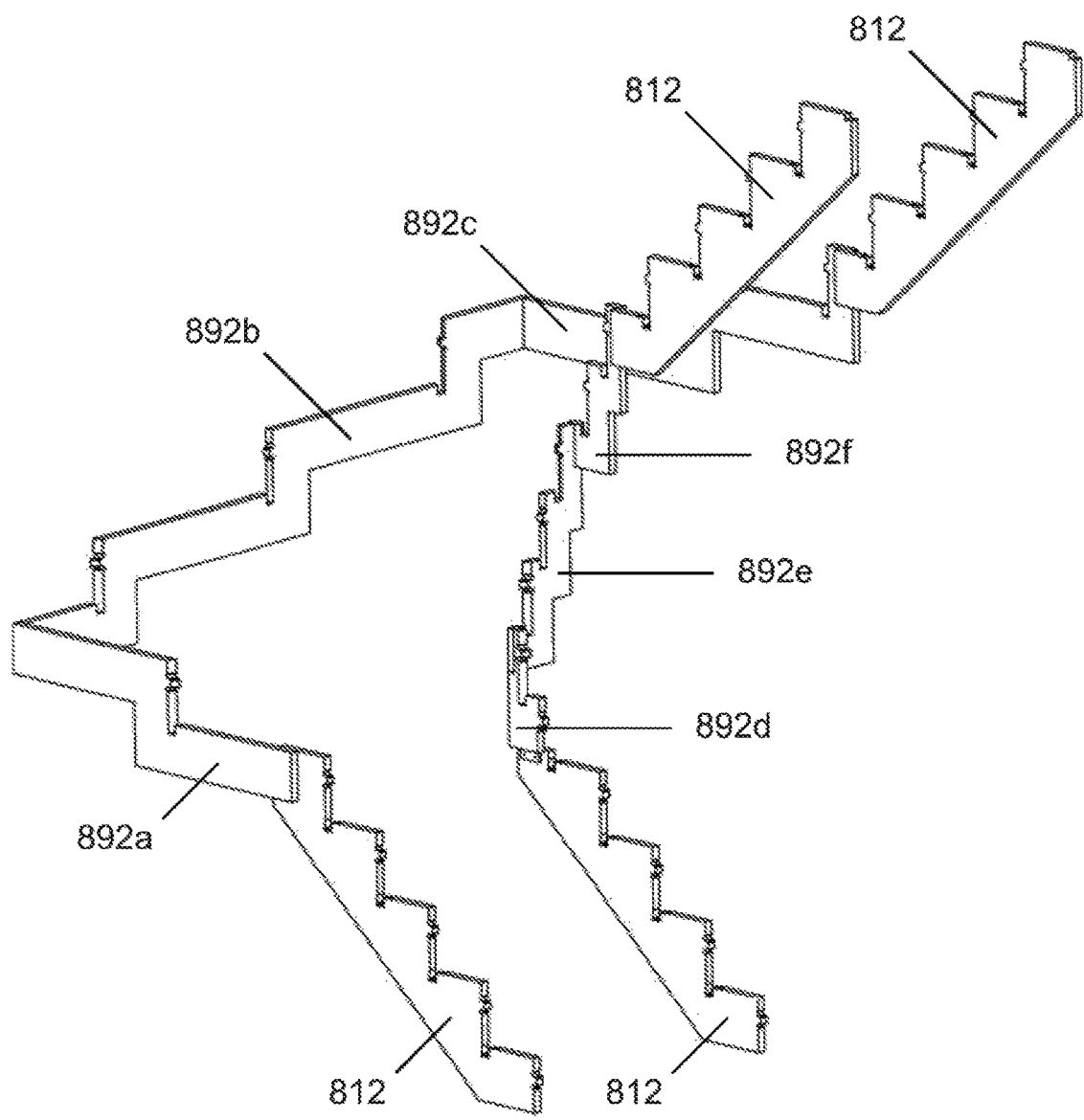
FIG. 55 is a perspective view of the stringers of the stair case of FIG. 53.

FIGS. 53 to 55 show a stair case 810 according to a ninth embodiment. The stair case 810 is substantially similar to the stair case 10 of FIGS. 1 to 9. In FIG. 53, the features of the stair case 810 that are substantially similar to those of the stair case 10 have the same reference numeral with the prefix "8".

The stair case 810 includes two straight flights of stairs 810a, 810b, and a winder section 890, which includes six winder stringer segments 892a to 892f that are each to be attached to a building structure. Winder treads 894 of irregular shape enable the winder section to turn about a central post or will (not shown). Three of the winder stringer segments 892d to 892f are attached to the central post, and the remaining winder stringer segments 892a to 892c are attached to the building structure on the outer side of the winder section 890. The winder section 890 also includes risers 896, with the winder stringers 892, treads 894 and risers 896 being interconnected in the same manner as the stringers 812, treads 814 and risers 816.

Figure 56:
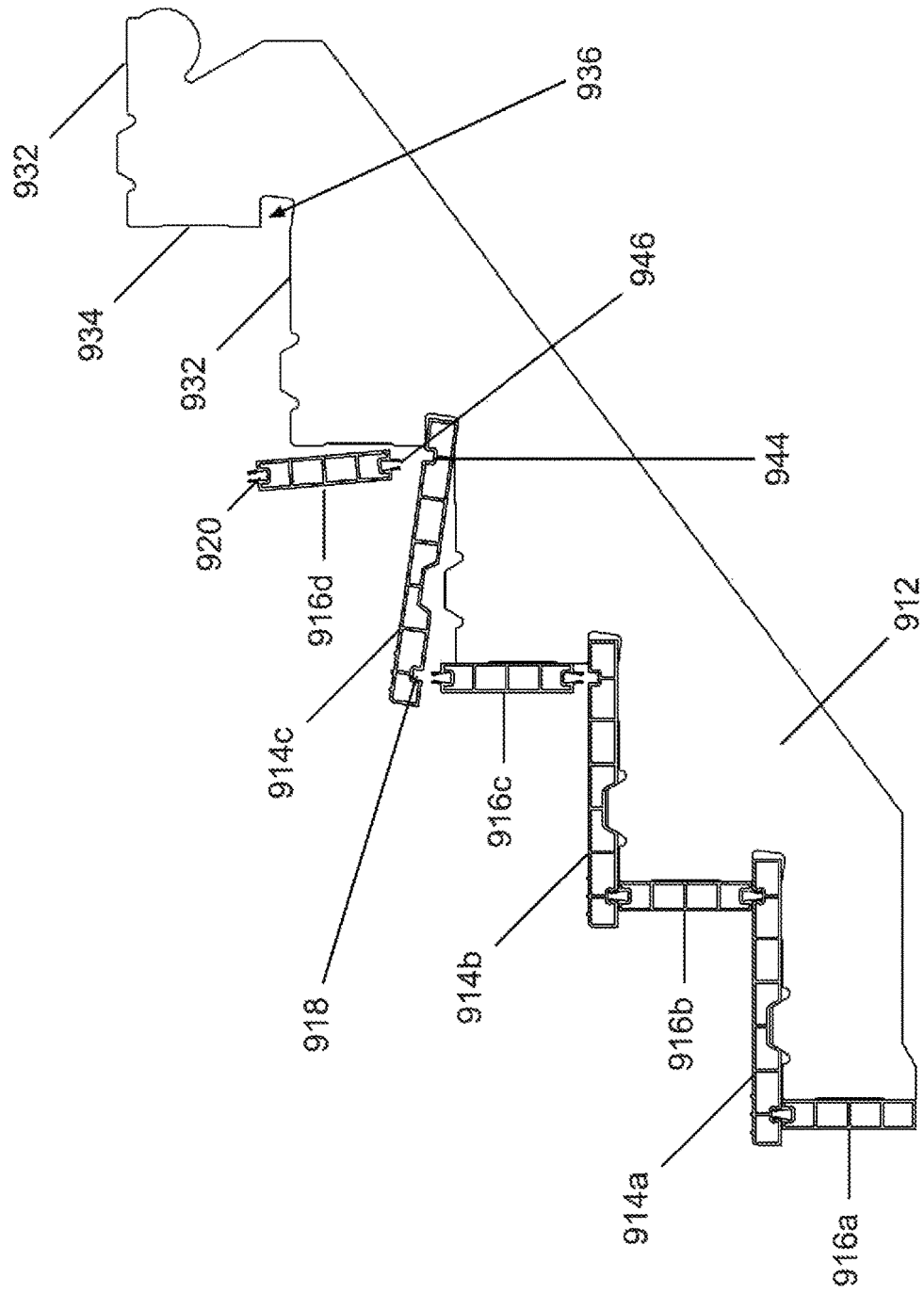
FIG. 56 is a side elevation view of a stair case according to a tenth embodiment of the present invention.

FIG. 56 shows a stair case 910 according to a tenth embodiment of the present invention. The stair case 910 is substantially similar to the stair case 110 of FIGS. 10 to 18, in FIG. 56, the features of the stair case 910 that are substantially similar to those of the stair case 110 have the same reference numeral with the prefix "1" replaced with the prefix "9".

In this embodiment, first and third connectors 918, 944 are integrally formed integrally with the treads 914. Similarly, the second and fourth connectors 920, 946 are formed integrally with the risers 916. In this embodiment, the treads 914 and/or risers 916 can be extruded from aluminium plastics materials, or composite materials including wood plastics composites.

As will be appreciated, the interconnections between the various connecting elements and connectors in the previously described embodiments has the distinct advantage of allowing an installer to commence installing the risers and treads with the lowermost riser, and continuing to construct the stair case progressively towards the top of the flight of stairs. This has the consequential advantage that the installer can be above the stair case during installation.

Furthermore, as will be appreciated the nature of the interconnections between the various connecting elements/connectors facilitates rapid construction of the stair case. It is envisaged that the installation of a stair case according to the first embodiment could be substantially faster when compared to conventional installation of a traditional stair case.

Figure 57A:
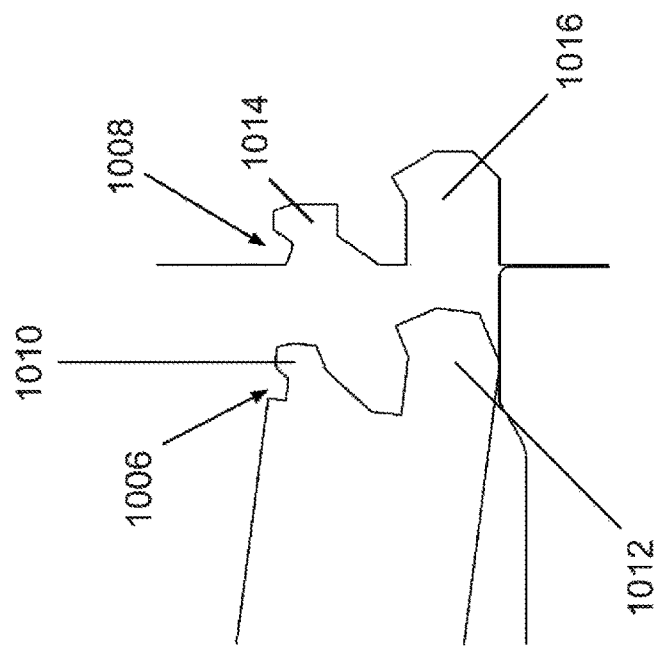
FIG. 57A shows to an enlarged scale inter-engageable tongues and channels of the connection of FIG. 57.
Figure 57:
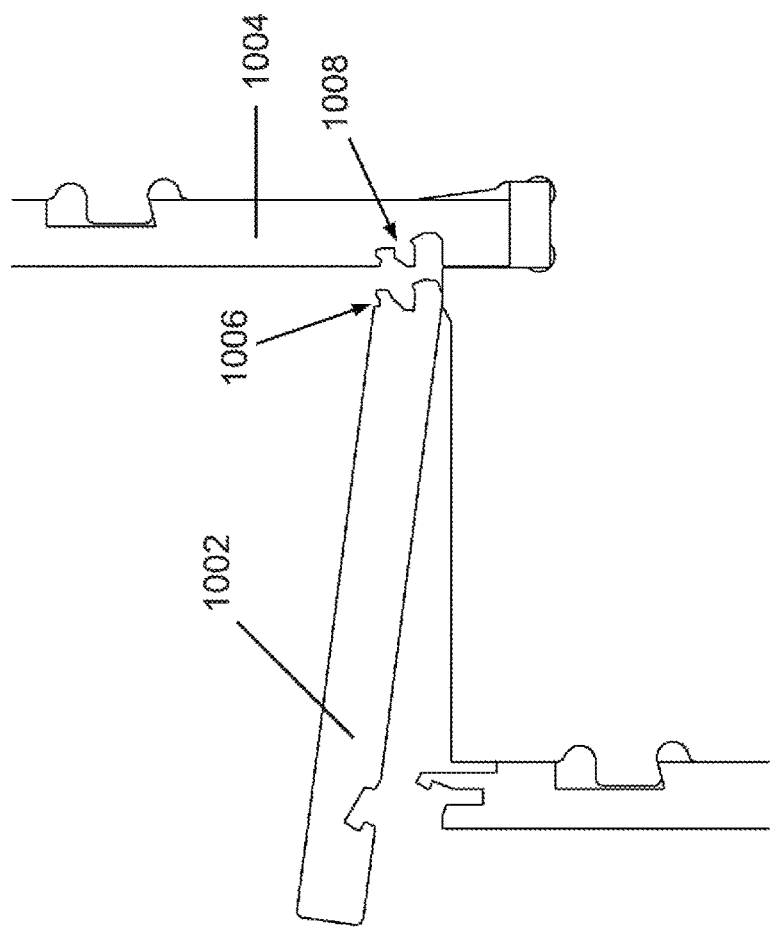
FIG. 57 shows a yet further form of connection between a tread and riser prior to establishment of the connection.

FIGS. 57 to 64 show an embodiment of a connection between the tread 1002 and riser 1004 formed by connecting elements 1006 and 1008. With initial reference to FIGS. 57 and 57A, the connecting element 1006 on the tread comprises integral tongues 1010 and 1012 and that 1008 on the riser is formed by separate channels 1014 and 1016 engaged by the respective tongues. In contrast to the embodiment described with reference to FIGS. 1 to 9 in which the connection between the tread and riser is principally formed by a single integral tongue engaged in a channel in the riser by a pivoting action during application whereby, in effect, the tongue "books" into the channel, in the embodiment to be described the connection is provided by upper and lower integral tongues each of which hooks into an associated channel in the riser, and, significantly, the upper tongue acts as a fulcrum during application which provides a leverage force to drive the lower tongue into its channel into which it has a tight interference fit. It is believed that this will provide a much stronger and more rigid connection between the components than that possible with the single tongue. The strength of the connection provided by this double tongue or hook arrangement is such that the principles of this connection will be applicable beyond stair case construction to other situations where it is required to connect two components generally at right angles one to the other. This will be discussed subsequently. The connection will now be described in detail.

Of the two tongues, the lower tongue 1012 provides the principal connection between the tread and riser following assembly and as such it is larger than the upper tongue 1010, both in terms of thickness and lateral extension from the edge of the tread than the upper tongue. While the upper tongue 1010 contributes to the rigid locking effect in the assembled state, its primary role is to act as a fulcrum to provide leverage when the lower tongue 1012 is forced into its associated channel 1016 when the tread is pivoted downwardly during assembly. Due to the leverage effect which is provided on assembly, the lower tongue is able to be formed as a tight interference fit within its associated channel, a tighter fit than could be achieved in the construction described with reference to FIGS. 1 to 9.

Figure 57B:
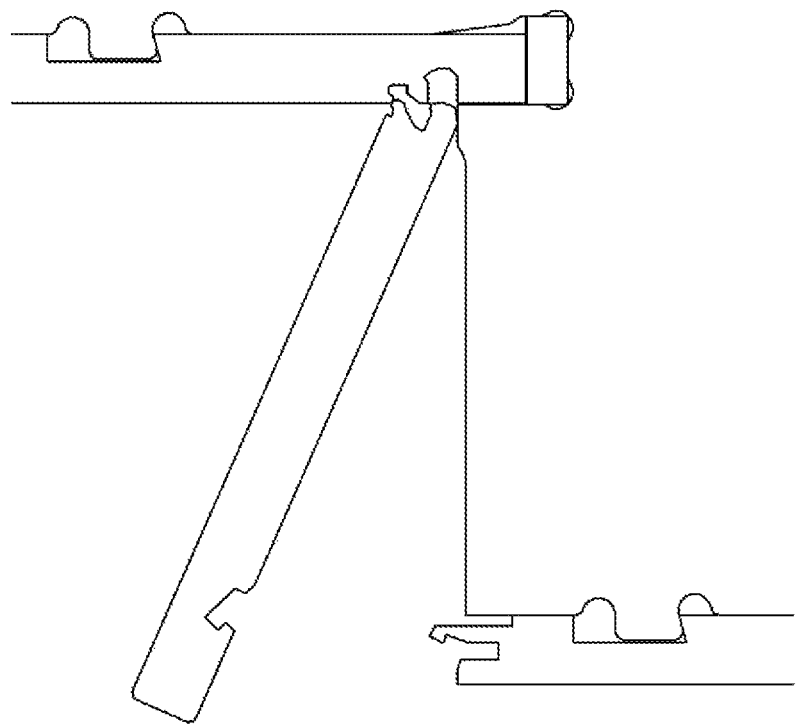
FIG. 57B shows the tongues and channels to a further enlarged scale.

With reference to FIG. 57B, the upper tongue 1010 is of generally hook-like form with, at its outer end, a flat upper edge 1020 which is substantially in the plane of the tread 1002. The tongue is formed with a groove 1022 behind that edge, the outer side 1024 of the groove being inwardly inclined as shown and the inner side 1026 of the groove being substantially perpendicular to the surface of the tread. The lower part of the upper tongue is shaped with an inclined undercut 1028 which leads inwardly and downwardly to the inner edge of the lower tongue 1012. The corresponding channel 1014 in the riser is, in its upper part, of generally complimentary shape to that of the upper tongue in its upper part. Accordingly, when the upper tongue is engaged within the channel by pivoting the tread as will be described with reference to the following drawings, the upper tongue will be locked within that channel against withdrawal by forces applied in the direction of the longitudinal axis of the tread.

It will be noted that an upper lip 1030 formed at the entrance to the upper channel has a downwardly inclined lower edge 1032. That inclination corresponds approximately to the angle of inclination of the tread at the start of its engagement with the riser when it is pivoted downwardly to engage the upper and lower tongues into their respective channels in the riser (see FIG. 58). Accordingly at the commencement of the engagement action, the tongue edge 1020 will engage the inclined lip edge 1032 and slide along that edge until the Lip 1030 engages within the groove 1022 (see FIG. 59). The engagement of the lip 1030 within the groove 1022 thereby forms a fulcrum which, as the tread is swung downwardly, causes the forward end of the upper tongue to swing upwardly into the channel beyond the lip 1030 and significantly, exerts a leveraged forward force on the lower tongue 1012 which causes it to be forced forwardly and upwardly into the lower channel.

Referring again to FIG. 57B, the lower tongue 1012 is shaped at its forward end with an upwardly directed lip 1040 of triangular section, the rear side of which forms the side of a groove 1042 behind the lip. The base 1043 of the groove 1042 is substantially flat and parallel to the surface of the tread. Beneath the lip 1042, the forward surface of the lower tongue is shaped in its lower part with an incline 1044 which leads downwardly and inwardly to a lower surface 1046 at the base of the tongue and which is substantially parallel to the surface forming the base 1043 of the groove in the upper part of the tongue.

The lower channel in the riser is substantially of complimentary profile to that of the lower tongue whereby when the lower tongue is forced into the channel by the described pivoting action, the triangular lip 1040 on the tongue will engage behind an upper lip 1050 at the entrance to the channel to lock the tongue against, withdrawal by the application of forces longitudinally of the tread. However it is to be understood that the tread is not locked to the riser only by the hooking engagement of the upper and lower tongues behind the upper lips 1030, 1050 of the upper and lower channels, it is also locked as a consequence of tight frictional engagement between the upper and lower surfaces of the lower tongue with the upper and lower surfaces at the sides of the channel as will now be described in greater detail.

With reference to FIG. 57B, the lower channel has upper and lower parallel sides 1052, 1054 which are themselves parallel to the plane of the tread in its fully engaged condition. The upper side 1052 which defines the undersurface of the lip 1050 is relieved upwardly at its inner end to form a triangular groove 1056 which receives the triangular lip 1040 at the forward end of the lower tongue in the fully engaged condition (see FIG. 62).

Figure 58:
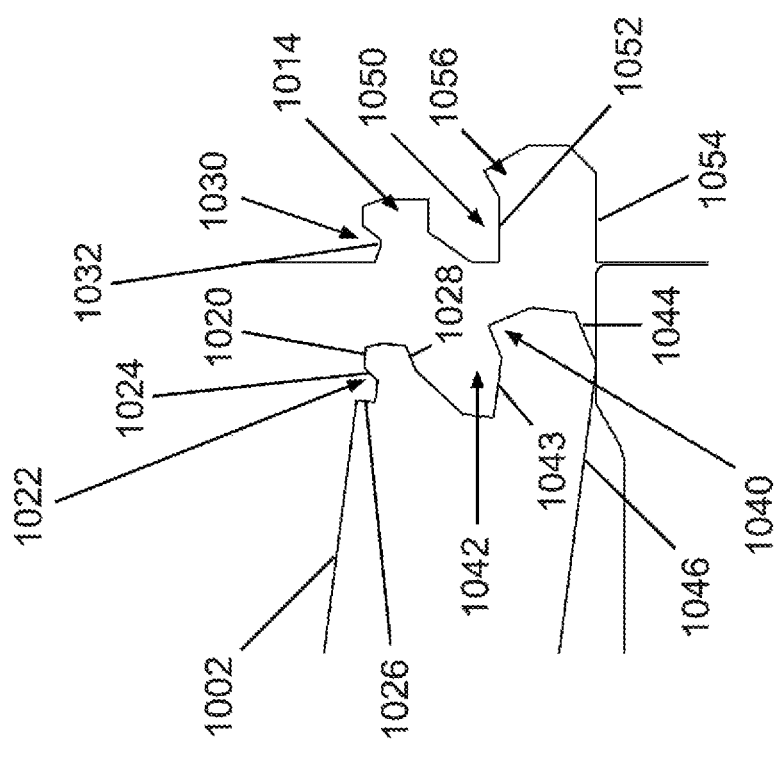
Figure 61A:
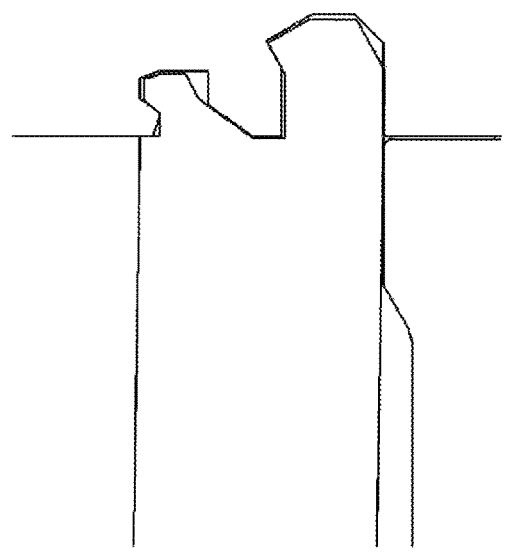
FIG. 61, 61A.
Figure 61:
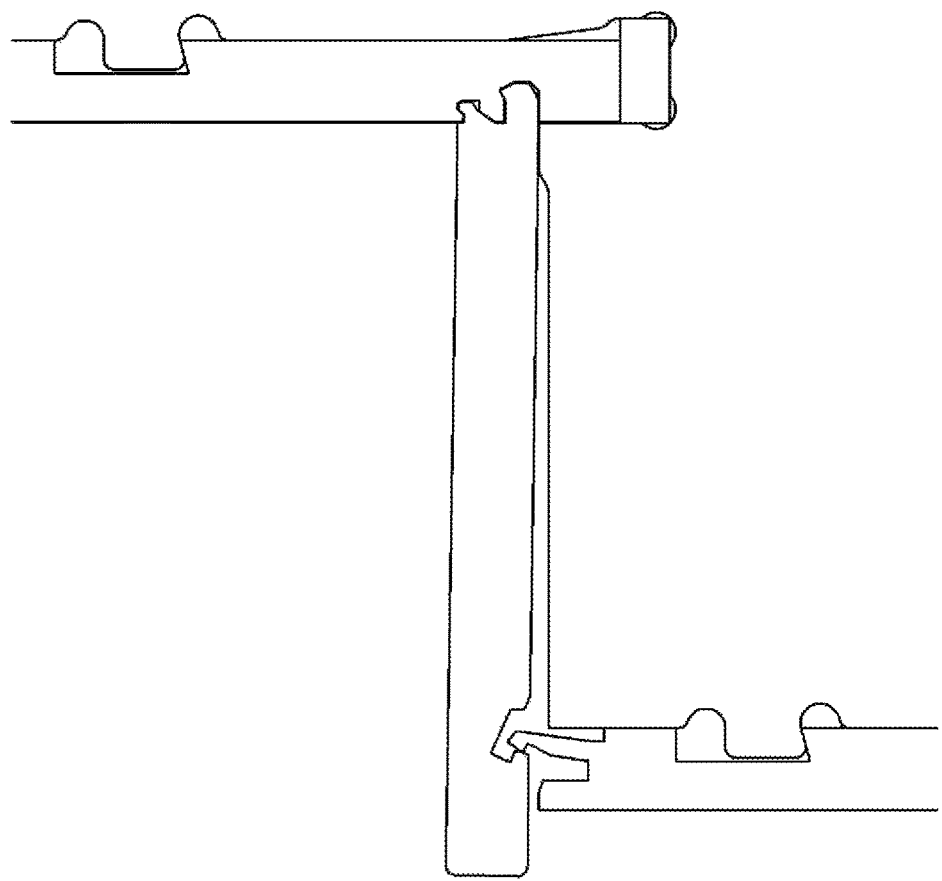
Figure 62A:
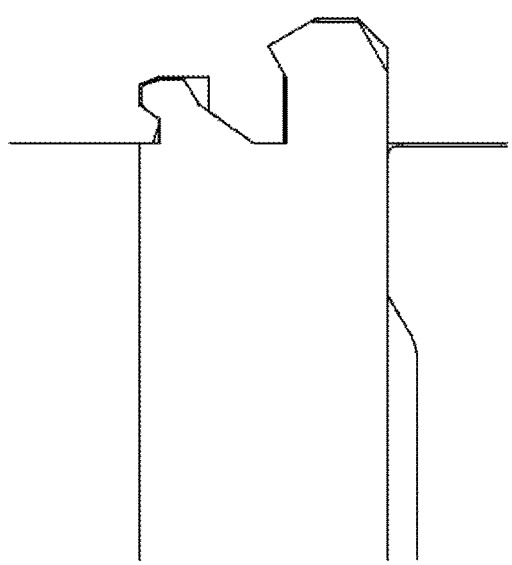
FIG. 62, 62A are views corresponding to FIGS. 57, 57A showing successive stages in the establishment of the connection.
Figure 62:
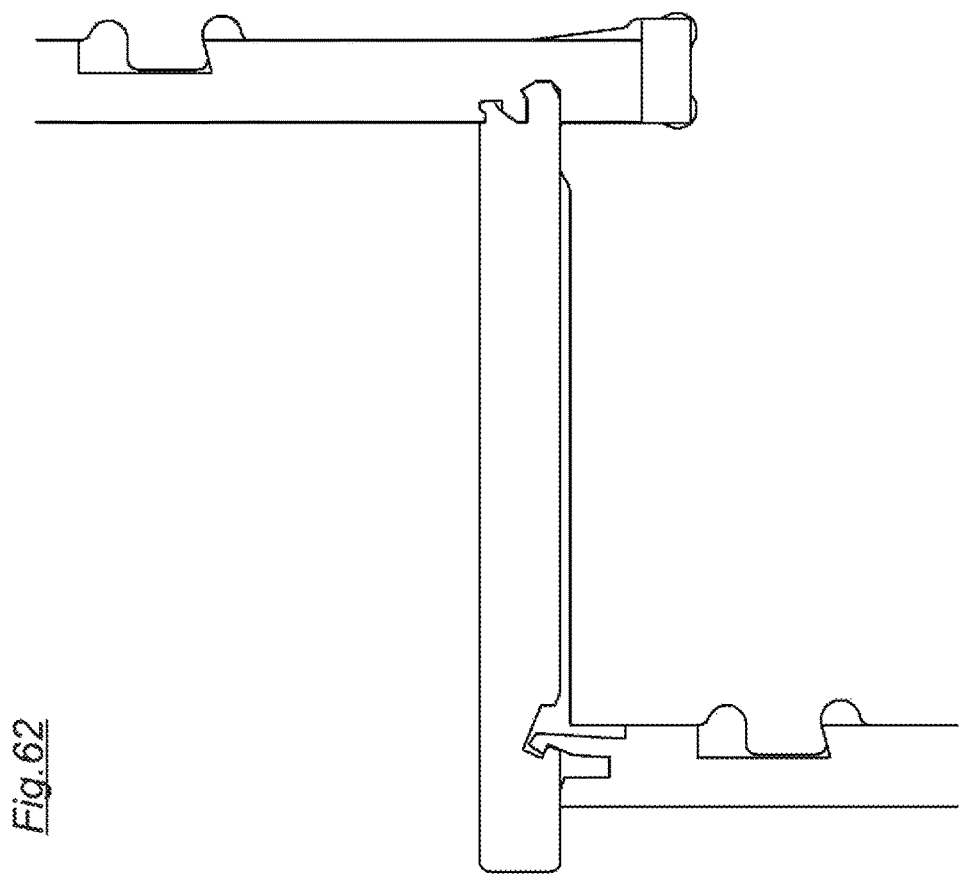

Engagement of the tread to the riser initially commences by manipulation of the tread with the tread inclined so as to slide the upper tongue into a condition in which its groove 1022 is engaged with the lip 1030 at the entrance to the upper channel to form the fulcrum for subsequent lever action (see FIGS. 58 and 59). In that condition the angled surface 1044 at the underside of the lower tongue is positioned to slide along the lower side 1054 of the lower channel. The lower tongue 1012 is pushed into the channel under the leverage effect as the tread is pivoted about the fulcrum downwardly towards the horizontal; the undersurface of the tongue 1012 engages and slides along the lower side 1054 of the channel and as the tongue moves into the channel the continual pivoting movement will cause the lip 1040 of the tongue 1012 to move upwardly into sliding engagement with the upper side 1052 of the channel. Although the tread and riser are formed from wood which is substantially rigid, nevertheless due to a tight interference fit between these parts, a degree of compression will arise between the contacting parts of the lower tongue 1012 and the sides of the channel sufficient to enable the tongue to enter the channel under the leveraged force applied. In the fully engaged condition of the tongue within the channel, the opposed sides 1052, 1054 of the channel 1016 will be in tight gripping arrangement with the upper and lower surfaces 1043, 1046 of the tongue ensured by the interference fit achieved by forming the sides of the channel at a spacing slightly less than the width of the land defined between the surfaces 1043, 1046 of the tongue.

The degree of size difference needed to achieve the tight grip can be determined empirically and will be dependent on such factors as the compressibility and strength of the materials used and the leverage force which can be generated in practice to drive the tongue into the channel. It will be understood that during movement of the lower tongue into the channel which will occur as a combination of a forward advance and a pivotal movement, the part of the lower face of the lower tongue in contact with the lower side 1054 of the channel will constantly change. Although in the embodiment shown this is accommodated by shaping the lower pail with a planar inclined face leading into the planar lower face, in an alternative the forward edge of the tongue beneath the tip could be curved convexly to provide a transition from the forward edge of the tongue to the planar lower face.

It is to be noted that whereas there is a tight interference fit between the lower tongue and lower channel in the fully engaged condition facilitated by the leverage force exerted when the tread is pivoted about the fulcrum during insertion, the fit between the upper tongue and upper channel is not an interference fit but in the fully engaged position it still provides a positive lock provided by the engagement of its lip in the forward pail of the channel.

Figure 63:
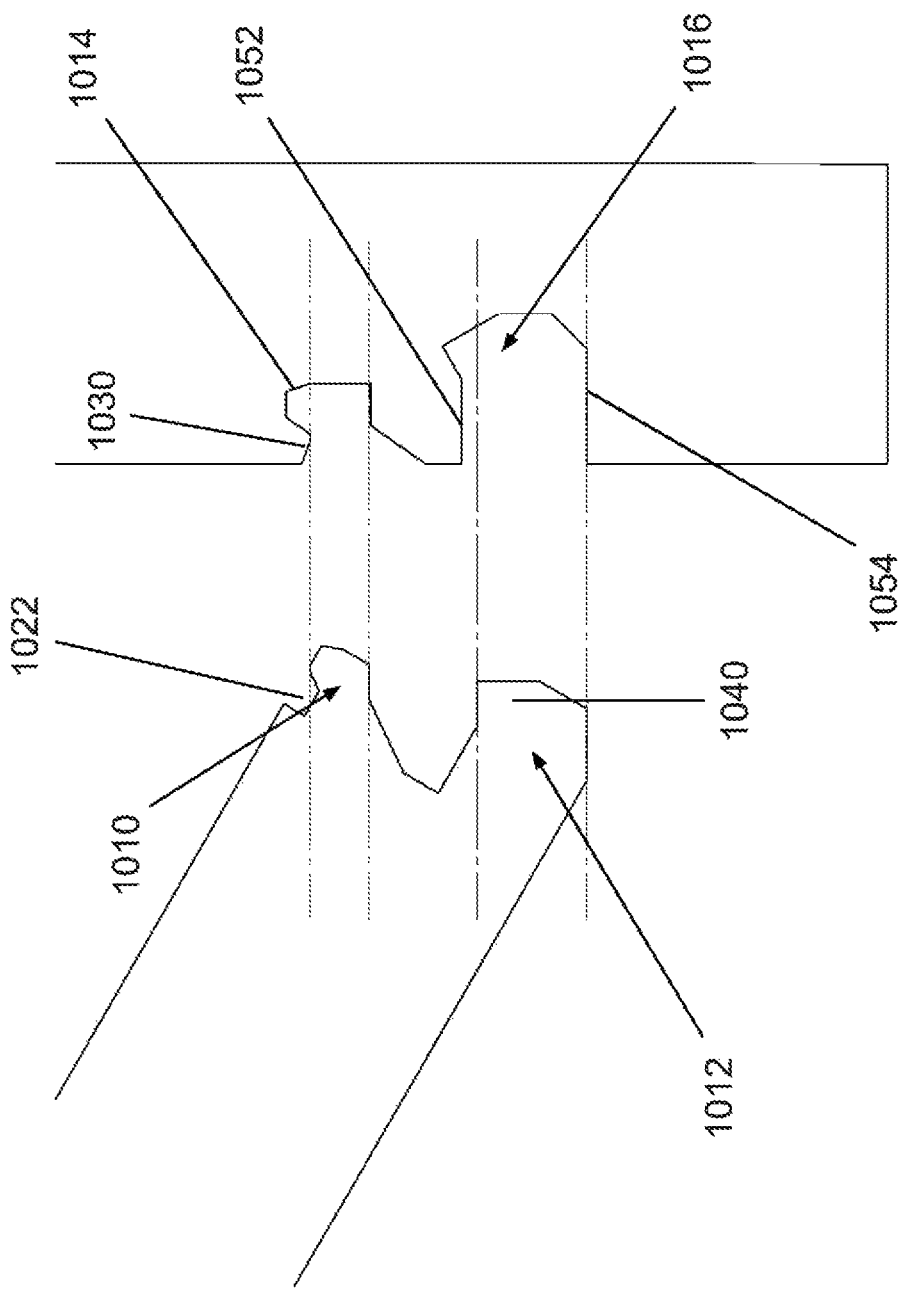
FIGS. 63 and 64 are views to an enlarged scale to better illustrate the size relation between the tongues and channels prior to and during establishment of the connection.
Figure 64:
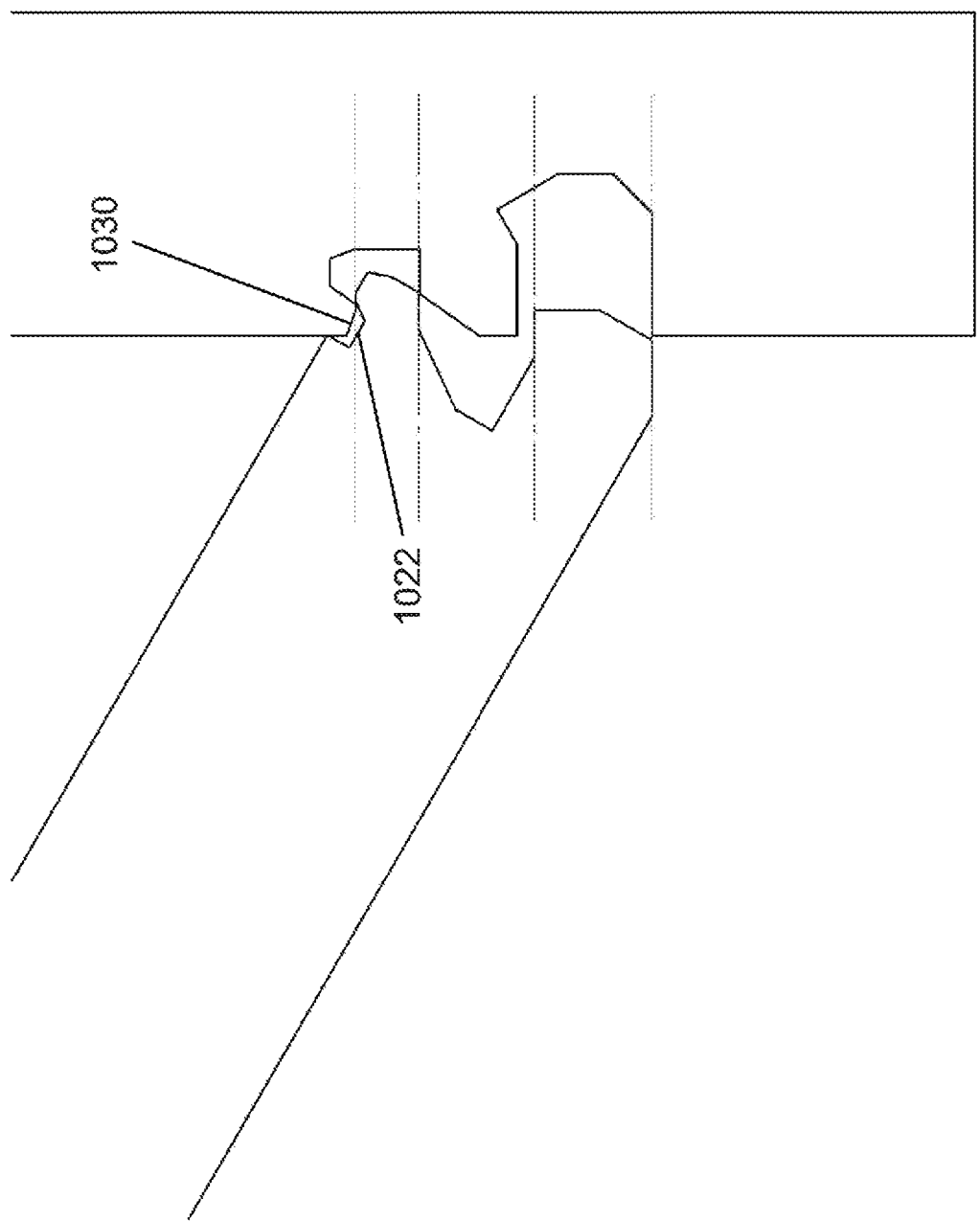

FIGS. 63 and 64 are views to a further enlarged scale to illustrate the thicknesses of the upper and lower tongues in relation to the width at the entrance to the upper and lower channel when the tread is tilted to facilitate engagement of the lip 1030 at the entrance to the upper channel within the groove 1022 in the upper tongue whereby to form the fulcrum previously discussed. In the embodiment shown the thread is inclined at about 30° to establish that connection. Although the thickness of the upper tongue and width of the entrance to the upper channel are substantially the same on engagement to establish the fulcrum they are not an interference fit at that time but as soon as the tread starts to be rotated downwardly the upper tongue will lock within the upper channel by engagement behind the upper lip 1030. The absence of the interference fit between the upper tongue and upper channel when the tread is moved into position to establish the fulcrum means that the initial engagement between upper tongue and channel occurs easily. It is also to be noted that the interference fit previously discussed between the lower tongue and lower channel occurs principally in the fully engaged condition of the lower tongue. The locking of the upper tongue in the upper channel which occurs as the tread starts to be pivoted downwardly is a positive lock which is of practical importance in this application as elements of the connection between the forward end of the tread and the underlying riser at that end may engage before the lower tongue is fully engaged within the lower channel and hence the positive locking of the upper tongue within the upper channel will prevent the tread from being pulled back before the lower tongue is fully engaged and locked.

The two tongues on the head and the two channels in the riser can readily be formed with existing machinery, particularly a double-ended tenoner, in a single pass of a long length of tread-forming material or riser-forming material which is subsequently cut to form individual treads and risers.

Although specific shapes have been illustrated for the two tongues and associated channels, some variation in shape is conceivable consistent with the objective of achieving the leverage, positive lock, and frictional lock effects described.

Although the connection system described has significantly utility in stair case construction, the strength and rigidity of the connection it achieves has applicability in a wider range of applications where it is required to connect two panels at right angles one to the other, for example in furniture-making, such as in the construction of cabinets, for instance flat-pack furniture for self-assembly, insulation panels and wall panels in building construction. Its usage is also not confined just to panels made of wood and the like. It is also applicable to the connection of panels of other materials such as concrete, for example in building construction involving the use of precast concrete wall panels assembled on-site to form a building structure.

For applications other than stair case construction a minor change in configuration over that illustrated for the connection between stair case tread and riser may be required. It will be seen from FIGS. 57 to 64 that the lower surface of the lower tongue is coplanar with, and forms a direct continuation of, the lower surface of the tread. For other applications the lower tongue may be configured so that its lower surface is displaced upwardly from the lower surface of the associated panel so as to form a shoulder which can abut against the adjacent surface of the other panel immediately below the lower side of the lower channel in that panel in order to prevent pivotal movement of the first panel beyond the position at which full insertion is achieved. This is shown in FIGS. 65 and 66 for a connection between two panels 1060 and 1070, where the shoulder associated with the lower tongue 1012 is designated 1062. In stair case construction this is not needed as pivotal movement of the tread beyond that position is prevented by the engagement of the forward end of the tread with the riser at that end. It is however to be understood that a lower tongue configuration with shoulder could be provided in stair case construction if desired.

Although it has been convenient to refer to the two tongues and associated channels as upper and lower tongues and channels with reference to the relative positions they assume in the construction of a stair case, it will be understood that when this type of connection is used in other situations for connecting two panels at right angles the actual orientation of the tongues and channels may be different and hence the direction of pivotal movement of the panel with tongues when making the connection to the other panel will not necessarily be a downward pivotal movement as it is when assembling a tread to a riser as described. Basically the configuration of the connection will be designed to suit the structure being assembled from the two connected panels. Moreover, the connection can be formed at any position in the panel having the channels, according to the nature of the structure being assembled.

It is to be understood that in a stair case in which the connection between the rear of a tread and adjacent lower end of the riser is formed in the manner described with reference to FIGS. 57 to 64, connections between the forward ends of the treads and upper ends of the adjacent risers and with the stringers can assume any of the forms described with reference to earlier embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A staircase comprising
at least one stringer having at least one rebate located intermediate at least one riser abutment face and at least one tread supporting face,
at least one tread having a connecting element provided at the underside thereof and integrally formed therewith,
at least one riser having a further connecting element provided along an edge thereof and integrally formed therewith,
the tread and the riser being arranged so that when the tread is supported on the tread supporting face of the stringer and the riser is in contact with the riser abutment face of the stringer the tread and the riser adopt generally mutually perpendicular orientations to one another with an edge of the tread or an edge of the riser being located within the rebate of the stringer to interlockingly connect the stringer to the riser or to the tread,
the rebate of the stringer being formed integrally with the stringer or the rebate being formed in an attachment of the stringer,
the connecting element and the further connecting element forming a pair and being adapted for cooperative engagement with each other to interlockingly connect the tread and the riser to one another in the generally mutually perpendicular orientation and to connect the tread to the stringer and the riser to the stringer,
the connecting element including a recess having at least one first bead located at a rim of the recess, and
the further connecting element including a projection having at least one second bead located at a distal edge of the projection,
the projection being resiliently deflectable so as to deflect during engagement of the connecting element and the further connecting element to interlockingly connect the tread, the riser and the stringer,
wherein resilient deflection of the projection allows the second bead of the projection to be located deeper within the recess relative to the position of the first bead of the recess to interlockingly connect the tread and the riser to inhibit disconnection.

2. A stair case according to claim 1
in which one of the connecting element and further connecting element includes a generally male element and/or a generally female element and the other of the connecting element and further connecting element includes a generally male element and/or generally female element in which the male element and female element of the pair of elements are complementary to each other for cooperative engagement to interlockingly connect the tread, the riser and/or the stringer.

3. A stair case according to claim 2
in which the pair of connecting element and further connecting element is a first pair of a first connecting element and a second connecting element.

4. A stair case according to claim 3
in which there are two pairs of connecting elements and further connecting elements being the first pair and a second pair in which each pair has a generally male element and/or a generally female element in which the male element and the female element of the one pair of elements are complementary to each other for cooperative engagement to interlockingly connect the tread, the riser and the stringer.

5. A stair case according to claim 4
in which the second pair of connecting element and further connecting element is a third connecting element and a fourth connecting element.

6. A stair case according to claim 5
in which there are three pairs of connecting element and further connecting element, being the first pair, the second pair and a third pair in which each pair has a generally male element and/or a generally female element in which the male element and female element of each pair of elements are respectively complementary to each other for cooperative engagement to interlockingly connect the tread, the riser and/or the stringer.

7. A stair case according to claim 6
in which the third pair of connecting element and further connecting element is a fifth connecting element and a sixth connecting element.

8. A stair case according to claim 7, in which the tread is provided with a toe wherein the fifth connecting element is integrally formed along the toe of the tread, and
the sixth connecting element is integrally formed on the front face of the riser, the fifth connecting element and the sixth connecting element cooperatively engageable with one another to interconnect the toe of the tread to the front face of the riser, wherein
the fifth connecting element of the tread extends transversely along at least a portion of the tread, and the sixth connecting element of the riser extends transversely along at least a portion of the riser.

9. A stair case according to claim 8, wherein cooperative engagement of the fifth and sixth connecting elements secures the toe of the tread to the edge of the riser.

10. A stair case according to claim 7, wherein the fifth and sixth connecting elements are interconnected by a pivoting action of the respective tread and riser.

11. A stair case according to claim 6 in which the cooperative engagement of the male element and female element of each of the individual pairs of connecting element and further connecting element contributes to the interlocking connection between the tread and the riser and between the riser, the tread and the stringer to form the staircase.

12. A stair case according to claim 5, in which each stringer comprises:
a plurality of tread supporting faces alternately arranged with a plurality of riser abutment faces,
each riser abutment face having a lower edge and
a plurality of rebate sections in which each rebate section is formed between the lower edge of each riser abutment face and the toe of the adjacent tread supporting face,
each rebate section configured to receive the bottom edge of the riser or toe of the tread,
each riser abutment face having the third connecting element, which is integrally formed therewith, or is formed as an attachment to the stringer, and
each riser having the fourth connecting element integrally formed on the rear face thereof,
wherein cooperative engagement of the third and the fourth connecting elements to each other interlockingly secures the riser, and/or the tread to the stringer.

13. A stair case according to claim 12, wherein the third connecting element of the riser abutment face is formed between the rebate section and the adjacent tread supporting face.

14. A stair case according to claim 12, wherein the third and fourth connecting elements have complementary overlapping formations, inhibiting separation of the riser and the stringer when the third and fourth connecting elements are interconnected to one another.

15. A stair case according to claim 12, wherein the third connecting element is a projection having a first opposed locking face, and the fourth connecting elements is a recess in the form of a channel, the channel having a second opposed locking face,
   wherein the channel extends at least part of the length of the riser.

16. A stair case according to claim 15, further comprising a tapered spacing element wherein the tapered spacing element is inserted between the stringer and the riser and/or between the stringer and the tread to urge the third and fourth connecting elements into locking interconnection with each other to resist separation of the stringer and riser and/or the stringer and the tread.

17. A stair case according to claim 1, in which the tread is provided with a nose, and
   the recess of the connecting element includes a groove formation, wherein
   the groove formation extends parallel to the nose of the tread, and the edge of the riser having the further connecting element is an upper edge of the riser and the projection of the further connecting element includes a tongue formation that extends transversely along the upper edge of the riser.

18. A stair case according to claim 1, in which the pair of connecting element and further connecting element includes a connection between a rear end of the tread and lower end of an adjacent risers, the connection comprising
   upper and lower tongues at the rear edge of the tread, and
   upper and lower channels in the riser for engagement by the upper and lower tongues of the tread respectively,
   the lower channel having opposed parts,
   the upper tongue and the upper channel being configured such that when the upper tongue is engaged with the upper channel the engagement forms a fulcrum about which the tread can pivot to force the lower tongue into the lower channel with leverage,
   the lower tongue fitting securely within the lower channel, wherein
   pivoting of the tread about the fulcrum exerts a leverage force sufficient to overcome resistance between the lower tongue and the lower channel during insertion and,
   when the lower tongue is fully engaged within the lower channel, the lower tongue is held within the lower channel with a tight frictional grip between the opposed parts of the lower channel as a consequence of the secure fitment.

19. A stair case according to claim 18, wherein
   the lower tongue includes a projecting lip which engages within a corresponding recess within the inner part of the lower channel in the fully engaged condition of the lower tongue in order to provide a positive lock of the lower tongue within the lower channel inhibiting withdrawal of the tread from the riser in a direction at right angles to the plane of the riser.

20. A stair case according to claim 18, wherein
   the upper tongue and upper channel are so configured that in the fully engaged condition of the lower tongue within the lower channel, the upper tongue is positively locked within the upper channel by complementary shaping of the upper tongue and upper channel.

21. A staircase comprising
   a stringer having a plurality of tread supporting faces alternately arranged with a plurality of riser abutment faces, and
   a plurality of rebates in which the rebate is located intermediate the riser abutment face and the tread supporting face,
   the rebate being formed in the stringer or in an attachment to the stringer,
   each riser abutment face having a lower edge,
   the rebate being formed between the lower edge of the riser abutment face and a toe of an adjacent tread supporting face,
   the rebate configured to receive the lower edge of the riser or the toe of the tread,
   the tread having a first connecting element provided at the underside thereof and integrally formed therewith,
   the riser having a second connecting element provided along an edge thereof and integrally formed therewith,
   the tread and the riser being arranged so that when the tread is supported on the tread supporting face of the stringer and the riser is in contact with the riser abutment face of the stringer, the tread and the riser adopt generally mutually perpendicular orientations to one another with the toe of the tread or the edge of the riser being located within the rebate of the stringer to interlockingly connect the stringer to the riser or to the tread,
   the first connecting element and the second connecting element forming a pair and being adapted for cooperative engagement with each other to interlockingly connect the tread and the riser to one another in the generally mutually perpendicular orientation and to connect the tread to the stringer and the riser to the stringer,
   the first connecting element including a recess having at least one first bead located at a rim of the recess, and
   the second connecting element including a projection having at least one second bead located at a distal edge of the projection,
   the projection being resiliently deflectable so as to deflect during engagement of the connecting element and the further connecting element to interlockingly connect the tread, the riser and the stringer,
   wherein resilient deflection of the projection allows the second bead of the projection to be located deeper within the recess relative to the position of the first bead of the recess to interlockingly connect the tread and the riser to inhibit disconnection, and
   wherein the riser abutment face has a third connecting element which is either integrally formed therewith, or is formed as an attachment to the stringer, and
   the riser has a fourth connecting element integrally formed on the rear face thereof,
   wherein cooperative engagement of the third and the fourth connecting elements to each other interlockingly secures the riser and/or the tread to the stringer.

* * * * *